United States Patent
Okada

(10) Patent No.: US 8,408,075 B2
(45) Date of Patent: Apr. 2, 2013

(54) FORCE DETECTION DEVICE

(75) Inventor: Kazuhiro Okada, Ageo (JP)

(73) Assignee: Wacoh Corporation, Saitama (JP)

( * ) Notice: Subject to any disclaimer, the term of this patent is extended or adjusted under 35 U.S.C. 154(b) by 357 days.

(21) Appl. No.: 12/726,471

(22) Filed: Mar. 18, 2010

(65) Prior Publication Data

US 2011/0005338 A1 Jan. 13, 2011

(30) Foreign Application Priority Data

Jul. 8, 2009 (JP) ................................. 2009-161910

(51) Int. Cl.
*G01D 7/00* (2006.01)

(52) U.S. Cl. ................................. 73/862.043

(58) Field of Classification Search ............... 73/862.041–862.046
See application file for complete search history.

(56) References Cited

U.S. PATENT DOCUMENTS

| | | | |
|---|---|---|---|
| 4,905,523 A | 3/1990 | Okada | 73/862.04 |
| 4,967,605 A | 11/1990 | Okada | 73/862.04 |
| 4,969,366 A | 11/1990 | Okada | 73/862.08 |
| 5,014,415 A | 5/1991 | Okada | 29/621.1 |
| 5,035,148 A | 7/1991 | Okada | 73/862.04 |
| 5,092,645 A | 3/1992 | Okada | 294/86.4 |
| 5,182,515 A | 1/1993 | Okada | 324/259 |
| 5,263,375 A | 11/1993 | Okada | 73/862.042 |
| 5,295,386 A | 3/1994 | Okada | 73/1 D |
| 5,343,765 A | 9/1994 | Okada | 73/862.043 |
| 5,365,799 A | 11/1994 | Okada | 73/862.041 |
| 5,392,658 A | 2/1995 | Okada | 73/862.043 |
| 5,406,848 A | 4/1995 | Okada | 73/517 R |
| 5,421,213 A | 6/1995 | Okada | 73/862.043 |
| 5,437,196 A | 8/1995 | Okada | 73/862.043 |
| 5,492,020 A | 2/1996 | Okada | 73/862.626 |
| 5,497,668 A | 3/1996 | Okada | 73/862.626 |
| 5,531,002 A | 7/1996 | Okada | 29/25.41 |
| 5,531,092 A | 7/1996 | Okada | 73/1 D |
| 5,571,972 A | 11/1996 | Okada | 73/862.043 |
| 5,639,973 A | 6/1997 | Okada | 73/862.043 |
| 5,646,346 A | 7/1997 | Okada | 73/504.04 |
| 5,668,318 A | 9/1997 | Okada | 73/504.11 |
| 5,682,000 A | 10/1997 | Okada | 73/862.043 |
| 5,744,718 A | 4/1998 | Okada | 73/514.33 |
| 5,780,749 A | 7/1998 | Okada | 73/862.043 |

(Continued)

*Primary Examiner* — Lisa Caputo
*Assistant Examiner* — Octavia D. Hollington
(74) *Attorney, Agent, or Firm* — Ladas & Parry LLP

(57) ABSTRACT

Between an upper substrate 10 and a lower substrate 20 parallel to the XY plane, a first columnar member P1 and a second columnar member P2 are disposed. The upper end of each columnar member P1 or P2 is connected to the upper substrate 10 via an upper film portion 11 or 12, and the lower end is connected to the lower substrate 20 via a conductive lower film portion 21 or 22. The columnar members P1 and P2 are inclined mutually opposite with respect to vertical reference axes R1 and R2. When a rightward force +Fx is applied to the upper substrate 10 and the upper substrate 10 slides rightward, the columnar member P1 incline in a laying-down direction and the lower film portion 21 is deformed upward, and the columnar member P2 inclines in a rising direction and the lower film portion 22 is deformed downward. Based on a difference in capacitance value between a capacitance element consisting of the lower film portion 21 and an electrode E5 and a capacitance element consisting of the lower film portion 22 and an electrode E6, the force Fx in the X-axis direction is detected. By summing the capacitance values, a force Fz in the Z-axis direction can also be detected.

63 Claims, 34 Drawing Sheets

U.S. PATENT DOCUMENTS

| | | |
|---|---|---|
| 5,811,693 A | 9/1998 | Okada ............... 73/862.043 |
| 5,831,163 A | 11/1998 | Okada ............... 73/504.12 |
| 5,850,040 A | 12/1998 | Okada ............... 73/504.04 |
| 5,856,620 A | 1/1999 | Okada ............... 73/514.32 |
| 5,962,787 A | 10/1999 | Okada et al. ............... 73/514.32 |
| 5,987,985 A | 11/1999 | Okada ............... 73/504.04 |
| 6,003,371 A | 12/1999 | Okada ............... 73/504.02 |
| 6,053,057 A | 4/2000 | Okada ............... 73/862.043 |
| 6,076,401 A | 6/2000 | Okada ............... 73/504.12 |
| 6,098,461 A | 8/2000 | Okada ............... 73/514.34 |
| 6,158,291 A | 12/2000 | Okada ............... 73/862.043 |
| 6,159,761 A | 12/2000 | Okada ............... 438/53 |
| 6,185,814 B1 | 2/2001 | Okada ............... 29/621.1 |
| 6,205,856 B1 | 3/2001 | Okada ............... 73/504.11 |
| 6,269,697 B1 | 8/2001 | Okada ............... 73/504.02 |
| 6,282,956 B1 | 9/2001 | Okada ............... 73/504.12 |
| 6,314,823 B1 | 11/2001 | Okada ............... 73/862.043 |
| 6,367,326 B1 | 4/2002 | Okada ............... 73/504.12 |
| 6,378,381 B1 | 4/2002 | Okada et al. ............... 73/862.043 |
| 6,474,133 B1 | 11/2002 | Okada ............... 73/1.38 |
| 6,477,903 B2 | 11/2002 | Okada ............... 73/862.043 |
| 6,512,364 B1 | 1/2003 | Okada ............... 324/158.1 |
| 6,530,283 B2 | 3/2003 | Okada et al. ............... 73/780 |
| 6,716,253 B2 | 4/2004 | Okada ............... 73/52 |
| 6,772,632 B2 | 8/2004 | Okada ............... 73/514.38 |
| 6,779,408 B2 | 8/2004 | Okada et al. ............... 324/681 |
| 6,809,529 B2 | 10/2004 | Okada |
| 6,859,048 B2 | 2/2005 | Okada |
| 6,864,677 B1 | 3/2005 | Okada |
| 6,865,943 B2 | 3/2005 | Okada |
| 6,894,482 B2 | 5/2005 | Okada |
| 6,915,709 B2 | 7/2005 | Okada |
| 6,920,788 B2 | 7/2005 | Okada |
| 6,941,810 B2 | 9/2005 | Okada |
| 6,990,867 B2 | 1/2006 | Okada |
| 7,059,188 B2 | 6/2006 | Okada |
| 7,075,527 B2 | 7/2006 | Okada et al. |
| 7,121,147 B2 | 10/2006 | Okada |
| 7,123,028 B2 | 10/2006 | Okada et al. |
| 7,152,485 B2 | 12/2006 | Okada |
| 7,219,561 B2 | 5/2007 | Okada |
| 7,231,802 B2 | 6/2007 | Okada |
| 7,360,455 B2 | 4/2008 | Okada |
| 7,360,456 B2 * | 4/2008 | Morimoto ............... 73/862.044 |
| 7,363,814 B2 | 4/2008 | Okada |
| 7,437,954 B2 * | 10/2008 | Sakano ............... 73/862.044 |
| 7,533,582 B2 | 5/2009 | Okada |
| 7,578,162 B2 | 8/2009 | Okada |
| 7,757,571 B2 * | 7/2010 | Hirabayashi et al. ............... 73/862.626 |
| 2007/0012109 A1 | 1/2007 | Okada |
| 2008/0210008 A1 | 9/2008 | Okada |
| 2008/0289417 A1 | 11/2008 | Okada |

* cited by examiner

PRIOR ART

FIG. 13
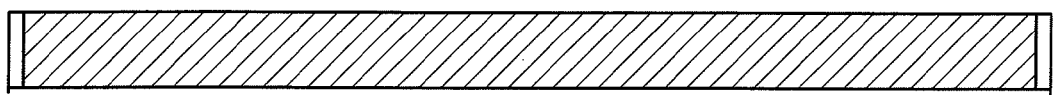
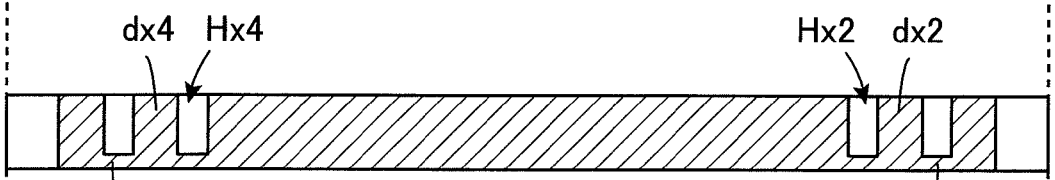
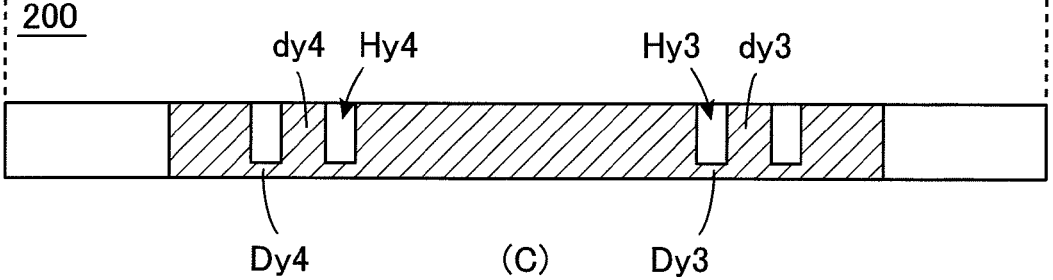

FIG. 15
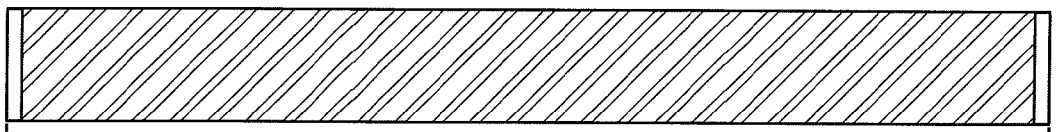
(A)
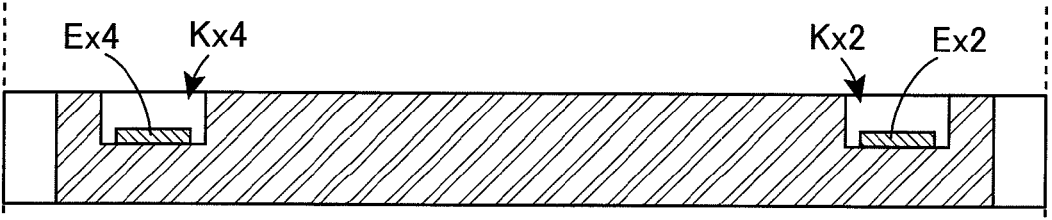
(B)
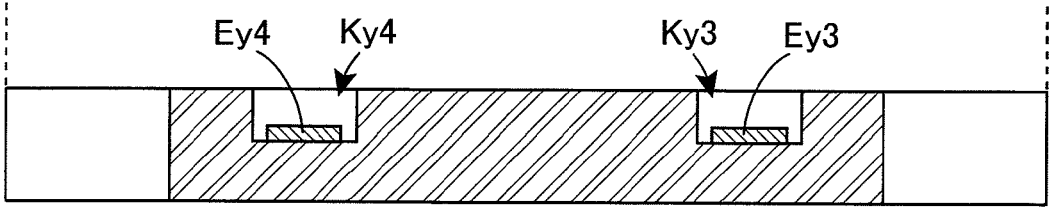
(C)

(XZ SECTION)

(A-A SECTION)

(B-B SECTION)

(C-C SECTION)

FIG. 26

|  | Cx1 | Cx2 | Cx3 | Cx4 | Cy1 | Cy2 | Cy3 | Cy4 |
|---|---|---|---|---|---|---|---|---|
| +Fx | 0 | 0 | 0 | 0 | +Δ | −Δ | +Δ | −Δ |
| +Fy | +Δ | −Δ | +Δ | −Δ | 0 | 0 | 0 | 0 |
| +Fz | −Δ | −Δ | −Δ | −Δ | −Δ | −Δ | −Δ | −Δ |
| +Mx | (−δ) | (+δ) | (−δ) | (+δ) | −Δ | −Δ | +Δ | +Δ |
| +My | +Δ | +Δ | −Δ | −Δ | (+δ) | (−δ) | (+δ) | (−δ) |
| +Mz | +Δ | −Δ | −Δ | +Δ | −Δ | +Δ | +Δ | −Δ |

WHEREIN, $V(Fx)^*$, $V(Fy)^*$ ARE APPROXIMATE VALUES WHEN $δ = 0$.

$$\begin{bmatrix} V(Fx) = V(Fx)^* - \frac{k2}{k1} \cdot V(My) \\ \\ V(Fy) = V(Fy)^* - \frac{k4}{k3} \cdot V(Mx) \end{bmatrix}$$

FORCE DETECTION DEVICE

BACKGROUND OF THE INVENTION

The present invention concerns a force detection device, and particularly concerns a force detection device suited for detecting forces applied in predetermined coordinate axis directions and moments applied around predetermined coordinate axes.

Various types of force detection devices are utilized for controlling the motions of robots and industrial machines. Compact force detection devices are also incorporated as man-machine interfaces of input devices for electronic equipment. In order to achieve a compact size and cost reductions, a force detection device that is used in such an application is required to be as simple in structure as possible and yet enable forces of the respective coordinate axes in three-dimensional space to be detected independent of each other.

Generally, detection targets of a force detection device are force components in predetermined coordinate axis directions and moment components around predetermined coordinate axes. When an XYZ three-dimensional coordinate system is defined in a three-dimensional space, detection targets are six components of force components Fx, Fy, and Fz in the respective coordinate axis directions, and moment components Mx, My, and Mz around the respective coordinate axes.

As a force detection device capable of detecting such six force components independent of each other, for example, a device with a comparatively simple structure is disclosed in U.S. Pat. No. 6,915,709. In this device, a structural member including two substrates connected by a plurality of columnar members is prepared, and in a state where one of the substrates is fixed, when a force is applied to the other, by measuring displacements of the columnar members individually, components of the applied force are detected.

U.S. Pat. No. 7,219,561 discloses a technique which simplifies arithmetic operation for detecting components of an applied force by providing a wiring between specific electrodes of capacitance elements by using the capacitance elements as sensors for measuring displacements of the columnar members individually.

In the force detection devices disclosed in the above-described Patent Documents, inclinations of the respective columnar members are obtained independent of each other, and based on the inclination form of the plurality of columnar members, six force components are detected independent of each other. Therefore, sensors for measuring the inclination degrees of the respective columnar members independent of each other are necessary. Particularly, in a device having a function of detecting six force components, a plurality of columnar members parallel to the Z-axis direction are disposed on a substrate parallel to an XY plane, and sensors which measure the inclination degrees with respect to the X-axis direction and the inclination degrees with respect to the Y-axis direction of the respective columnar members independent of each other are necessary, and the structure of the whole device inevitably becomes complicated.

For example, as illustrated in the above-described Patent Documents, when a sensor using capacitance elements is utilized as a sensor for measuring an inclination degree, in order to measure both an inclination degree with respect to the X-axis direction and an inclination degree with respect to the Y-axis direction of one columnar member, capacitance elements must be disposed in the positive direction and the negative direction of the X-axis and in the positive direction and the negative direction of the Y-axis. In a device thus requiring many capacitance elements, the wiring is also inevitably complicated, and the structure of the whole device becomes complicated and the manufacturing cost increases.

SUMMARY OF THE INVENTION

Therefore, an object of the present invention is to provide a force detection device with a simpler structure.

(1) The first feature of the present invention resides in a force detection device which detects a force applied in a predetermined direction in an XYZ three-dimensional coordinate system, comprising:

an upper substrate having a substrate surface parallel to an XY plane;

a lower substrate having a substrate surface parallel to the XY plane and disposed below the upper substrate;

a first columnar member having an upper end directly or indirectly joined to a lower surface of the upper substrate, and a lower end directly or indirectly joined to an upper surface of the lower substrate;

a second columnar member having an upper end directly or indirectly joined to the lower surface of the upper substrate, and a lower end directly or indirectly joined to the upper surface of the lower substrate; and a detector which outputs an electric signal showing an applied force based on displacements of the first columnar member and the second columnar member, wherein a vicinity of a joined portion to which the lower end of the first columnar member is joined with the lower substrate constitutes a first lower film portion with flexibility;

a vicinity of a joined portion to which the lower end of the second columnar member is joined with the lower substrate constitutes a second lower film portion with flexibility;

a projection image obtained by orthogonally projecting a central axis of the first columnar member onto an XZ plane is inclined in a first direction with respect to a Z-axis, and a projection image obtained by orthogonally projecting a central axis of the second columnar member onto the XZ plane is inclined in a second direction opposite to the first direction with respect to the Z-axis; and the detector includes a first sensor which detects a displacement in the Z-axis direction of the first lower film portion and a second sensor which detects a displacement in the Z-axis direction of the second lower film portion, and outputs an electric signal showing a difference between a detection value of the first sensor and a detection value of the second sensor as a detection value of a force Fx in an X-axis direction applied to the upper substrate in a state where the lower substrate is fixed.

(2) The second feature of the present invention resides in the force detection device of the first feature, wherein the detector further outputs an electric signal showing a sum of a detection value of the first sensor and a detection value of the second sensor as a detection value of a force Fz in the Z-axis direction applied to the upper substrate in the state where the lower substrate is fixed.

(3) The third feature of the present invention resides in the force detection device of the first or second feature, wherein a first lower groove and a second lower groove are formed on an upper surface or a lower surface of the lower substrate, a first lower film portion is formed by a bottom portion of the first lower groove, and a second lower film portion is formed by a bottom portion of the second lower groove.

(4) The fourth feature of the present invention resides in the force detection device of the third feature, wherein each lower groove is formed on the upper surface of the lower substrate, a projection extending upward from a bottom surface of each lower groove to a substrate surface position is provided inside the lower groove, and the lower end of each columnar member is joined to the lower film portion via the projection.

(5) The fifth feature of the present invention resides in the force detection device of the first or second feature, wherein the lower substrate is formed of a flexible substrate, the first lower film portion is formed by a part of the flexible substrate, and the second lower film portion is formed by another part of the flexible substrate.

(6) The sixth feature of the present invention resides in the force detection device of any of the first to fifth features, wherein a vicinity of a joined portion to which the upper end of the first columnar member is joined with the upper substrate constitutes a first upper film portion with flexibility, and a vicinity of a joined portion to which the upper end of the second columnar member is joined with the upper substrate constitutes a second upper film portion with flexibility.

(7) The seventh feature of the present invention resides in the force detection device of the sixth feature, wherein a first upper groove and a second upper groove are formed on an upper surface or a lower surface of the upper substrate, and a first upper film portion is formed by a bottom portion of the first upper groove, and a second upper film portion is formed by a bottom portion of the second upper groove.

(8) The eighth feature of the present invention resides in the force detection device of the seventh feature, wherein each upper groove is formed on the lower surface of the upper substrate, a projection extending downward from a bottom surface of each upper groove to a substrate surface position is provided inside the upper groove, and the upper end of each columnar member is joined to the upper film portion via the projection.

(9) The ninth feature of the present invention resides in the force detection device of the sixth feature, wherein the upper substrate is formed of a flexible substrate, a first upper film portion is formed by a part of the flexible substrate, and a second upper film portion is formed by another part of the flexible substrate.

(10) The tenth feature of the present invention resides in the force detection device of any of the first to ninth features, wherein a central axis of the first columnar member and a central axis of the second columnar member are disposed on the XZ plane or a plane parallel to the XZ plane, and the first columnar member and the second columnar member are symmetrical about a YZ plane.

(11) The eleventh feature of the present invention resides in the force detection device of any of the first to tenth features, wherein a first sensor consists of a first capacitance element including: a first displacement electrode formed on the first lower film portion; and a first fixed electrode fixed to a position opposed to the first displacement electrode, and a second sensor consists of a second capacitance element including: a second displacement electrode formed on the second lower film portion; and a second fixed electrode fixed to a position opposed to the second displacement electrode.

(12) The twelfth feature of the present invention resides in the force detection device of the eleventh feature, wherein the lower substrate is made of a conductive material, the first lower film portion itself functions as a first displacement electrode, and the second lower film portion itself functions as a second displacement electrode.

(13) The thirteenth feature of the present invention resides in the force detection device of the eleventh or twelfth feature, further comprising:

an auxiliary substrate fixed to the lower surface of the lower substrate, wherein a first auxiliary groove is formed at a position below the first lower film portion on an upper surface of the auxiliary substrate, a second auxiliary groove is formed at a position below the second lower film portion on the upper surface of the auxiliary substrate, and a first fixed electrode is formed on a bottom surface of the first auxiliary groove, and a second fixed electrode is formed on a bottom surface of the second auxiliary groove.

(14) The fourteenth feature of the present invention resides in a force detection device which detects a force applied in a predetermined direction in an XYZ three-dimensional coordinate system, comprising:

a first columnar member and a second columnar member disposed so as to incline in predetermined directions with respect to a Z-axis defined in an up-down direction;

an upper structural body disposed above the first columnar member and the second columnar member;

a lower structural body disposed below the first columnar member and the second columnar member; and a detector which outputs an electric signal showing an applied force based on displacements of the first columnar member and the second columnar member, wherein an upper end of the first columnar member is directly or indirectly joined to a lower surface of the upper structural body, and a lower end of the first columnar member is directly or indirectly joined to an upper surface of the lower structural body;

an upper end of the second columnar member is directly or indirectly joined to a lower surface of the upper structural body, and a lower end of the second columnar member is directly or indirectly joined to an upper surface of the lower structural body;

a projection image obtained by orthogonally projecting a central axis of the first columnar member onto an XZ plane is inclined in a first direction with respect to the Z-axis, and a projection image obtained by orthogonally projecting a central axis of the second columnar member onto the XZ plane is inclined in a second direction opposite to the first direction with respect to the Z-axis;

at least a part of "the lower structural body" and at least a part of "the upper structural body, the first columnar member, the second columnar member, and their mutual connection portions" have flexibility so as to change the inclination state of the first columnar member and the second columnar member and allow the upper structural body to be displaced when an external force is applied to the upper structural body in a state where the lower structural body is fixed to a predetermined position; and the detector includes a first sensor which detects a displacement in the Z-axis direction of the lower end of the first columnar member and a second sensor which detects a displacement in the Z-axis direction of the lower end of the second columnar member, and outputs an electric signal showing a difference between a detection value of the first sensor and a detection value of the second sensor as a detection value of a force Fx in an X-axis direction applied to the upper structural body in the state where the lower structural body is fixed to the predetermined position.

(15) The fifteenth feature of the present invention resides in the force detection device of the fourteenth feature, wherein the detector further outputs an electric signal showing a sum of a detection value of the first sensor and a detection value of the second sensor as a detection value of a force Fz in the Z-axis direction applied to the upper structural body in the state where the lower structural body is fixed to a predetermined position.

(16) The sixteenth feature of the present invention resides in the force detection device of the fourteenth or fifteenth feature, wherein a central axis of the first columnar member and a central axis of the second columnar member are disposed on the XZ plane or a plane parallel to the XZ plane, and the first columnar member and the second columnar member are symmetrical about a YZ plane.

(17) The seventeenth feature of the present invention resides in the force detection device of any of the fourteenth to sixteenth features, further comprising:

an auxiliary substrate fixed below the lower structural body via a predetermined space, wherein the first sensor consists of a first capacitance element including: a first displacement electrode formed at a position to which the lower end of the first columnar member is joined with the lower structural body; and a first fixed electrode fixed to a position opposed to the first displacement electrode on an upper surface of the auxiliary substrate, and the second sensor consists of a second capacitance element including: a second displacement electrode formed at a position to which the lower end of the second columnar member is joined with the lower structural body; and a second fixed electrode fixed to a position opposed to the second displacement electrode on an upper surface of the auxiliary substrate.

(18) The eighteenth feature of the present invention resides in the force detection device of the seventeenth feature, wherein the lower structural body is made of a conductive material, a portion to which the lower end of the first columnar member is joined with the lower structural body functions as a first displacement electrode, and a portion to which the lower end of the second columnar member is joined with the lower structural body functions as a second displacement electrode.

(19) The nineteenth feature of the present invention resides in a force detection device which detects forces applied in predetermined directions in an XYZ three-dimensional coordinate system, comprising:

an upper substrate having a substrate surface parallel to an XY plane;

a lower substrate having a substrate surface parallel to the XY plane and disposed below the upper substrate;

first to fourth X-axis columnar members having upper ends directly or indirectly joined to a lower surface of the upper substrate, and lower ends directly or indirectly joined to an upper surface of the lower substrate;

first to fourth Y-axis columnar members having upper ends directly or indirectly joined to the lower surface of the upper substrate, and lower ends directly or indirectly joined to the upper surface of the lower substrate; and a detector which outputs electric signals showing applied forces based on displacements of the first to fourth X-axis columnar members and the first to fourth Y-axis columnar members, wherein vicinities of joined portions to which the lower ends of the first to fourth X-axis columnar members are joined with the lower substrate constitute first to fourth X-axis lower film portions with flexibility;

vicinities of joined portions to which the lower ends of the first to fourth Y-axis columnar members are joined with the lower substrate constitute first to fourth Y-axis lower film portions with flexibility;

a central axis of the first X-axis columnar member and a central axis of the second X-axis columnar member are included in an X-axis positive side orthogonal plane orthogonal to an X-axis in a positive region of the X-axis, and are inclined mutually opposite with respect to an XZ plane;

a central axis of the third X-axis columnar member and a central axis of the fourth X-axis columnar member are included in an X-axis negative side orthogonal plane orthogonal to the X-axis in a negative region of the X-axis, and are inclined mutually opposite with respect to the XZ plane;

a central axis of the first Y-axis columnar member and a central axis of the second Y-axis columnar member are included in a Y-axis positive side orthogonal plane orthogonal to the Y-axis in the positive region of the Y-axis, and are inclined mutually opposite with respect to the YZ plane;

a central axis of the third Y-axis columnar member and a central axis of the fourth Y-axis columnar member are included in a Y-axis negative side orthogonal plane orthogonal to the Y-axis in the negative region of the Y-axis, and are inclined mutually opposite with respect to the YZ plane; and the detector includes: a first X-axis sensor which detects a displacement in the Z-axis direction of the first X-axis lower film portion; a second X-axis sensor which detects a displacement in the Z-axis direction of the second X-axis lower film portion; a third X-axis sensor which detects a displacement in the Z-axis direction of the third X-axis lower film portion; a fourth X-axis sensor which detects a displacement in the Z-axis direction of the fourth X-axis lower film portion; a first Y-axis sensor which detects a displacement in the Z-axis direction of the first Y-axis lower film portion; a second Y-axis sensor which detects a displacement in the Z-axis direction of the second Y-axis lower film portion; a third Y-axis sensor which detects a displacement in the Z-axis direction of the third Y-axis lower film portion; and a fourth Y-axis sensor which detects a displacement in the Z-axis direction of the fourth Y-axis lower film portion, and outputs electric signals obtained based on detection values of the sensors as detection values of forces applied to the upper substrate in the state where the lower substrate is fixed.

(20) The twentieth feature of the present invention resides in the force detection device of the nineteenth feature, wherein first to fourth X-axis lower grooves and first to fourth Y-axis lower grooves are formed on an upper surface or a lower surface of the lower substrate, bottom portions of the first to fourth X-axis lower grooves form first to fourth X-axis lower film portions, and bottom portions of the first to fourth Y-axis lower grooves form first to fourth lower film portions.

(21) The twenty-first feature of the present invention resides in the force detection device of the nineteenth feature, wherein a lower annular groove is formed on the upper surface or the lower surface of the lower substrate, and portions of a bottom of the lower annular groove form first to fourth X-axis lower film portions and first to fourth Y-axis lower film portions.

(22) The twenty-second feature of the present invention resides in the force detection device of the twentieth or twenty-first feature, wherein each lower groove or the lower annular groove is formed on the upper surface of the lower substrate, a projection extending upward from a bottom surface of each lower groove or the lower annular groove to a substrate surface position is provided inside each lower groove or the lower annular groove, and the lower end of each columnar member is joined to the lower film portion via the projection.

(23) The twenty-third feature of the present invention resides in the force detection device of the nineteenth feature, wherein the lower substrate is formed of a flexible substrate, and portions of the flexible substrate form the first to fourth X-axis lower film portions and the first to fourth Y-axis lower film portions.

(24) The twenty-fourth feature of the present invention resides in the force detection device of any of the nineteenth to twenty-third features, wherein vicinities of joined portions to which the upper ends of the first to fourth X-axis columnar members are joined with the upper substrate constitute first to fourth X-axis upper film portions with flexibility, and vicinities of joined portions to which the upper ends of the first to fourth Y-axis columnar members are joined with the upper substrate constitute first to fourth Y-axis upper film portions with flexibility.

(25) The twenty-fifth feature of the present invention resides in the force detection device of the twenty-fourth feature, wherein first to fourth X-axis upper grooves and first to fourth Y-axis upper grooves are formed on an upper surface or a lower surface of the upper substrate, bottom portions of the first to fourth X-axis upper grooves form first to fourth X-axis upper film portions, and bottom portions of the first to fourth Y-axis upper grooves form first to fourth Y-axis upper film portions.

(26) The twenty-sixth feature of the present invention resides in the force detection device of the twenty-fourth feature, wherein an upper annular groove is formed on an upper surface or a lower surface of the upper substrate, and portions of bottom of the upper annular groove form first to fourth X-axis upper film portions and first to fourth Y-axis upper film portions.

(27) The twenty-seventh feature of the present invention resides in the force detection device of the twenty-fifth or twenty-sixth feature, wherein each upper groove or the upper annular groove is formed on the lower surface of the upper substrate, a projection extending downward from a bottom surface of each upper groove or the upper annular groove to a substrate surface position is provided inside each upper groove or the upper annular groove, and the upper end of each columnar member is joined to the upper film portion via the projection.

(28) The twenty-eighth feature of the present invention resides in the force detection device of the twenty-fourth feature, wherein the upper substrate is formed of a flexible substrate, and portions of the flexible substrate form first to fourth X-axis upper film portions and first to fourth Y-axis upper film portions.

(29) The twenty-ninth feature of the present invention resides in the force detection device of the twenty-eighth feature, wherein a coupling member is firmly fixed to a predetermined position on the upper surface of the upper substrate except for the first to fourth X-axis upper film portions and the first to fourth Y-axis upper film portions, and above the coupling member, a force receiver for receiving a force as a detection target is joined.

(30) The thirtieth feature of the present invention resides in the force detection device of any of the twenty-third, twenty-eighth or twenty-ninth feature, wherein when four regions of a region including the first X-axis upper/lower film portion and the second X-axis upper/lower film portion, a region including the third X-axis upper/lower film portion and the fourth X-axis upper/lower film portion, a region including the first Y-axis upper/lower film portion and the second Y-axis upper/lower film portion, and a region including the third Y-axis upper/lower film portion and the fourth Y-axis upper/lower film portion, are defined on the flexible substrate, along boundaries of these four regions, slits are formed from an outer peripheral toward a central portion of the flexible substrate.

(31) The thirty-first feature of the present invention resides in a force detection device which detects forces applied in predetermined directions in an XYZ three-dimensional coordinate system, comprising:

an upper structural body expanding on a plane parallel to an XY plane;

a lower structural body expanding on a plane parallel to the XY plane and disposed below the upper structural body;

first to fourth X-axis columnar members having upper ends directly or indirectly joined to a lower surface of the upper structural body, and lower ends directly or indirectly joined to an upper surface of the lower structural body;

first to fourth Y-axis columnar members having upper ends directly or indirectly joined to a lower surface of the upper structural body, and lower ends directly or indirectly joined to an upper surface of the lower structural body; and a detector which outputs electric signals showing applied forces based on displacements of the first to fourth X-axis columnar members and the first to fourth Y-axis columnar members, wherein a central axis of the first X-axis columnar member and a central axis of the second X-axis columnar member are included in an X-axis positive side orthogonal plane orthogonal to an X-axis in a positive region of the X-axis, and are inclined mutually opposite with respect to an XZ plane;

a central axis of the third X-axis columnar member and a central axis of the fourth X-axis columnar member are included in an X-axis negative side orthogonal plane orthogonal to the X-axis in a negative region of the X-axis, and are inclined mutually opposite with respect to the XZ plane;

a central axis of the first Y-axis columnar member and a central axis of the second Y-axis columnar member are included in a Y-axis positive side orthogonal plane orthogonal to a Y-axis in a positive region of the Y-axis, and are inclined mutually opposite with respect to a YZ plane;

a central axis of the third Y-axis columnar member and a central axis of the fourth Y-axis columnar member are included in a Y-axis negative side orthogonal plane orthogonal to the Y-axis in a negative region of the Y-axis, and are inclined mutually opposite with respect to the YZ plane; and the detector includes: a first X-axis sensor which detects a displacement in a Z-axis direction of the lower end of the first X-axis columnar member; a second X-axis sensor which detects a displacement in the Z-axis direction of the lower end of the second X-axis columnar member; a third X-axis sensor which detects a displacement in the Z-axis direction of the lower end of the third X-axis columnar member; a fourth X-axis sensor which detects a displacement in the Z-axis direction of the lower end of the fourth X-axis columnar member; a first Y-axis sensor which detects a displacement in the Z-axis direction of the lower end of the first Y-axis columnar member; a second Y-axis sensor which detects a displacement in the Z-axis direction of the lower end of the second Y-axis columnar member; a third Y-axis sensor which detects a displacement in the Z-axis direction of the lower end of the third Y-axis columnar member; and a fourth Y-axis sensor which detects a displacement in the Z-axis direction of the lower end of the fourth Y-axis columnar member, and outputs electric signals obtained based on detection values of the sensors as detection values of forces applied to the upper structural body in a state where the lower structural body is fixed to a predetermined position.

(32) The thirty-second feature of the present invention resides in the force detection device of the thirty-first feature, wherein the lower structural body includes a central portion positioned on the Z-axis, and eight branch portions having flexibility extending from a central portion to connection positions to the lower ends of the first to fourth X-axis columnar members and connection positions to the lower ends of the first to fourth Y-axis columnar members, respectively.

(33) The thirty-third feature of the present invention resides in the force detection device of any of the nineteenth to thirty-second features, wherein an orthogonal projection image of the first X-axis columnar member onto an XY plane and an orthogonal projection image of the first Y-axis columnar member onto the XY plane are positioned in a first quadrant of an XY coordinate system, an orthogonal projection image of the third X-axis columnar member onto the XY plane and an orthogonal projection image of the second Y-axis columnar member onto the XY plane are positioned in a second quadrant of the XY coordinate system, an orthogonal projection image of the fourth X-axis columnar member onto the XY plane and an orthogonal projection image of the fourth Y-axis columnar member onto the XY plane are positioned in a third quadrant of the XY coordinate system, and an orthogonal projection image of the second X-axis columnar member onto the XY plane and an orthogonal projection image of the third Y-axis columnar member onto the XY plane are positioned in a fourth quadrant of the XY coordinate system.

(34) The thirty-fourth feature of the present invention resides in the force detection device of the thirty-third feature, wherein a main structural body constituted by "first to fourth X-axis columnar members," "first to fourth Y-axis columnar members," "upper substrate or upper structural member," and "lower substrate or lower structural body" is symmetrical about an XZ plane, and is also symmetrical about a YZ plane.

(35) The thirty-fifth feature of the present invention resides in the force detection device of the thirty-fourth feature, wherein the detector outputs:

a signal value V(Fx)* corresponding to a sum of "a difference between a detection value of the first Y-axis sensor and a detection value of the second Y-axis sensor" and "a difference between a detection value of the third Y-axis sensor and a detection value of the fourth Y-axis sensor" as a detection value of an applied force Fx in an X-axis direction; and a signal value V(Fy)* corresponding to a sum of "a difference between a detection value of the first X-axis sensor and a detection value of the second X-axis sensor" and "a difference between a detection value of the third X-axis sensor and a detection value of the fourth X-axis sensor" as a detection value of an applied force Fy in a Y-axis direction.

(36) The thirty-sixth feature of the present invention resides in the force detection device of the thirty-fifth feature, wherein the detector further outputs:

a signal value V(Mx) corresponding to a difference between "a sum of a detection value of the third Y-axis sensor and a detection value of the fourth Y-axis sensor" and "a sum of a detection value of the first Y-axis sensor and a detection value of the second Y-axis sensor" as a detection value of an applied moment Mx around the X-axis; and a signal value V(My) corresponding to a difference between "a sum of a detection value of the first X-axis sensor and a detection value of the second X-axis sensor" and "a sum of a detection value of the third X-axis sensor and a detection value of the fourth X-axis sensor" as a detection value of an applied moment My around the Y-axis.

(37) The thirty-seventh feature of the present invention resides in the force detection device of the thirty-fourth feature, wherein the detector outputs:

a signal value V(Mx) corresponding to a difference between "a sum of a detection value of the third Y-axis sensor and a detection value of the fourth Y-axis sensor" and "a sum of a detection value of the first Y-axis sensor and a detection value of the second Y-axis sensor" as a detection value of an applied moment Mx around an X-axis; and a signal value V(My) corresponding to a difference between "a sum of a detection value of the first X-axis sensor and a detection value of the second X-axis sensor" and "a sum of a detection value of the third X-axis sensor and a detection value of the fourth X-axis sensor" as a detection value of an applied moment My around a Y-axis.

(38) The thirty-eighth feature of the present invention resides in the force detection device of the thirty-seventh feature, wherein the detector further calculates:

a signal value V(Fx)* corresponding to a sum of "a difference between a detection value of the first Y-axis sensor and a detection value of the second Y-axis sensor" and "a difference between a detection value of the third Y-axis sensor and a detection value of the fourth Y-axis sensor" and a signal value V(Fy)* corresponding to a sum of "a difference between a detection value of the first X-axis sensor and a detection value of the second X-axis sensor" and "a difference between a detection value of the third X-axis sensor and a detection value of the fourth X-axis sensor," and outputs:

a signal value V(Fx) corresponding to a value obtained according to an expression of "V(Fx)*−k2/k1·V (My)" as a detection value of an applied force Fx in the X-axis direction; and a signal value V(Fy) corresponding to a value obtained according to an expression of "V(Fy)*−k4/k3·V (Mx)" as a detection value of an applied force Fy in the Y-axis direction, by using predetermined coefficients k1 to k4.

(39) The thirty-ninth feature of the present invention resides in the force detection device of any of the thirty-fifth to thirty-eighth features, wherein the detector further outputs:

a signal value V(Fz) corresponding to "a sum of detection values of the first to fourth X-axis sensors," "a sum of detection values of first to fourth Y-axis sensors," or "a total of a sum of detection values of the first to fourth X-axis sensors and a sum of detection values of the first to fourth Y-axis sensors" as a detection value of an applied force Fz in a Z-axis direction.

(40) The fortieth feature of the present invention resides in the force detection device of any of the thirty-fifth to thirty-ninth features, wherein the detector further outputs:

a signal value V(Mz) corresponding to a sum of "a difference between a detection value of the first X-axis sensor and a detection value of the second X-axis sensor," "a difference between a detection value of the fourth X-axis sensor and a detection value of the third X-axis sensor," "a difference between a detection value of the second Y-axis sensor and a detection value of the first Y-axis sensor," and "a difference between a detection value of the third Y-axis sensor and a detection value of the fourth Y-axis sensor" as a detection value of an applied moment Mz around a Z-axis.

(41) The forty-first feature of the present invention resides in the force detection device of any of the nineteenth to fortieth features, wherein each sensor consists of a capacitance element including: a displacement electrode formed on the lower film portion or the lower structural body; and a fixed electrode fixed to a position opposed to the displacement electrode.

(42) The forty-second feature of the present invention resides in the force detection device of any of the nineteenth to thirtieth features, wherein the first X-axis sensor consists of a first X-axis capacitance element including: a first X-axis displacement electrode formed on the first X-axis lower film portion; and a first X-axis fixed electrode fixed to a position opposed to the first X-axis displacement electrode, the second X-axis sensor consists of a second X-axis capacitance element including: a second X-axis displacement electrode formed on the second X-axis lower film portion; and a second X-axis fixed electrode fixed to a position opposed to the second X-axis displacement electrode, the third X-axis sensor consists of a third X-axis capacitance element including: a third X-axis displacement electrode formed on the third X-axis lower film portion; and a third X-axis fixed electrode fixed to a position opposed to the third X-axis displacement electrode, the fourth X-axis sensor consists of a fourth X-axis capacitance element including: a fourth X-axis displacement electrode formed on the fourth X-axis lower film portion; and a fourth X-axis fixed electrode fixed to a position opposed to the fourth X-axis displacement electrode, the first Y-axis sensor consists of a first Y-axis capacitance element including: a first Y-axis displacement electrode formed on the first Y-axis lower film portion; and a first Y-axis fixed electrode fixed to a position opposed to the first Y-axis displacement electrode, the second Y-axis sensor consists of a second Y-axis capacitance element including: a second Y-axis displacement electrode formed on the second Y-axis lower film portion; and a second Y-axis fixed electrode fixed to a position opposed to the second Y-axis displacement electrode, the third Y-axis sensor consists of a third Y-axis capacitance element including: a third Y-axis displacement electrode formed on the third Y-axis lower film portion; and a third Y-axis fixed electrode fixed to a position opposed to the third Y-axis displacement electrode, the fourth Y-axis sensor consists of a fourth Y-axis capacitance element including: a fourth Y-axis displacement electrode formed on the fourth Y-axis lower film portion; and a fourth Y-axis fixed electrode fixed to a position opposed to the fourth Y-axis displacement electrode, and the detector outputs electric signals obtained based on a static capacitance fluctuation value $Cx1$ of the first X-axis capacitance element, a static capacitance fluctuation value $Cx2$ of the second X-axis capacitance element, a static capacitance fluctuation value $Cx3$ of the third X-axis capacitance element, a static capacitance fluctuation value $Cx4$ of the fourth X-axis capacitance element, a static capacitance fluctuation value $Cy1$ of the first Y-axis capacitance element, a static capacitance fluctuation value $Cy2$ of the second Y-axis capacitance element, a static capacitance fluctuation value $Cy3$ of the third Y-axis capacitance element, a static capacitance fluctuation value $Cy4$ of the fourth Y-axis capacitance element, as detection values.

(43) The forty-third feature of the present invention resides in the force detection device of the forty-second feature, wherein the lower substrate is made of a conductive material, and the first to fourth X-axis lower film portions themselves, respectively, function as first to fourth X-axis displacement electrodes, and the first to fourth Y-axis lower film portions themselves, respectively, function as first to fourth Y-axis displacement electrodes.

(44) The forty-fourth feature of the present invention resides in the force detection device of the forty-second or forty-third feature, further comprising:

an auxiliary substrate firmly fixed to a lower surface of the lower substrate, wherein first to fourth X-axis auxiliary grooves are formed at positions below the first to fourth X-axis lower film portions on an upper surface of the auxiliary substrate, and first to fourth Y-axis auxiliary grooves are formed at positions below the first to fourth Y-axis lower film portions on the upper surface of the auxiliary substrate, and first to fourth X-axis fixed electrodes are formed on bottom surfaces of the first to fourth X-axis auxiliary grooves, and first to fourth Y-axis fixed electrodes are formed on bottom surfaces of the first to fourth Y-axis auxiliary grooves.

(45) The forty-fifth feature of the present invention resides in the force detection device of the forty-second or forty-third feature, further comprising:

an auxiliary substrate firmly fixed to a lower surface of the lower substrate, wherein an annular auxiliary groove which couples positions below the first to fourth X-axis lower film portions and positions below the first to fourth Y-axis lower film portions on an upper surface of the auxiliary substrate is formed, and first to fourth X-axis fixed electrodes and first to fourth Y-axis fixed electrodes are formed on a bottom surface of the annular auxiliary groove.

(46) The forty-sixth feature of the present invention resides in the force detection device of the forty-second or forty-third feature, wherein a spacer member is firmly fixed to a predetermined position on a lower surface of the lower substrate except for the first to fourth X-axis lower film portions and the first to fourth Y-axis lower film portions, an auxiliary substrate is firmly fixed below the spacer member, and first to fourth X-axis fixed electrodes and first to fourth Y-axis fixed electrodes are formed on an upper surface of the auxiliary substrate.

(47) The forty-seventh feature of the present invention resides in the force detection device of the thirty-second feature, further comprising:

an auxiliary substrate fixed below the lower structural body via a predetermined space, wherein the first X-axis sensor consists of a first X-axis capacitance element including: a first X-axis displacement electrode formed on a branch portion extending to a connection position to the lower end of the first X-axis columnar member; and a first X-axis fixed electrode fixed to a position opposed to the first X-axis displacement electrode on an upper surface of the auxiliary substrate, the second X-axis sensor consists of a second X-axis capacitance element including: a second X-axis displacement electrode formed on a branch portion extending to a connection position to the lower end of the second X-axis columnar member; and a second X-axis fixed electrode fixed to a position opposed to the second X-axis displacement electrode on the upper surface of the auxiliary substrate, the third X-axis sensor consists of a third X-axis capacitance element including: a third X-axis displacement electrode formed on a branch portion extending to a connection position to the lower end of the third X-axis columnar member; and a third X-axis fixed electrode fixed to a position opposed to the third X-axis displacement electrode on the upper surface of the auxiliary substrate, the fourth X-axis sensor consists of a fourth X-axis capacitance element including: a fourth X-axis displacement electrode formed on a branch portion extending to a connection position to the lower end of the fourth X-axis columnar member; and a fourth X-axis fixed electrode fixed to a position opposed to the fourth X-axis displacement electrode on the upper surface of the auxiliary substrate, the first Y-axis sensor consists of a first Y-axis capacitance element including: a first Y-axis displacement electrode formed on a branch portion extending to a connection position to the lower end of the first Y-axis columnar member; and a first Y-axis fixed electrode fixed to a position opposed to the first Y-axis displacement electrode on the upper surface of the auxiliary substrate, the second Y-axis sensor consists of a second Y-axis capacitance element including: a second Y-axis displacement electrode formed on a branch portion extending to a connection position to the lower end of the second Y-axis columnar member; and a second Y-axis fixed electrode fixed to a position opposed to the second Y-axis displacement electrode on the upper surface of the auxiliary substrate, the third Y-axis sensor consists of a third Y-axis capacitance element including: a third Y-axis displacement electrode formed on a branch portion extending to a connection position to the lower end of the third Y-axis columnar member; and a third Y-axis fixed electrode fixed to a position opposed to the third Y-axis displacement electrode on the upper surface of the auxiliary substrate, the fourth Y-axis sensor consists of a fourth Y-axis capacitance element including: a fourth Y-axis displacement electrode formed on a branch portion extending to a connection position to the lower end of the fourth Y-axis columnar member; and a fourth Y-axis fixed electrode fixed to a position opposed to the fourth Y-axis displacement electrode on the upper surface of the auxiliary substrate, and the detector outputs electric signals obtained based on a static capacitance fluctuation value $Cx1$ of the first X-axis capacitance element, a static capacitance fluctuation value $Cx2$ of the second X-axis capacitance element, a static capacitance fluctuation value $Cx3$ of the third X-axis capacitance element, a static capacitance fluctuation value $Cx4$ of the fourth X-axis capacitance element, a static capacitance fluctuation value $Cy1$ of the first Y-axis capacitance element, a static capacitance fluctuation value $Cy2$ of the second Y-axis capacitance element, a static capacitance fluctuation value $Cy3$ of the third Y-axis capacitance element, a static capacitance fluctuation value $Cy4$ of the fourth Y-axis capacitance element, as detection values.

(48) The forty-eighth feature of the present invention resides in the force detection device of the forty-seventh feature, wherein the lower structural body is made of a conductive material, and the branch portions themselves, respectively, function as first to fourth X-axis displacement electrodes and first to fourth Y-axis displacement electrodes.

(49) The forty-ninth feature of the present invention resides in the force detection device of the forty-eighth feature, wherein contact determining electrodes electrically insulated from the fixed electrodes are provided at positions opposed to tip end portions of the branch portions on the upper surface of the auxiliary surface so as to determine whether the tip end portions of the branch portions and the contact determining electrodes have come into physical contact with each other based on electric continuity states between these.

(50) The fiftieth feature of the present invention resides in the force detection device of the forty-ninth feature, wherein a pair of contact determining electrodes insulated from each other is provided at a position opposed to the tip end portion of a branch portion so as to determine whether the tip end portion of the branch portion and the pair of contact determining electrodes have come into physical contact with each other based on an electric continuity state between the pair of contact determining electrodes.

(51) The fifty-first feature of the present invention resides in the force detection device of the forty-eighth feature, wherein in an annular region which couples positions opposed to tip end portions of the branch portions on the upper surface of the auxiliary substrate, a contact determining annular electrode electrically insulated from the fixed electrodes is provided so as to determine whether the tip end portions of the branch portions and the contact determining annular electrode have come into physical contact with each other based on electric continuity states between these.

(52) The fifty-second feature of the present invention resides in the force detection device of the fifty-first feature, wherein in the annular region, a pair of contact determining annular electrodes which are insulated from each other and are concentric with each other are provided so as to determine whether the tip end portions of the branch portions and the pair of contact determining annular electrodes have come into physical contact with each other based on an electric continuity state between the pair of contact determining annular electrodes.

(53) The fifty-third feature of the present invention resides in the force detection device of any of the forty-ninth to fifty-second features, wherein a conduction path formed by physical contact between the contact determining electrode or the contact determining annular electrode and the branch portion constitutes a wiring path which electrically connects each displacement electrode and the detector.

(54) The fifty-fourth feature of the present invention resides in the force detection device of any of the forty-second to fifty-third features, wherein an orthogonal projection image of the first X-axis columnar member onto the XY plane and an orthogonal projection image of the first Y-axis columnar member onto the XY plane are positioned in a first quadrant of an XY coordinate system, an orthogonal projection image of the third X-axis columnar member onto the XY plane and an orthogonal projection image of the second Y-axis columnar member onto the XY plane are positioned in a second quadrant of the XY coordinate system, an orthogonal projection image of the fourth X-axis columnar member onto the XY plane and an orthogonal projection image of the fourth Y-axis columnar member onto the XY plane are positioned in a third quadrant of the XY coordinate system, and an orthogonal projection image of the second X-axis columnar member onto the XY plane and an orthogonal projection image of the third Y-axis columnar member onto the XY plane are positioned in a fourth quadrant of the XY coordinate system, the first to fourth X-axis columnar members are inclined so that the upper ends become closer to the XZ plane than the lower ends, the first to fourth Y-axis columnar members are inclined so that the upper ends become closer to the YZ plane than the lower ends, and a main structural body constituted by "the first to fourth X-axis columnar members," "the first to fourth Y-axis columnar members," "the upper substrate or the upper structural body," and "the lower substrate or the lower structural body" is symmetrical about the XZ plane, and is also symmetrical about the YZ plane.

(55) The fifty-fifth feature of the present invention resides in the force detection device of the fifty-fourth feature, wherein the detector outputs:

a signal value V(Fx)* corresponding to a value obtained according to an expression of "(Cy1−Cy2)+(Cy3−Cy4)" as a detection value of an applied force Fx in an X-axis direction; and a signal value V(Fy)* corresponding to a value obtained according to an expression of "(Cx1−Cx2)+(Cx3−Cx4)" as a detection value of an applied force Fy in a Y-axis direction.

(56) The fifty-sixth feature of the present invention resides in the force detection device of the fifty-fifth feature, wherein the detector further outputs:

a signal value V(Mx) corresponding to a value obtained according to an expression of "(Cy3+Cy4)−(Cy1+Cy2)" as a detection value of an applied moment Mx around the X-axis; and a signal value V(My) corresponding to a value obtained according to an expression of "(Cx1+Cx2)−(Cx3+Cx4)" as a detection value of an applied moment My around the Y-axis.

(57) The fifty-seventh feature of the present invention resides in the force detection device of the fifty-fourth feature, wherein the detector outputs:

a signal value V(Mx) corresponding to a value obtained according to an expression of "(Cy3+Cy4)−(Cy1+Cy2)" as a detection value of an applied moment Mx around an X-axis; and a signal value V(My) corresponding to a value obtained according to an expression of "(Cx1+Cx2)−(Cx3+Cx4)" as a detection value of an applied moment My around a Y-axis.

(58) The fifty-eighth feature of the present invention resides in the force detection device of the fifty-seventh feature, wherein the detector further outputs:

a signal value V(Fx) corresponding to a value obtained according to an expression of "(Cy1−Cy2)+(Cy3−Cy4)−k2/k1·V(My)" as a detection value of an applied force Fx in the X-axis direction; and a signal value V(Fy) corresponding to a value obtained according to an expression of "(Cx1−Cx2)+(Cx3−Cx4)−k4/k3·V(Mx)" as a detection value of an applied force Fy in the Y-axis direction, by using predetermined coefficients k1 to k4.

(59) The fifty-ninth feature of the present invention resides in the force detection device of any of the fifty-fifth to fifty-eighth features, wherein the detector further outputs a signal value V(Fz) corresponding to a value obtained according to an expression of:

"−(Cx1+Cx2+Cx3+Cx4+Cy1+Cy2+Cy3+Cy4)" or

"−(Cx1+Cx2+Cx3+Cx4)" or

"−(Cy1+Cy2+Cy3+Cy4)"

as a detection value of an applied force Fz in the Z-axis direction.

(60) The sixtieth feature of the present invention resides in the force detection device of any of the fifty-fifth to fifty-ninth features, wherein the detector further outputs:

a signal value V(Mz) corresponding to a value obtained according to an expression of:

"(Cx1−Cx2)+(Cx4−Cx3)+(Cy2−Cy1)+(Cy3−Cy4)"

as a detection value of an applied moment Mz around the Z-axis direction.

(61) The sixty-first, feature of the present invention resides in the force detection device of any of the first to sixtieth features, wherein a part or the whole of the columnar member is provided having flexibility so that the columnar member is deformed when an external force is applied.

(62) The sixty-second feature of the present invention resides in the force detection device of the sixty-first feature, wherein a constricted portion having flexibility is formed on a part of the columnar member so that the columnar member bends according to deformation of the constricted portion when an external force is applied.

(63) The sixty-third feature of the present invention resides in the force detection device of the sixty-first feature, wherein the entire columnar member is made of a material having flexibility so that the entire columnar member is deformed when an external force is applied.

A force detection device of the present invention is structured so that a pair of columnar members are laid across an upper substrate (upper structural body) and a lower substrate (lower structural body), and the pair of columnar members are inclined mutually opposite with respect to a vertical axis, and therefore, "an inclination state of the columnar members" can be measured as "a force applied in the vertical direction." Accordingly, as a sensor for measuring an inclination state of the columnar members, a sensor capable of detecting "a force applied in the vertical direction" is prepared. For example, when a sensor using capacitance elements is utilized, one capacitance element is disposed for one columnar member. Therefore, a force detection device with a very simple structure can be realized.

BRIEF DESCRIPTION OF THE DRAWINGS

FIG. 13 is a longitudinal sectional view. (A), (B), and (C) of FIG. 13 are longitudinal sectional views of the lower substrate 200 shown in FIG. 12, cut along the cutting lines A-A, B-B, and C-C, respectively.

FIG. 15 is a longitudinal sectional view. (A), (B), and (C) of FIG. 15 are longitudinal sectional views of the auxiliary substrate 300 shown in FIG. 14, cut along the cutting lines A-A, B-B, and C-C, respectively.

FIG. 26 is a table showing capacitance value changes of capacitance elements when six components of force components Fx, Fy, and Fz in the respective coordinate axis directions and moment components Mx, My, and Mz around the respective coordinate axes are applied to the force detection device shown in FIG. 8.

FIG. 27 is a view showing expressions to be used for detecting the six force components Fx, Fy, Fz, Mx, My, and Mz in the force detection device shown in FIG. 8.

DESCRIPTION OF THE PREFERRED EMBODIMENTS

Hereinafter, the present invention will be described based on embodiments shown in the figures.

<<<Section 1>>>
Force Detection Device Using Columnar Members Conventionally Proposed First, a basic structure and a basic principle of detection of a force detection device using the columnar members disclosed in each Patent Document described above will be described briefly.

Figure 1:
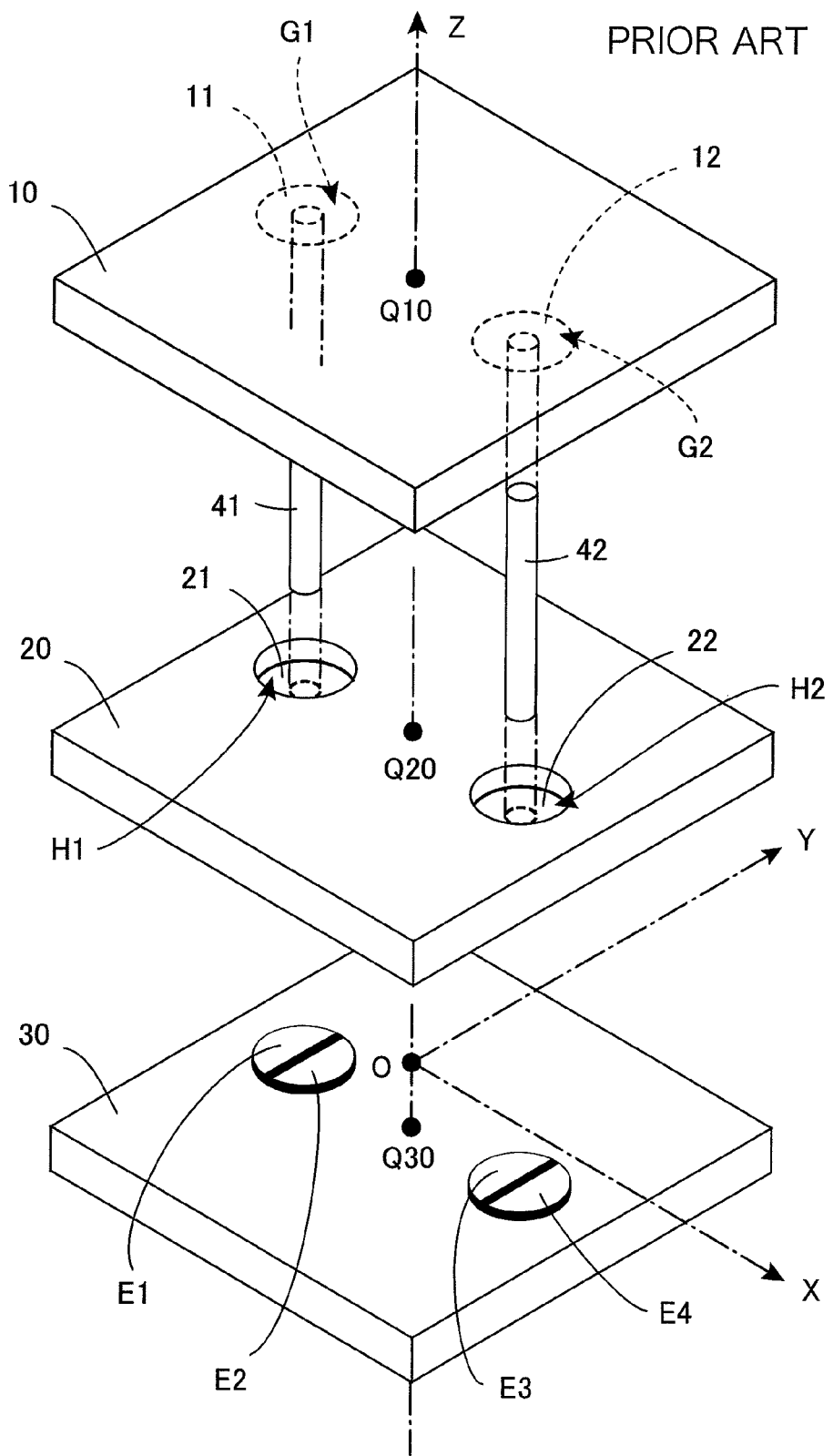
FIG. 1 is an exploded perspective view showing a basic structure of a force detection device using columnar members which are conventionally proposed.

FIG. 1 is an exploded perspective view showing a basic structure of such a conventional force detection device. As illustrated, this device includes an upper substrate 10, a lower substrate 20, an auxiliary substrate 30, a first columnar member 41, and a second columnar member 42. On the lower surface of the upper substrate 10, a first upper groove G1 and a second upper groove G2 (both grooves are circular) are formed, and the bottom portions of these grooves form a first upper film portion 11 and a second upper film portion 12 which have flexibility due to their thinness. On the other hand, on the upper surface of the lower substrate 20, a first lower groove H1 and a second lower groove H2 (both grooves are circular) are formed, and the bottom portions of these grooves form a first lower film portion 21 and a second lower film portion 22 which have flexibility due to their thinness.

The term "flexibility" mentioned herein means "property of elastic deformability" which causes deformation in response to action of an external force and then causes restoration after the external force is removed. In the application of the present invention, "with flexibility" means "causing sufficient deformation for obtaining a significant detection value of an applied external force." Therefore, strictly speaking, the portions without grooves of the upper substrate 10 and the lower substrate 20 shown in FIG. 1 may also deform by application of the external force, however, this deformation is very small in comparison with deformation of the bottom portions of the grooves. Therefore, the portions with "flexibility" described in the application of the present invention are the upper film portions 11 and 12 and the lower film portions 21 and 22 which are thin.

FIG. 1 is an exploded perspective view showing a state where the parts of this device are disassembled, however, in actuality, the upper end of the first columnar member 41 is joined to the center of the first upper film portion 11, and the lower end is joined to the center of the first lower film portion 21. Similarly, the upper end of the second columnar member 42 is joined to the center of the second upper film portion 12, and the lower end is joined to the center of the second lower film portion 22. In FIG. 1, the joining positions of the columnar members 41 and 42 to the substrates 10 and 20 are indicated by alternate long and short dashed lines. The columnar members 41 and 42 are cylindrical columnar members, and are disposed so that the central axes of these become orthogonal to the substrates 10 and 20.

Eventually, the upper substrate 10 and the lower substrate 20 are joined to each other via the two columnar members 41 and 42. However, the joined portions form film portions (diaphragms) having flexibility due to their thinness, and according to warping of the film portions the columnar members 41 and 42 are allowed to be displaced. Therefore, in a state where the lower substrate 20 is fixed, when an external force is applied to the upper substrate 10, the columnar members 41 and 42 are displaced, and the upper substrate 10 is displaced with respect to the lower substrate 20. In this detection principle of the force detection device, applied external forces are detected based on displacements of the columnar members 41 and 42.

The auxiliary substrate 30 is an insulating substrate fixed below the lower substrate 20 via a predetermined space, and on the upper surface of the auxiliary substrate 30, four semicircular fixed electrodes E1 to E4 are formed. Here, the pair of fixed electrodes E1 and E2 are opposed to the first lower film portion 21, and the pair of fixed electrodes E3 and E4 are opposed to the second lower film portion 22. By making the lower substrate 20 of a conductive material, the first lower film portion 21 and the second lower film portion 22 function as disk-shaped displacement electrodes.

Therefore, a first capacitance element C1 is formed by the left half portion of the first lower film portion 21 and the fixed electrode E1 opposed to the left half portion, and a second capacitance element C2 is formed by the right half portion of the first lower film portion 21 and the fixed electrode E2 opposed to the right half portion. Similarly, a third capacitance element C3 is formed by the left half portion of the second lower film portion 22 and the fixed electrode E3 opposed to the left half portion, and a fourth capacitance element C4 is formed by the right half portion of the second lower film portion 22 and the fixed electrode E4 opposed to the right half portion. These capacitance elements C1 to C4 function as sensors which detect displacements of the columnar members 41 and 42.

Here, for the sake of convenience, an XYZ three-dimensional coordinate system is defined as illustrated. The Z-axis is defined at a position penetrating through the center position of the three substrates 10, 20, and 30, makes an intersection Q10 with the upper surface of the upper substrate 10, makes an intersection Q20 with the upper surface of the lower substrate 20, and makes an intersection Q30 with the upper surface of the auxiliary substrate 30. On the other hand, the X-axis and the Y-axis are coordinate axes parallel to the substrate surfaces.

The position of the origin O of the coordinate system can be defined at, for example, the position of the intersections Q10, Q20, and Q30, however, herein, for consistency with the embodiments described later, the origin O is set at an intermediate position between the lower surface of the lower substrate 20 and the upper surface of the auxiliary substrate 30 on the Z-axis. The substrate surfaces of the three substrates 10, 20, and 30 (upper surfaces and lower surfaces except for the groove forming portions) are all parallel to the XY plane.

Figure 2A:
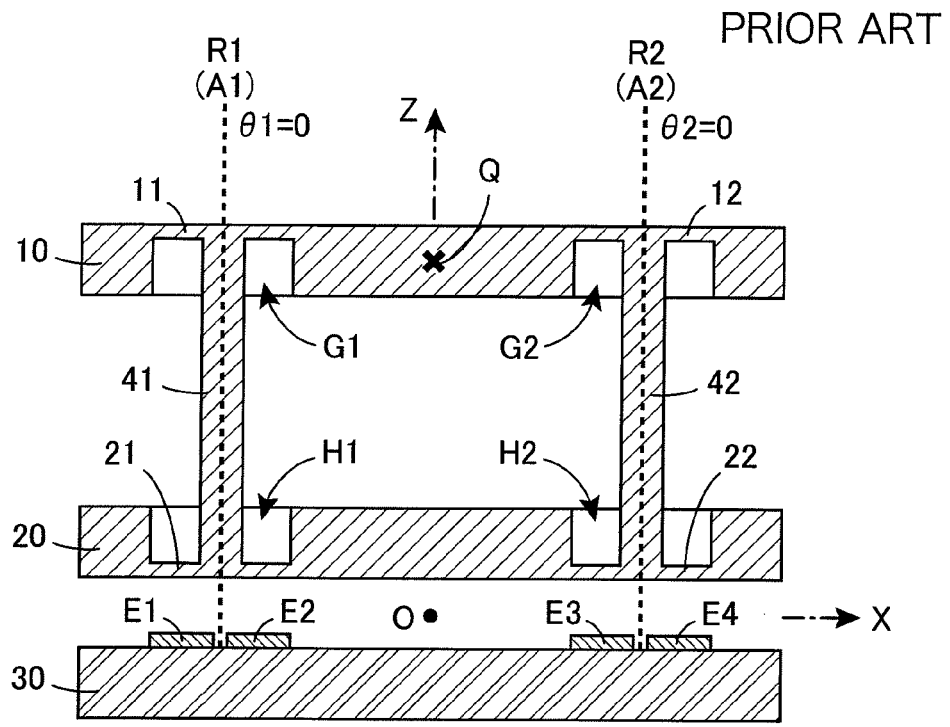
FIG. 2A is a longitudinal sectional view showing a detection principle of a force Fx in the X-axis direction by the force detection device shown in FIG. 1, showing this device in a section cut along the XZ plane.
Figure 2B:
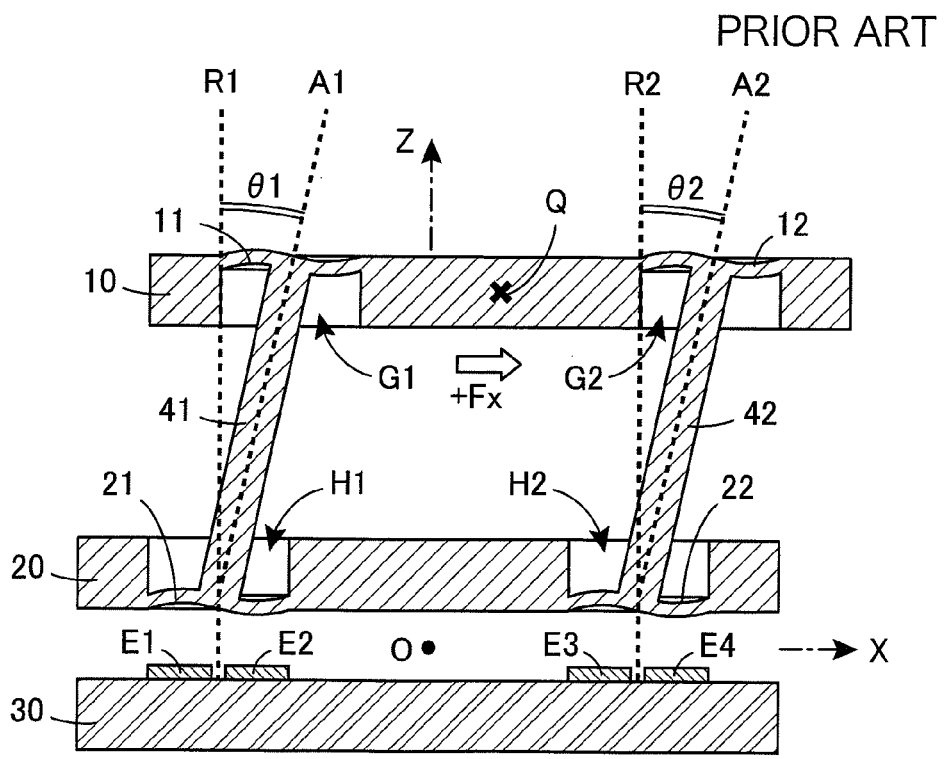
FIG. 2B is another longitudinal sectional view showing a detection principle of a force Fx in the X-axis direction by the force detection device shown in FIG. 1, showing this device in a section cut along the XZ plane.

FIGS. 2A and 2B are longitudinal sectional views (sectional views cut along the XZ plane of this device) showing the detection principle of the force Fx in the X-axis direction by the force detection device shown in FIG. 1. FIG. 2A is a longitudinal sectional view when the device configured by combining the parts shown in FIG. 1 is viewed from the front, and shows a state where no external force is applied to the device. The lower substrate 20 and the auxiliary substrate 30 are fixed to the illustrated positions by support members not shown. On the other hand, the upper substrate 10 is positioned just above the lower substrate 20 as illustrated in a state where no external force is applied. At this time, the central axes of the columnar members 41 and 42 are parallel to the Z-axis.

However, when an external force is applied, the film portions 11, 12, 21, and 22 warp, the columnar members 41 and 42 are displaced, and the upper substrate 10 itself is also displaced. FIG. 2B shows a displacement state when a force +Fx in the X-axis positive direction is applied to the point of application Q set at the position of the center of gravity of the upper substrate 10. As illustrated, two columnar members 41 and 42 are inclined in the X-axis positive direction (rightward in the figure), and the upper substrate 10 is displaced rightward. The greater the applied force +Fx, the larger the inclination degrees of the columnar members 41 and 42. When a force −Fx in the X-axis negative direction is applied, the columnar members 41 and 42 are inclined in the X-axis negative direction (leftward in the figure), and the upper substrate 10 is displaced leftward, inverse to the figure.

Here, when the central axes of the columnar members 41 and 42 are defined as A1 and A2, respectively, as shown in FIG. 2A, in a state where no external force is applied, the central axes A1 and A2 match vertical reference axes R1 and R2 (axes parallel to the Z-axis). Therefore, when the inclination angle of the central axis A1 with respect to the vertical reference axis R1 is defined as $\theta_1$ and the inclination angle of the central axis A2 with respect to the vertical reference axis R2 is defined as $\theta_2$, $\theta_1 = \theta_2 = 0$.

However, as shown in FIG. 2B, when an external force +Fx is applied to the point of application Q, the central axes A1 and A2 are inclined in the X-axis positive direction (rightward in the figure), the inclination angles $\theta_1$ and $\theta_2$ increase. For example, in the figure, when the inclination angles $\theta_1$ and $\theta_2$ are defined in the clockwise direction with respect to the vertical reference axes R1 and R2, if an external force +Fx is applied, the inclination angles $\theta_1$ and $\theta_2$ become positive values. On the contrary, when an external force −Fx is applied, the central axes A1 and A2 are inclined in the X-axis negative direction (leftward in the figure), so that the inclination angles $\theta_1$ and $\theta_2$ become negative values. Therefore, when the inclination angles $\theta_1$ and $\theta_2$ can be measured, the direction and magnitude of an external force Fx applied in the X-axis direction can be detected.

In the illustrated device, changes in the inclination angles $\theta_1$ and $\theta_2$ can be grasped from static capacitance values (indicated by the same reference symbols as those of capacitance elements C1 to C4) of four capacitance elements C1 to C4. For example, when the state shown in FIG. 2B is compared with the state shown in FIG. 2A, the distance between the fixed electrode E1 and the left half (displacement electrode) of the lower film portion 21 increases, so that the static capacitance value C1 decreases, and the distance between the fixed electrode E2 and the right half (displacement electrode) of the lower film portion 21 decreases, so that the static capacitance value C2 increases. Therefore, the inclination angle $\theta_1$ of the columnar member 41 can be obtained as a capacitance value difference "C2−C1." Similarly, the distance between the fixed electrode E3 and the left half (displacement electrode) of the lower film portion 22 increases, so that the static capacitance value C3 decreases, and the distance between the fixed electrode E4 and the right half (displacement electrode) of the lower film portion 22 decreases, so that the static capacitance value C4 increases. Accordingly, the inclination angle $\theta_2$ of the columnar member 42 can be obtained as a capacitance value difference "C4−C3." Therefore, the value "(C2−C1)+(C4−C3)" corresponding to the sum of the inclination angles $\theta_1$ and $\theta_2$ can be used as a detection value of the external force Fx applied in the X-axis direction.

Here, for convenience of description, a simple example in which a force Fx in the X-axis direction is detected by using two columnar members 41 and 42 is shown, however, the Patent Documents described above disclose a method in which a larger number of columnar members are provided, and by measuring inclinations in the X-axis positive and negative directions and inclinations in the Y-axis positive and negative directions of the individual columnar members, six components of force components Fx, Fy, and Fz in the respective coordinate axis directions and moment components Mx, My, and Mz around the coordinate axes are detected.

However, in this conventional force detection device, for measuring an inclination degree in a specific direction of a columnar member, sensors independent of each other are necessary, and the structure of the whole device becomes complicated as described above. For example, when a capacitance element is used as a sensor, two capacitance elements are necessary for measuring the inclination degree in the X-axis direction of one columnar member, and for measuring the inclination degrees in the X and Y axis directions, four capacitance elements are necessary.

<<<Section 2>>>
Force Detection Device of Basic Embodiment of the Present Invention The most important point in the present invention is the idea "a pair of columnar members connecting the upper substrate and the lower substrate are inclined mutually opposite." Specifically, in the techniques disclosed in the Patent Documents described above, it is assumed that columnar members are perpendicular to the substrate surface of the lower substrate in a standard state where no external force is applied. For example, in the example shown in FIG. 2A, the upper substrate 10 and the lower substrate 20 are disposed so that their substrate surfaces become parallel to the XY plane, and the first columnar member 41 and the second columnar member 42 are disposed so that the central axes thereof become parallel to the Z-axis.

In other words, in the case of the conventional device, a state where the columnar members 41 and 42 stand perpendicularly on the lower surface 20 is defined as a reference, and by measuring how and which direction the columnar members 41 and 42 incline from this perpendicular state, an applied external force is detected. On the other hand, in the present invention, it is assumed that the columnar members are inclined with respect to the substrate surface of the lower substrate in a standard state where no external force is applied, and it is also assumed that a pair of columnar members are inclined mutually opposite.

Figure 3A:
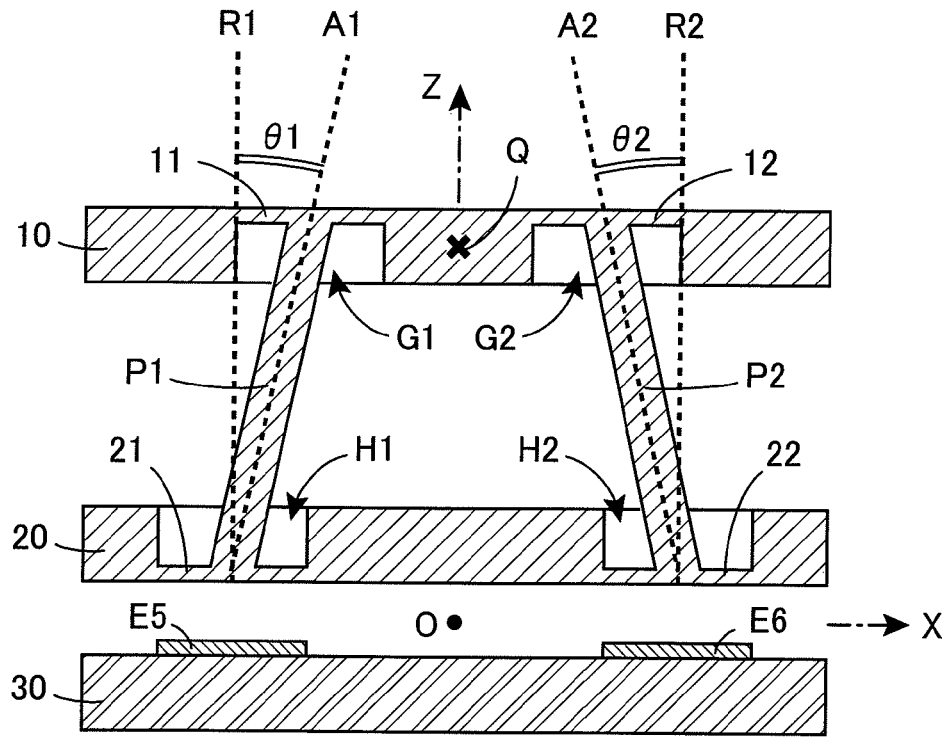
FIG. 3A is a longitudinal sectional view showing a detection principle of a force Fx in the X-axis direction by a force detection device of a basic embodiment of the present invention.
Figure 3B:
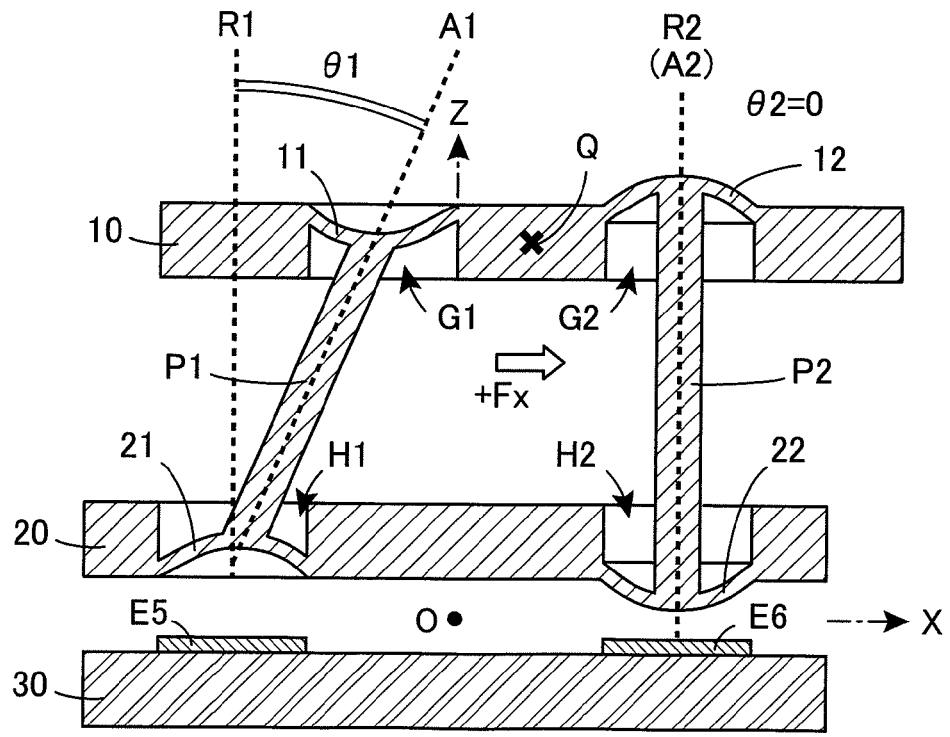
FIG. 3B is another longitudinal sectional view showing a detection principle of a force Fx in the X-axis direction by a force detection device of a basic embodiment of the present invention.

FIGS. 3A and 3B are longitudinal sectional views (in a section cut along the XZ plane) showing a detection principle of a force Fx in the X-axis direction by a force detection device of a basic embodiment of the present invention. Similar to the conventional device shown in FIGS. 2A and 2B, the device of the basic embodiment shown in FIGS. 3A and 3B includes an upper substrate 10, a lower substrate 20, an auxiliary substrate 30, a first columnar member P1, and a second columnar member P2. Here, FIG. 3A shows a standard state where no external force is applied.

As illustrated, on the lower surface of the upper substrate 10, a first upper groove G1 and a second upper groove G2 (both grooves are circular) are formed, and the bottom portions of these grooves form a first upper film portion 11 and a second upper film portion 12 which have flexibility due to their thinness. On the other hand, on the upper surface of the lower substrate 20, a first lower groove H1 and a second lower groove H2 (both grooves are circular) are formed, and the bottom portions of these grooves form a first lower film portion 21 and a second lower film portion 22 which have flexibility due to their thinness. The upper end of the first columnar member P1 is joined to the center of the first upper film portion 11, and the lower end is joined to the center of the first lower film portion 21. Similarly, the upper end of the second columnar member P2 is joined to the center of the second upper film portion 12, and the lower end is joined to the center of the second lower film portion 22.

Eventually, the upper substrate 10 and the lower substrate 20 are joined to each other via the two cylindrical columnar members P1 and P2. However, the joined portions form film portions (diaphragms) having flexibility due to their thinness, and the columnar members P1 and P2 are allowed to be displaced due to warping of the film portions. Therefore, in a state where the lower substrate 20 is fixed, when an external force is applied to the upper substrate 10, the columnar members P1 and P2 are displaced, and the upper substrate 10 is displaced with respect to the lower substrate 20. This basic feature is completely the same as the basic feature of the conventional device described in Section 1, and in the device of the present invention, applied external force is also detected based on displacements of the columnar members P1 and P2.

However, as is understood from comparison between the structure of FIG. 3A and the structure of FIG. 2A, in the case of the device of the present invention, the two columnar members P1 and P2 are inclined in the standard state where no external force is applied. Specifically, as in the case of the example described in Section 1, when the illustrated XYZ three-dimensional coordinate system is defined in which a Z-axis is set at a position penetrating through the center positions of the three substrates 10, 20, and 30 and an origin O is set at an intermediate position between the lower surface of the lower substrate 20 and the upper surface of the auxiliary substrate 30 on this Z-axis, the substrate surfaces of the three substrates 10, 20, and 30 become parallel to the XY plane. However, the central axes A1 and A2 of the two columnar members P1 and P2 are inclined with respect to the vertical reference axes R1 and R2.

The auxiliary substrate 30 is an insulating substrate fixed below the lower substrate 20 via a predetermined space, and on the upper surface of the auxiliary substrate 30, two fixed electrodes E5 and E6 are formed. Here, the fixed electrode E5 is a disk-shaped electrode opposed to the first lower film portion 21, and the fixed electrode E6 is a disk-shaped electrode opposed to the second lower film portion 22. By making the lower substrate 20 of a conductive material, the first lower film portion 21 and the second lower film portion 22 function as disk-shaped displacement electrodes. Therefore, a capacitance element C5 is formed by the first lower film portion 21 and the fixed electrode E5 opposed to the first lower film portion 21, and a capacitance element C6 is formed by the second lower film portion 22 and the fixed electrode E6 opposed to the second lower film portion 22.

In this device, in the standard state where no external force is applied, the two columnar members P1 and P2 are inclined, so that the upper ends of the columnar members P1 and P2 are connected aslant to the upper film portions 11 and 12, and the lower ends are connected aslant to the lower film portions 21 and 22. Therefore, in the standard state where no external force is applied, the film portions 11, 12, 21, and 22 keep the horizontal film states, and no stress causing warping is applied to these films. Therefore, in this standard state, the static capacitance value C5=C6.

Here, it is important that the first columnar member P1 and the second columnar member P2 are inclined mutually opposite with respect to the Z-axis in the standard state shown in FIG. 3A. In the illustrated example, the first columnar member P1 is inclined rightward (in the X-axis positive direction) with respect to the Z-axis, and on the other hand, the second columnar member P2 is inclined leftward (in the X-axis negative direction) with respect to the Z-axis. Specifically, focusing on the inclination angles θ1 and θ2 of the central axes A1 and A2 with respect to the vertical reference axes R1 and R2, the signs of the inclination angles θ1 and θ2 are opposite to each other. In the figure, when the inclination angles θ1 and θ2 are defined in the clockwise direction with respect to the vertical reference axes R1 and R2, θ1 becomes a positive value and θ2 becomes a negative value. In the illustrated example, the structure of the device is designed so as to become symmetrical about the YZ plane, so that the absolute values of θ1 and θ2 are equal to each other.

In the illustrated example, the two columnar members P1 and P2 are inclined so that the distance between these becomes smaller upward (inclined in an inverted V shape), however, the two columnar members P1 and P2 may be inclined so that the distance between these becomes larger upward (inclined in a V shape). A requirement herein is to increase the inclination angle of one of the two columnar members P1 and P2 (displace in a laying-down direction) and decrease the inclination angle of the other (displace in a rising direction) when the upper substrate 10 moves rightward or leftward in the figure.

FIG. 3B shows a displacement state when the lower substrate 20 and the auxiliary substrate 30 of this force detection device are fixed at the illustrated positions by support members not shown, and a force +Fx in the X-axis positive direction is applied to a point of application Q set at the position of the center of gravity of the upper substrate 10. As illustrated, the upper ends of the two columnar members P1 and P2 move in the X-axis positive direction (rightward in the figure). Therefore, the first columnar member P1 is displaced in a laying-down direction, and an absolute value of the inclination angle θ1 increases. However, the second columnar member P2 is displaced in a rising direction, and an absolute value of the inclination angle θ2 decreases. FIG. 3B shows a state where θ2=0, and the central axis A2 of the second columnar member P2 matches the vertical reference axis R2.

Here, in FIG. 3B, focusing on the deformation form of the film portions 11 and 21 joined to the upper and lower portions of the first columnar member P1, these deform so that the first upper film portion 11 is pulled downward and the first lower film portion 21 is pulled upward. This is deformation caused by the displacement in the laying-down direction and reduction in effective size in the vertical direction of the first columnar member P1. On the other hand, focusing on the deformation form of the film portions 12 and 22 joined to the upper and lower portions of the second columnar member P2, these deform so that the second upper film portion 12 is pushed upward and the second lower film portion 22 is pushed downward. This is deformation caused by the displacement in the rising direction and an increase in effective size in the vertical direction of the second columnar member P2.

In actuality, when a force +Fx in the X-axis direction is applied to the point of application Q in a state where the lower substrate 20 and the auxiliary substrate 30 are fixed and the upper substrate 10 is set free (supported only by the two columnar members P1 and P2), as described above, a force is applied to the first upper film portion 11 to pull it downward, and a force is applied to the second upper film portion 12 to push it upward, so that a counterclockwise rotational displacement occurs to the upper substrate 10. However, even when this rotational displacement occurs, the basic deformation forms of the film portions 11, 12, 21, and 22 are still as shown in FIG. 3B.

In the illustrated device, the displacement state of the two columnar members P1 and P2 can be grasped from the static capacitance values (indicated by the same reference symbols C5 and C6 as those of the capacitance elements C5 and C6) of the two capacitance elements C5 and C6. For example, when the state shown in FIG. 3B is compared with the state shown in FIG. 3A, the distance between the fixed electrode E5 and the lower film portion 21 (displacement electrode) increases, so that the static capacitance value C5 decreases, and the distance between the fixed electrode E6 and the lower film portion 22 (displacement electrode) decreases, so that the static capacitance value C6 increases. Therefore, the force +Fx in the X-axis positive direction applied to the point of application Q can be obtained as a capacitance value difference "C6−C5." When a force −Fx in the X-axis negative direction is applied, a state in a mirror image relationship with FIG. 3B is obtained, so that the force −Fx can also be obtained as a capacitance value difference "C6−C5" (in this case, a negative value is obtained). As a result, the capacitance value difference "C6−C5" can be used as a detection value of the external force Fx applied in the X-axis direction by considering the sign.

When a force +Fx greater than in the state shown in FIG. 3B is applied, the second columnar member P2 is displaced in the laying-down direction, and the capacitance value C6 starts to decrease, so that the capacitance value difference "C6−C5" does not indicate a correct detection value. Therefore, the force +Fx applied in the state shown in FIG. 3B is a rated detection value of the force in the X-axis positive direction by this device. Similarly, the force −Fx which displaces the first columnar member P1 until it stands perpendicularly is a rated detection value of the force in the X-axis negative direction by this device. Therefore, in practical use, for avoiding erroneous detection when a force exceeding the rated value is applied, a measure for limiting the displacement of the upper substrate 10, such as provision of a control member, is preferably taken. Such a control member is also useful for preventing the film portions from being broken by application of the force exceeding the rated value.

Thus, in the present invention, a structure in which the pair of columnar members P1 and P2 are inclined mutually opposite in the standard state where no external force is applied is adopted, so that the "inclination state of the columnar members P1 and P2" can be measured as "a force applied in the direction perpendicular to the substrate surfaces." This means that the configuration of the sensor for measuring the inclination state of the columnar members can be simplified. In actuality, in the case of the conventional device shown in FIGS. 2A and 2B, for detection of a force Fx, four capacitance elements C1 to C4 must be used to measure, however, in the case of the device of the present invention shown in FIGS. 3A and 3B, a force Fx can be detected by measurement using the two capacitance elements C5 and C6. The reason for this is because changes in the inclination state of the columnar members P1 and P2 from the state shown in FIG. 3A to the state shown in FIG. 3B can be recognized only by measuring the displacements in the Z-axis direction (displacements in the direction perpendicular to the substrate surfaces) of the lower film portions 21 and 22.

Figure 4A:
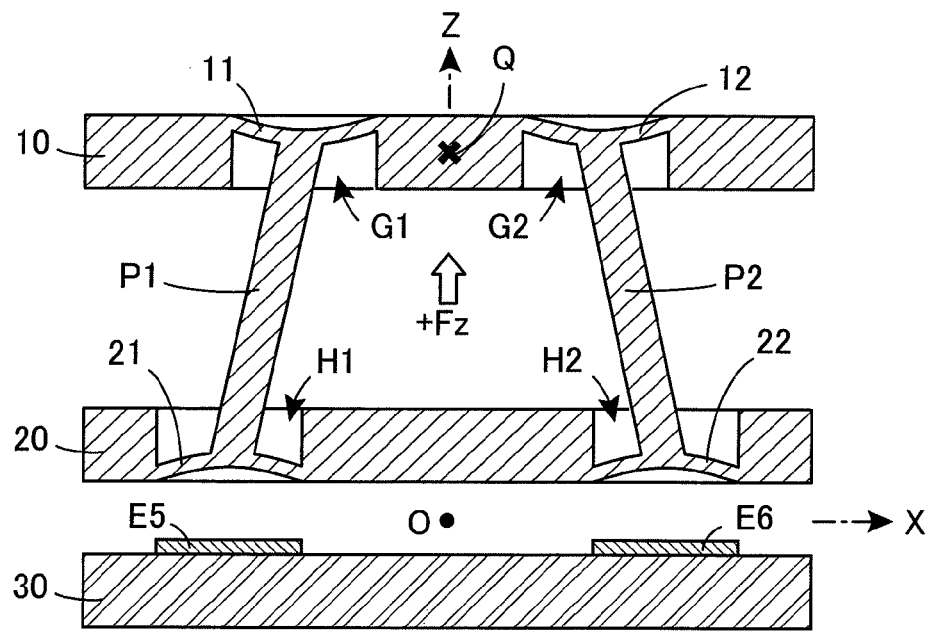
FIG. 4A is a longitudinal sectional view showing a detection principle of a force Fz in the Z-axis direction by the force detection device of the basic embodiment of the present invention.
Figure 4B:
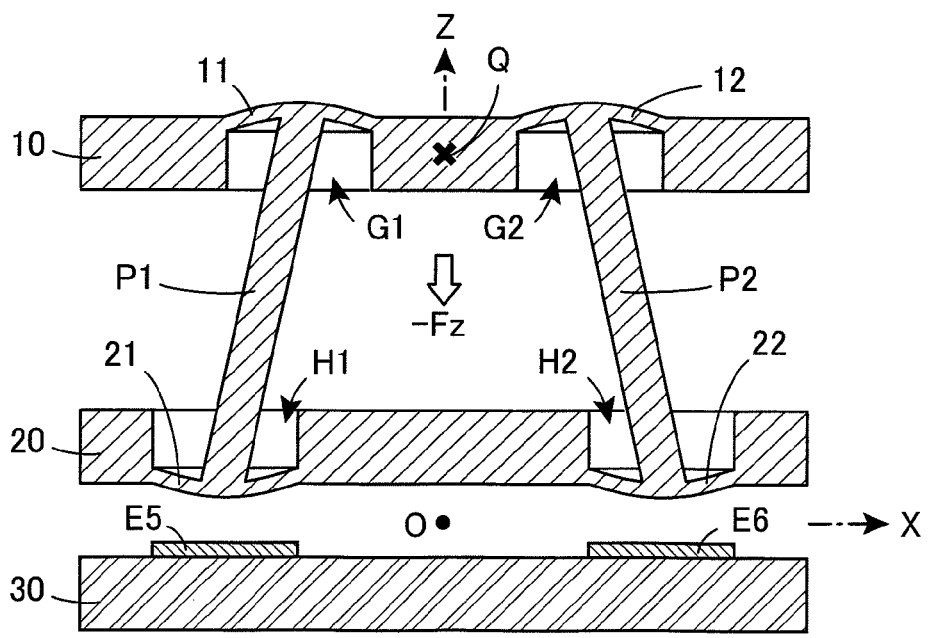
FIG. 4B is another longitudinal sectional view showing a detection principle of a force Fz in the Z-axis direction by the force detection device of the basic embodiment of the present invention.

The force detection device of the basic embodiment described in this Section 2 can detect not only a force Fx in the X-axis direction but also a force Fz in the Z-axis direction applied to the point of application Q. FIG. 4A is a longitudinal sectional view showing a state when a force +Fz in the Z-axis positive direction is applied to the point of application Q of this device, and FIG. 4B is a longitudinal sectional view showing a state when a force −Fz in the Z-axis negative direction is applied.

In comparison with the standard state shown in FIG. 3A, as shown in FIG. 4A, when the force +Fz is applied, the upper substrate 10 moves upward, and the lower film portions 21 and 22 are pulled upward. Therefore, the electrode-electrode distances of the capacitance elements C5 and C6 increase, and the capacitance values of these decrease. On the other hand, as shown in FIG. 4B, when the force −Fz is applied, the upper substrate 10 moves downward, and the lower film portions 21 and 22 are pulled downward. Therefore, the electrode-electrode distances of the capacitance elements C5 and C6 decrease, and the capacitance values of these increase.

Therefore, the sum "(C5+C6)" of the capacitance values of the two capacitance elements C5 and C6 corresponds to the detection value of the force Fz in the Z-axis direction. Specifically, the value "(C5+C6)" in the standard state shown in FIG. 3A is defined as a reference, and when this value becomes smaller, it means that the force +Fz in the Z-axis positive direction is applied, and when the value becomes larger, it means the force −Fz in the Z-axis negative direction is applied.

In the device shown in FIGS. 3A to 4B, the upper ends and the lower ends of the columnar members P1 and P2 are directly joined to the film portions 11, 12, 21, and 22, however, these may be indirectly joined by interposing different members between these.

Figure 5:
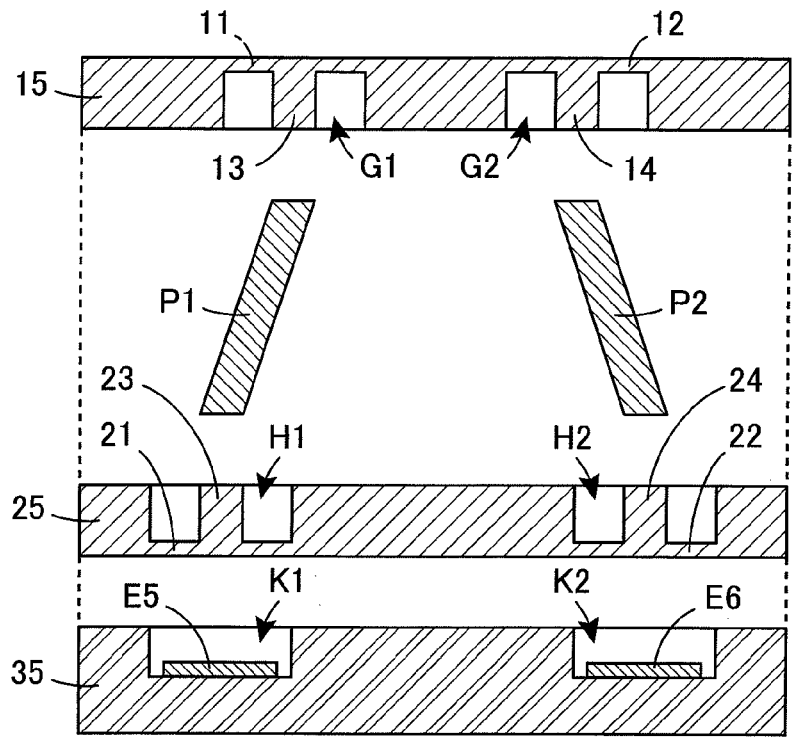
FIG. 5 is a longitudinal sectional view showing a state where parts are disassembled when projections are interposed between columnar members and film portions in the force detection device of the basic embodiment of the present invention.

FIG. 5 is a longitudinal sectional view showing a state where the parts are disassembled when projections are interposed between the columnar members and the film portions in the force detection device of the basic embodiment of the present invention. As illustrated, this device includes an upper substrate 15, a first columnar member P1, a second columnar member P2, a lower substrate 25, and an auxiliary substrate 35.

Here, on the lower surface of the upper substrate 15, a first upper groove G1 and a second upper groove G2 (both grooves are circular) are formed, and the bottom portions of these grooves form a first upper film portion 11 and a second upper film portion 12 having flexibility due to their thinness as in the case of the embodiment described above. On the upper surface of the lower substrate 25, a first lower groove H1 and a second lower groove H2 (both grooves are circular) are formed, and the bottom portions of these grooves form a first lower film portion 21 and a second lower film portion 22 which have flexibility due to their thinness as in the case of the embodiment described above.

However, inside the first upper groove G1, a cylindrical columnar projection 13 extending downward from the bottom surface of the groove (that is, the lower surface of the first upper film portion 11) to the substrate surface position is provided, and inside the second upper groove G2, a cylindrical columnar projection 14 extending downward from the bottom surface of the groove (that is, the lower surface of the second upper film portion 12) to the substrate surface position is provided. The upper end of the first columnar member P1 is indirectly joined to the first upper film portion 11 via the projection 13, and the upper end of the second columnar member P2 is indirectly joined to the second upper film portion 12 via the projection 14.

Similarly, inside the first lower groove H1, a cylindrical columnar projection 23 extending upward from the bottom surface of the groove (that is, the upper surface of the first lower film portion 21) to the substrate surface position is provided, and inside the second lower groove H2, a cylindrical columnar projection 24 extending upward from the bottom surface of the groove (that is, the upper surface of the second lower film portion 22) to the substrate surface position is provided. The lower end of the first columnar member P1 is indirectly joined to the first lower film portion 21 via the projection 23, and the lower end of the second columnar member P2 is indirectly joined to the second lower film portion 22 via the projection 24.

Further, on the upper surface of the auxiliary substrate 35 made of an insulating material, a first auxiliary groove K1 (circular groove) is formed at a position below the first lower film portion 21, and a second auxiliary groove K2 (circular groove) is formed at a position below the second lower film portion 22. On the bottom surface of the first auxiliary groove K1, a disk-shaped first fixed electrode E5 is formed, and on the bottom surface of the second auxiliary groove K2, a disk-shaped second fixed electrode E6 is formed.

Figure 6:
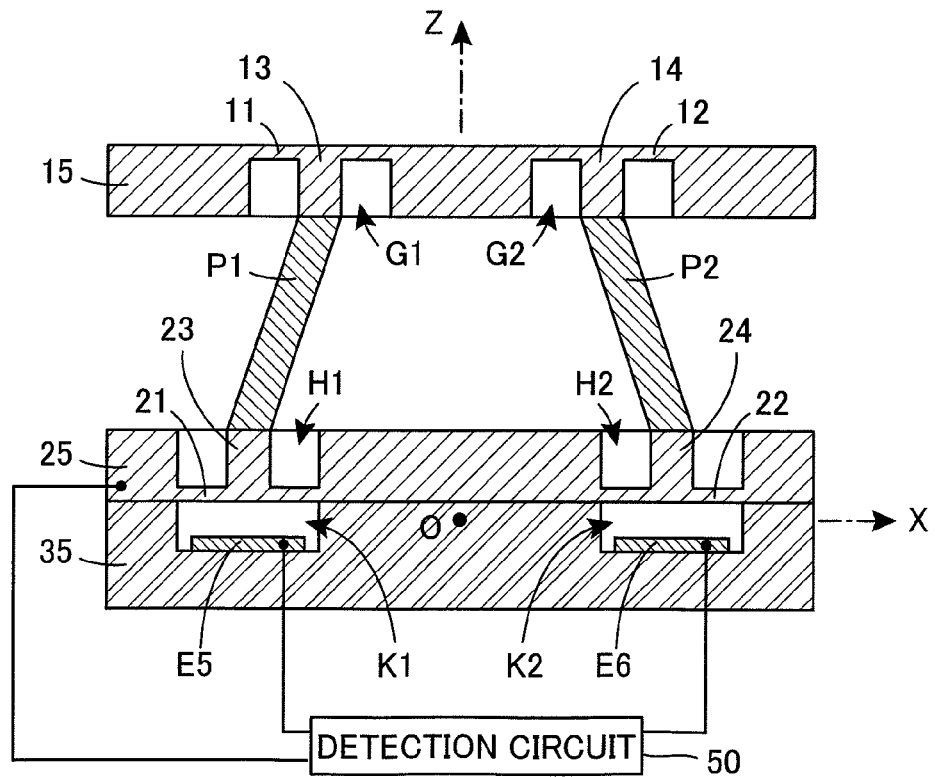
FIG. 6 is a longitudinal sectional view showing a force detection device assembled by using the parts shown in FIG. 5 (the portion of the detection circuit is shown as a block).

By assembling these parts, the force detection device shown in FIG. 6 is obtained. The upper ends of the columnar members P1 and P2, respectively, are joined to the lower surfaces of the projections 13 and 14, the lower ends of the columnar members P1 and P2, respectively, are joined to the upper surfaces of the projections 23 and 24, and further, the auxiliary substrate 35 is firmly fixed to the lower surface of the lower substrate 25. Here, the lower substrate 25 is made of a conductive material such as metal, and at one position of the lower substrate 25, wiring to the detection circuit 50 is provided. The fixed electrodes E5 and E6 are also provided with wiring to the detection circuit 50.

Thus, by adopting the structure in which the projections 13, 14, 23 and 24 are formed in advance in the grooves of the upper substrate 15 and the lower substrate 25, only by joining the upper and lower ends of the columnar members P1 and P2 to the exposed surfaces of the projections 13, 14, 23, and 24, the major structure portion can be configured, so that the assembly becomes easy. As shown in FIGS. 3A to 4B, when a structure in which the upper and lower ends of the columnar members P1 and P2 are set inside the grooves and are directly joined to the film portions is adopted, the columnar members P1 and P2 may come into contact with the edges of the grooves when they excessively incline, however, as shown in FIGS. 5 and 6, by adopting a structure in which the upper and lower ends are indirectly joined via the projections 13, 14, 23, and 24, the columnar members P1 and P2 are disposed out of the grooves, so that the contact with the edges of the grooves can be prevented.

Eventually, the essential constituent elements of the force detection device of the basic embodiment of the present invention are the upper substrate 10 or 15 having a substrate surface parallel to the XY plane, the lower substrate 20 or 25 having a substrate surface parallel to the XY plane and disposed below the upper substrate, the first columnar member P1 having an upper end directly or indirectly joined to the lower surface of the upper substrate and a lower end directly or indirectly joined to the upper surface of the lower substrate, the second columnar member P2 having an upper end directly or indirectly joined to the lower surface of the upper substrate and a lower end directly or indirectly joined to the upper surface of the lower substrate, and the detector 50 which outputs electric signals showing applied forces based on displacements of the first columnar member and the second columnar member.

Here, the vicinity of the joined portion of the upper substrate 10 or 15 to which the upper end of the first columnar member P1 is joined constitutes a first upper film portion 11 with flexibility, the vicinity of the joined portion to which the upper end of the second columnar member P2 is joined constitutes a second upper film portion 12 with flexibility, the vicinity of the joined portion of the lower substrate 20 or 25 to which the lower end of the first columnar member P1 is joined constitutes a first lower film portion 21 with flexibility, and the vicinity of the joined portion to which the lower end of the second columnar member P2 is joined constitutes a second lower film portion 22 with flexibility.

The upper grooves G1 and G2 provided on the upper substrate 10 or 15 are not necessarily provided on the lower surface side of the upper substrate, but may be provided on the upper surface side. When the upper grooves G1 and G2 are provided on the upper surface side, the upper film portions 11 and 12 are formed by the groove bottom portions positioned on the lower surface of the upper substrate 10 or 15. That is, it is also allowed that the first upper groove G1 and the second upper groove G2 are provided on the upper surface side or the lower surface side of the upper substrate, the first upper film portion 11 is formed by the bottom portion of the first upper groove G1, and the second upper film portion 12 is formed by the bottom portion of the second upper groove G2.

Similarly, the lower grooves H1 and H2 to be provided on the lower substrate 20 or 25 are not necessarily provided on the upper surface side of the lower substrate, but may be provided on the lower surface side. When the lower grooves H1 and H2 are provided on the lower surface side, the lower film portions 21 and 22 are formed by the groove bottom portions positioned on the upper surface of the lower substrate 20 or 25. That is, it is also allowed that the first lower groove H1 and the second lower groove H2 are provided on the upper surface side or the lower surface side of the lower substrate, the first lower film portion 21 is formed by the bottom portion of the first lower groove H1, and the second lower film portion 22 is formed by the bottom portion of the second lower groove H2.

On the other hand, in order to carry out the present invention, the arrangement conditions of the first columnar member P1 and the second columnar member P2 are important. In the examples shown in FIGS. 3A to 6 described above, both the central axis A1 of the first columnar member P1 and the central axis A2 of the second columnar member P2 are positioned on the XZ plane (plane corresponding to the paper sheet surfaces of FIGS. 3A to 6), and inclined mutually opposite with respect to the Z-axis.

However, the central axes A1 and A2 are not necessarily on the same plane. Based on the basic principle described above, detection of the force Fx in the X-axis direction based on the capacitance value difference "C6−C5" of the pair of capacitance elements C5 and C6 and detection of the force Fz in the Z-axis direction based on the sum "C5+C6" of the capacitance values of the pair of capacitance elements C5 and C6 are enabled as long as a projection image obtained by orthogonally projecting the central axis A1 of the first columnar member P1 onto the XZ plane is inclined in a first direction with respect to the Z-axis, and a projection image obtained by orthogonally projecting the central axis A1 of the second columnar member P2 onto the XZ plane is inclined in a second direction opposite to the first direction with respect to the Z-axis.

In a structure satisfying these inclination conditions, a first sensor for detecting a displacement in the Z-axis direction of the first lower film portion 21 and a second sensor for detecting a displacement in the Z-axis direction of the second lower film portion 22 are prepared, and an electric signal showing a difference between a detection value of the first sensor and a detection value of the second sensor can be output as a detection value of a force Fx in the X-axis direction applied to the upper substrate 10 in a state where the lower substrate 20 is fixed, and an electric signal showing the sum of the detection value of the first sensor and the detection value of the second sensor can be output as a detection value of a force Fz in the Z-axis direction.

Of course, in practical use, it is preferable that the central axis A1 of the first columnar member P1 and the central axis A2 of the second columnar member P2 are disposed on the "XZ plane" or "the same plane parallel to the XZ plane" so that the first columnar member P1 and the second columnar member P2 become symmetrical about the YZ plane. In this case, the whole device can be formed into a symmetrical structure, the design and assembly become easy, and symmetry of a deformation form can be secured when a force +Fx in the X-axis positive direction is applied and when a force −Fx in the X-axis negative direction is applied, and a symmetrical relationship between a positive output value and a negative output value can be obtained.

As a sensor which measures the inclination state of the columnar members, any sensor can be used as long as it can measure a force applied by the lower end of each columnar member in a direction perpendicular to the substrate surface of the lower substrate (that is, the upward direction and the downward direction) as an electric signal. However, the sensor using the capacitance element shown in the illustrated embodiments is a sensor having a very simple structure, and is most suitably utilized for the present invention.

Therefore, in practical use, preferably, the first sensor consists of a first capacitance element C5 including a first displacement electrode (in the illustrated example, the lower film portion 21 itself) formed on the first lower film portion 21 and the first fixed electrode E5 fixed to a position opposed to the first displacement electrode, and the second sensor consists of a second capacitance element, including a second displacement electrode (in the illustrated example, the lower film portion 22 itself) formed on the second lower film portion 22 and the second fixed electrode E6 fixed to a position opposed to the second displacement electrode.

Particularly, as in the case of the illustrated example, by making the lower substrate 20 or 25 of a conductive material, the first lower film portion 21 itself functions as the first displacement electrode, and the second lower film portion 22 itself functions as the second displacement electrode, so that it becomes unnecessary to provide displacement electrodes separately, and the structure can be simplified. Of course, when the lower substrate 20 or 25 is not made of a conductive material, the first displacement electrode made of a conductive material may be formed on the lower surface of the first lower film portion 21, and the second displacement electrode made of a conductive material may be formed on the lower surface of the second lower film portion 22.

As described above, in this Section 2, a force detection device of the basic embodiment having a function of detecting a force Fx in the X-axis direction and a force Fz in the Z-axis direction by using the two columnar members P1 and P2 is described, and by utilizing the basic principle "a pair of columnar members are disposed so as to be inclined mutually opposite with respect to a reference axis," as described in Section 3 and Section 4, a force detection device capable of detecting more force components can be designed. The force detection device of the basic embodiment described in this Section 2 may be variously transformed.

For example, it is also allowed that the entire upper substrate 10 is formed of a flexible substrate, the first upper film portion 11 is formed by a part of the flexible substrate, and the second upper film portion 12 is formed by another part of the flexible substrate. Similarly, it is also allowed that the entire lower substrate 20 is formed of a flexible substrate, the first lower film portion 21 is formed by a part of the flexible substrate, and the second lower film portion 22 is formed by another part of the flexible substrate. Alternatively, in place of the upper substrate 10 and the lower substrate 20, structural bodies having arbitrary shapes may be used. These exemplary variations will be described in Section 5.

<<<Section 3>>>

Structure of Force Detection Device of Practical Embodiment of the Present Invention Here, a structure of a force detection device of a practical embodiment having a function of detecting six components of force components Fx, Fy, and Fz in the respective coordinate axis directions and moment components Mx, My, and Mz around the respective coordinate axes by utilizing the basic principle described in Section 2 will be described.

Figure 7:
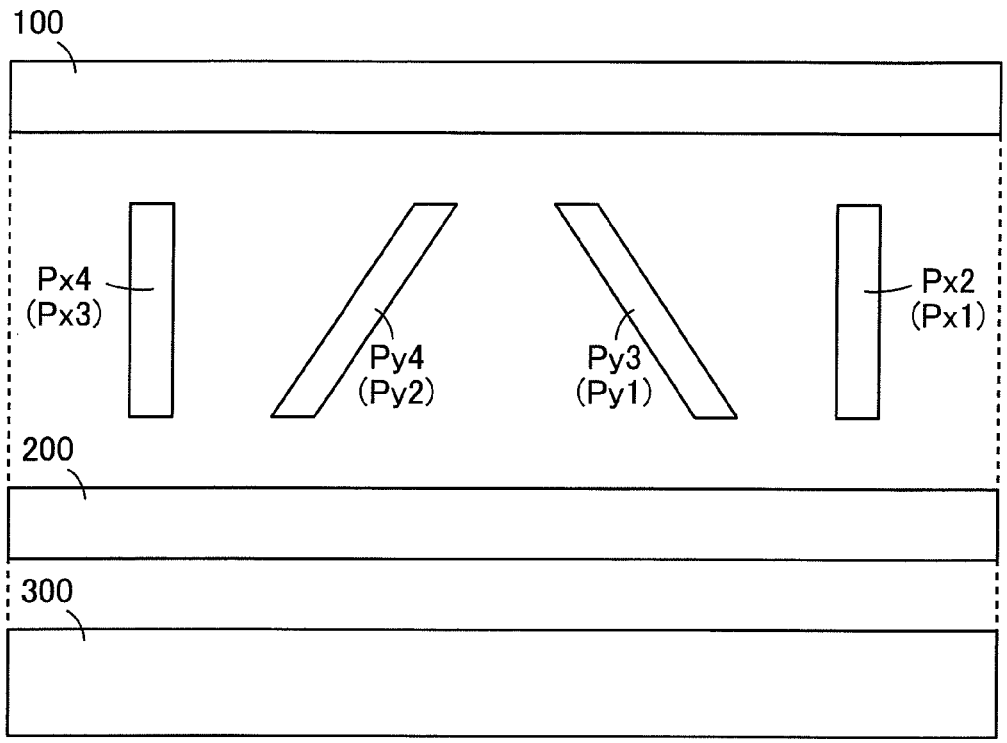
FIG. 7 is a front view showing a state where constituent elements of a force detection device of a practical embodiment of the present invention are disassembled.
Figure 8:
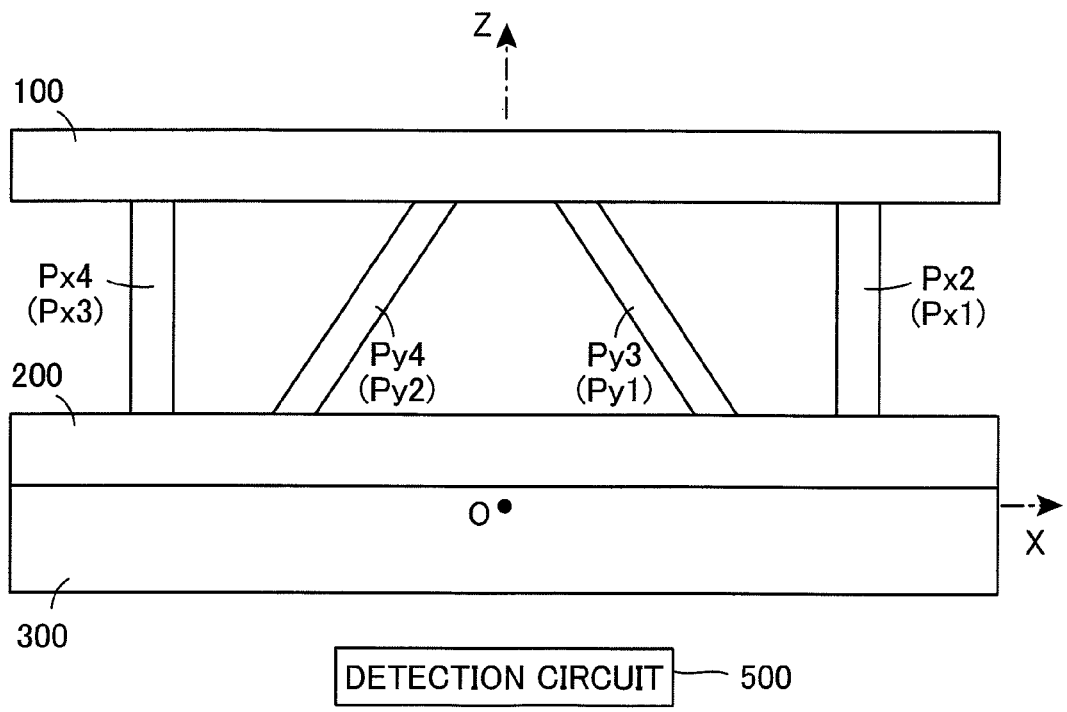
FIG. 8 is a front view showing the force detection device of the practical embodiment of the present invention (the portion of the detection circuit is shown as a block).

FIG. 7 is a front view showing a state where constituent elements of the force detection device of the practical embodiment are disassembled. As illustrated, the major constituent parts of this device are an upper substrate 100, a lower substrate 200, an auxiliary substrate 300, and eight columnar members Px1 to Px4 and Py1 to Py4. FIG. 8 is a front view showing a force detection device configured by assembling these parts (the portion of the detection circuit is shown as a block). As illustrated, the upper ends of the eight columnar members are joined to the lower surface of the upper substrate 100, and the lower ends are joined to the upper surface of the lower substrate 200. The auxiliary substrate 300 is joined to the lower surface of the lower substrate 200. The auxiliary substrate 300 performs a function of supporting fixed electrodes constituting sensors.

Here, comparing the constituent elements of the force detection device shown in FIG. 6 with the constituent elements of the force detection device shown in FIG. 8, the upper substrate 15, the lower substrate 25, the auxiliary substrate 35, the columnar members P1 and P2, and the detection circuit 50 of the former force detection device corresponds to the upper substrate 100, the lower substrate 200, the auxiliary substrate 300, the columnar members Px1 to Px4 and Py1 to Py4, and the detection circuit 500 of the latter force detection device. The biggest difference between these is the number of columnar members. The former force detection device is a device having a function of detecting forces Fx and Fz by using two columnar members, and on the other hand, the latter force detection device is a device having a function of detecting forces Fx, Fy, and Fz and moments Mx, My, and Mz by using eight columnar members.

In FIGS. 7 and 8, only four columnar members are shown, however, in actuality, another four columnar members are disposed behind the illustrated columnar members (in the figures, the reference symbols of the columnar members concealed are shown in parentheses). In this device, the arrangement of the eight columnar members, specifically, the inclination directions of the central axes of the columnar members are very important for correct detection of the six force components. Therefore, the structure of this device will be described below in detail depending on the substrates 100, 200, and 300.

Figure 9:
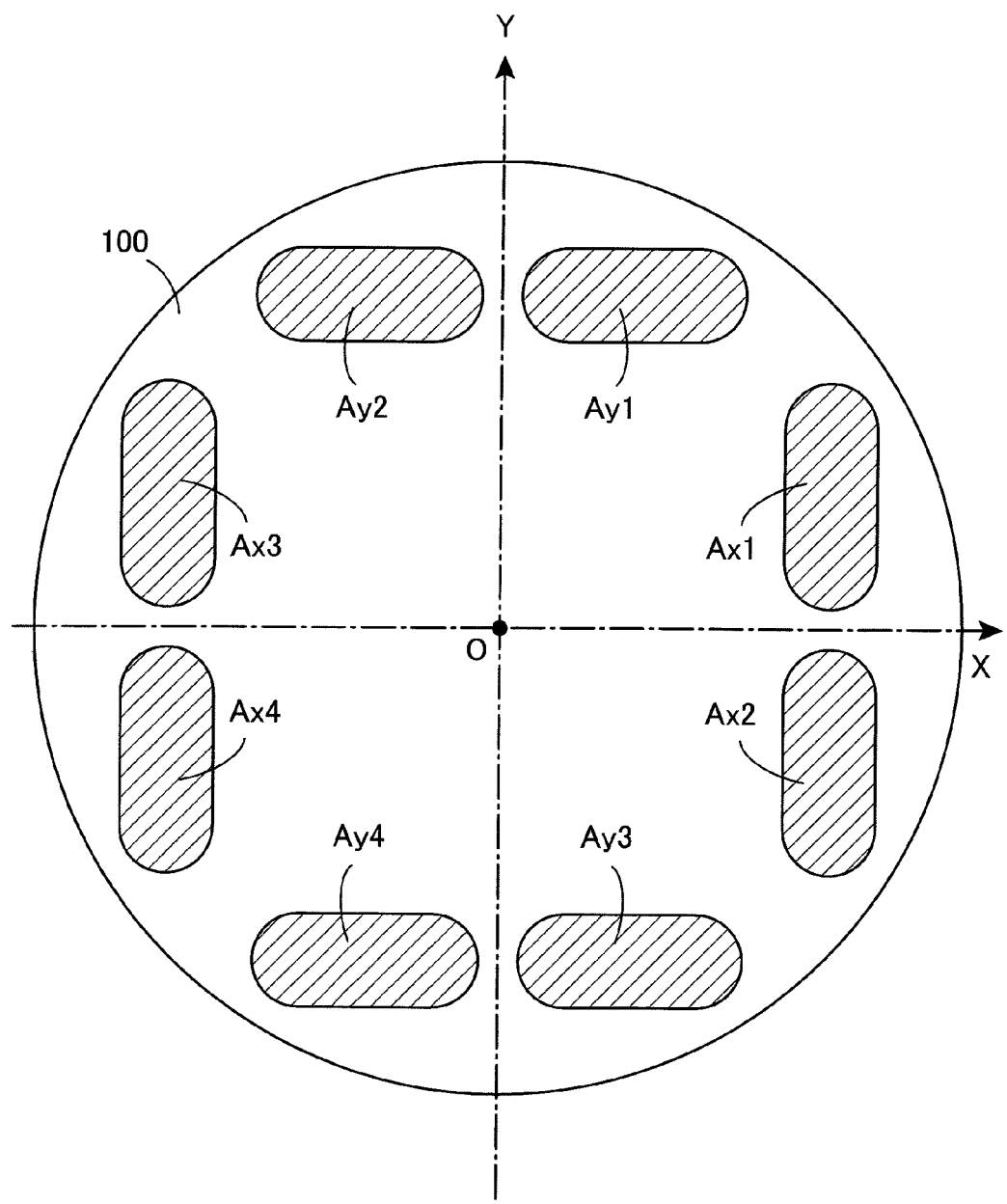
FIG. 9 is a top view of the force detection device shown in FIG. 8 (the hatched portions show eight regions defined for the sake of description).

FIG. 9 is a top view of this force detection device. In the embodiment shown herein, the three substrates 100, 200, and 300 are formed of disks having the same radius. Therefore, only the upper substrate 100 is shown in the top view, however, the lower substrate 200 and the auxiliary substrate 300 are concealed behind the upper substrate 100. Here, an axis penetrating through the centers of these three circular substrates is set as a Z-axis. As illustrated, in the top view, the rightward direction in the figure is set as an X-axis positive direction, and the upward direction in the figure is set as a Y-axis positive direction. Therefore, the three substrates 100, 200, and 300 have substrate surfaces parallel to the XY plane, and the Z-axis penetrating through the centers of the substrates becomes a coordinate axis the positive direction of which is upward in FIG. 8.

The origin O of this coordinate system is set at a position near the upper surface of the auxiliary substrate 300 as shown in the front view of FIG. 8 (the reason for this will be described later). Therefore, the XY plane is a horizontal plane passing through the origin O of FIG. 8, however, in each plan view (top view) described hereinafter, for convenience, the X-axis and the Y-axis are drawn in the plan views. Strictly speaking, the X-axis and the Y-axis drawn in the plan views described hereinafter are projection images of the X-axis and the Y-axis onto the views, however, as long as confusion does not specifically occur, description will be given on the assumption that a two-dimensional XY coordinate system is defined on the views.

The eight oval regions hatched in FIG. 9 show regions in which the eight columnar members are disposed (hatching does not show cross sections, but shows regions). The reason why the regions are oval is because the columnar members are inclined. Here, these eight regions are referred to as regions Ax1 to Ax4 and regions Ay1 to Ay4. The regions Ax1 to Ax4 are regions disposed on both sides of the X-axis, and the regions Ay1 to Ay4 are regions disposed on both sides of the Y-axis. Hereinafter, among the three reference symbol characters indicating each region, the latter two reference symbol characters are used as a position reference symbol indicating the position of the region. For example, the latter two characters "x1" of the region reference symbol "Ax1" are used as a position reference symbol indicating the position of the illustrated region Ax1.

Figure 10:
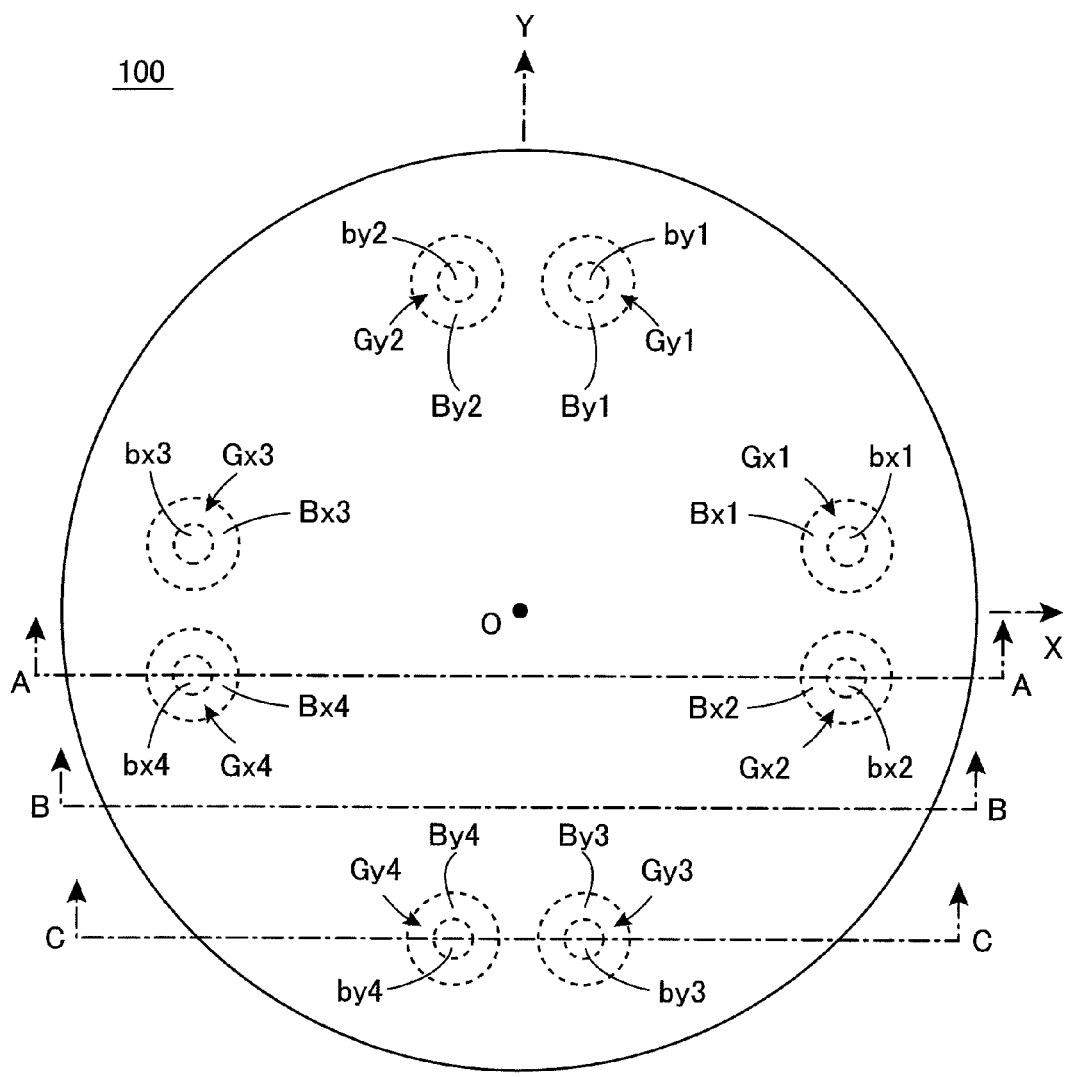
FIG. 10 is a top view of an upper substrate 100 as a constituent element of the force detection device shown in FIG. 8.

FIG. 10 is a top view of the upper substrate 100 as a constituent element of the force detection device shown in FIG. 8. In the figure, double circles are drawn by dashed lines at eight positions, and these indicate grooves and projections formed on the lower surface of the upper substrate 100. The grooves and the projections are formed on the substrate lower surface, so that they are drawn by dashed lines in the figure. The eight double circles correspond to any of the eight regions shown in FIG. 9.

The outer circle of the double circle indicates the outer periphery of the formed ring-shaped groove, and the inner circle indicates the outer periphery of the formed cylindrical columnar projection. In a region between the outer circle and the inner circle, a washer-shaped film portion is formed. Here, the groove is indicated by "a reference symbol of three characters including G as the initial character," the film portion is indicated by "a reference symbol of three characters including B as the initial character," and the projection is indicated by "a reference symbol of three characters including b as the initial character." The latter two characters of each reference symbol compose a position reference symbol described above. For example, the portion indicated by the reference symbol "Gx2" at the right end of FIG. 10 indicates a groove positioned in the region Ax2, the portion indicated by the reference symbol "Bx2" indicates a film portion positioned in the region Ax2, and the portion indicated by the reference symbol "bx2" indicates a projection positioned in the region Ax2.

Figure 11:
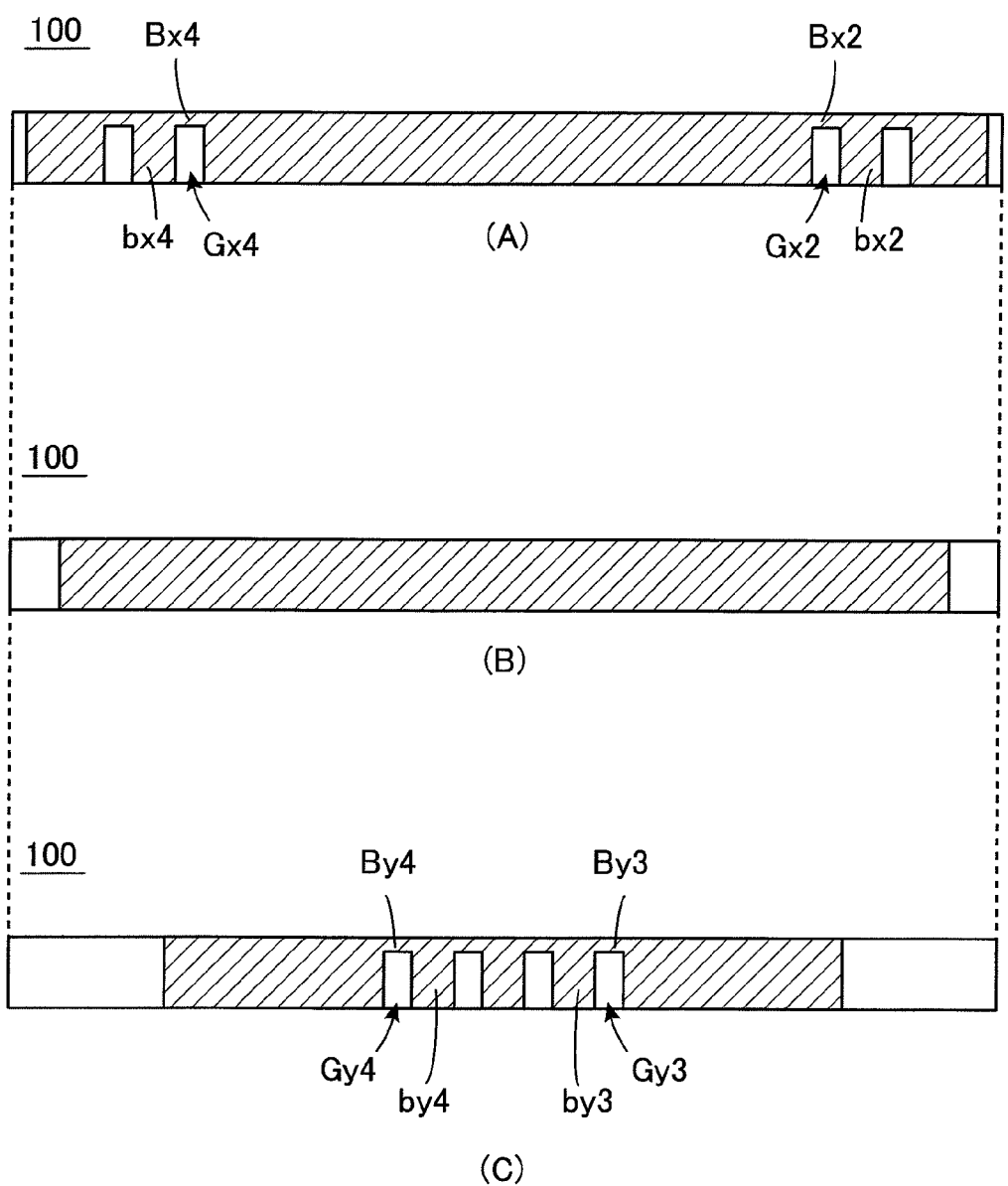
FIG. 11 is a longitudinal sectional view. (A), (B), and (C) of FIG. 11 are longitudinal sectional views of the upper substrate 100 shown in FIG. 10, cut along the cutting lines A-A, B-B, and C-C, respectively.

The structures of the groove Gx2, the film portion Bx2, and the projection bx2 are clearly shown in the longitudinal sectional view (A) of FIG. 11. View (A) of FIG. 11 is a longitudinal sectional view of the upper substrate 100 shown in FIG. 10, cut along the cutting line A-A. As illustrated, the grooves Gx2 and Gx4 are ring-shaped grooves dug in the lower surface of the upper substrate 100, and herein, they are referred to as "upper grooves." The film portions Bx2 and Bx4 are portions with thicknesses reduced by the formation of the grooves Gx2 and Gx4, and are washer-shaped film-like portions forming the bottom portions of the grooves. Here, these film-like portions are referred to as "upper film portions." On the other hand, the projections bx2 and bx4 are cylindrical columnar structural bodies projecting downward inside the grooves Gx2 and Gx4, and are utilized for connecting the upper ends of the columnar portions as described later.

Similarly, views (B) and (C) of FIG. 11 are longitudinal sectional views of the upper substrate 100 shown in FIG. 10, cut along the cutting lines B-B and C-C, respectively. At the position of the cutting line B-B, no groove is formed, however, at the position of the cutting line C-C, the upper grooves Gy3 and Gy4 are formed, and as a result, the upper film portions By3 and By4 and the projections by3 and by4 are formed. Here, the upper groove Gy3, the upper film portion By3, and the projection by3 are constituent elements positioned in the region Ay3 shown in FIG. 9, and the upper groove Gy4, the upper film portion By4, and the projection by4 are constituent elements positioned in the region Ay4 shown in FIG. 9.

Figure 12:
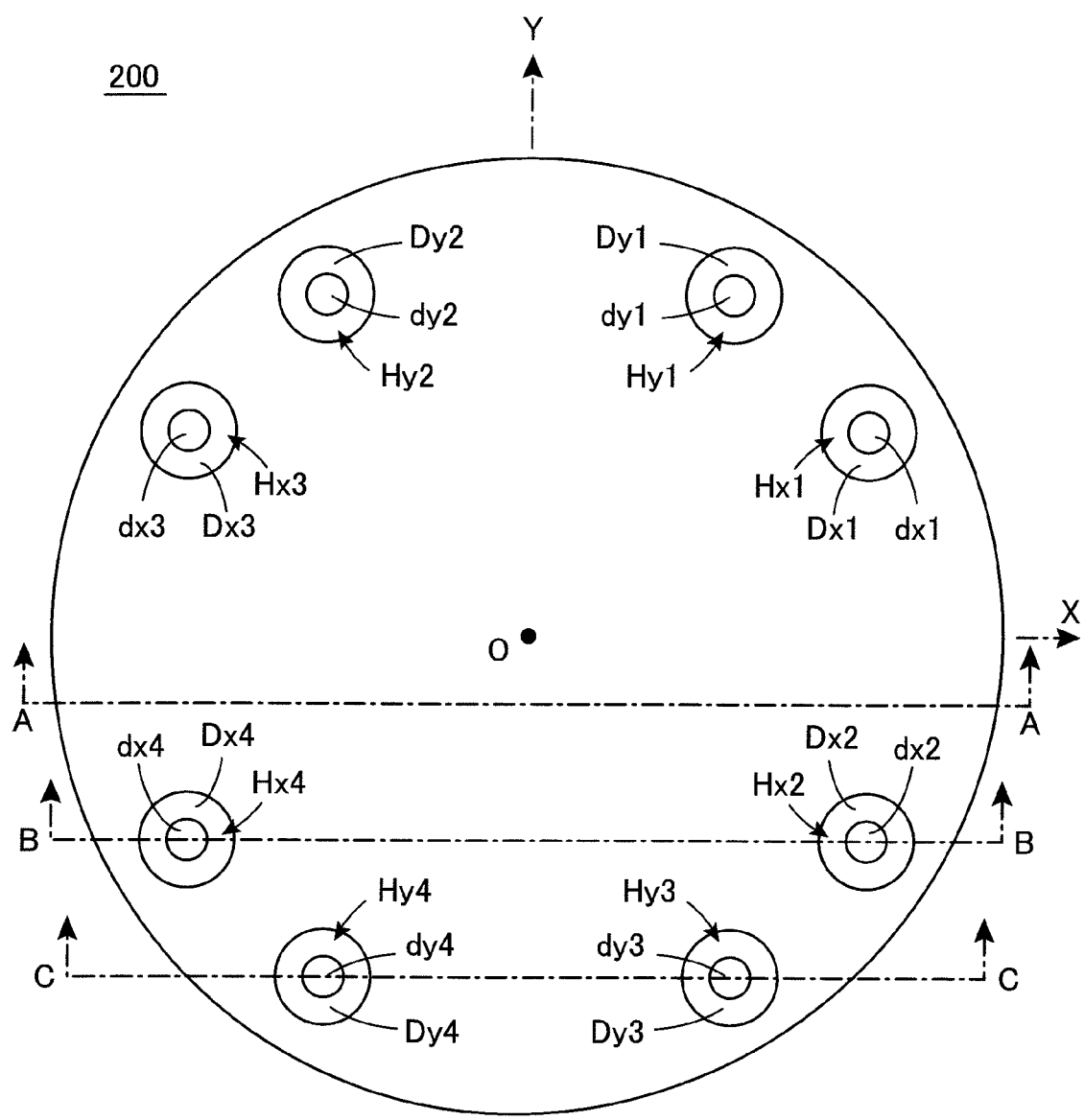
FIG. 12 is a top view of a lower substrate 200 as a constituent element of the force detection device shown in FIG. 8.

On the other hand, FIG. 12 is a top view of the lower substrate 200 as a constituent element of the force detection device shown in FIG. 8. In this figure as well, double circles are drawn at eight positions, and these indicate grooves and projections formed on the upper surface of the lower substrate 200. These eight double circles also correspond to the position of any of the eight regions shown in FIG. 9. The positions of the eight double circles shown in FIG. 12 and the positions of the eight double circles indicated by dashed lines in FIG. 10 do not overlap each other on a plan view. This is because the columnar members are arranged aslant as described later.

In this figure as well, the outer circle of the double circle indicates the outer periphery of the formed ring-shaped groove, and the inner circle indicates the outer periphery of the formed cylindrical columnar projection. In the region between the outer circle and the inner circle, a washer-shaped film portion is formed. On this lower substrate 200, the groove is indicated by "a reference symbol of three characters including H as the initial character," the film portion is indicated by "a reference symbol of three characters including D as the initial character," and the projection is indicated by "a reference symbol of three characters including d as the initial character." The latter two characters of each reference symbol still compose a position reference symbol as described above. For example, the portion indicated by the reference symbol "Hx2" at the right end of FIG. 12 indicates a groove positioned in the region Ax2, the portion indicated by the reference symbol "Dx2" indicates a film portion positioned in the region Ax2, and the portion indicated by the reference symbol "dx2" indicates a projection positioned in the region Ax2.

The structures of the groove Hx2, the film portion Dx2, and the projection dx2 are clearly shown in the longitudinal sectional view (B) of FIG. 13. View (B) of FIG. 13 is a longitudinal sectional view of the lower substrate 200 shown in FIG. 12, cut along the cutting line B-B. As illustrated, the grooves Hx2 and Hx4 are ring-shaped grooves dug in the upper surface of the lower substrate 200, and herein, they are referred to as "lower grooves." The film portions Dx2 and Dx4 are portions with thicknesses reduced by the formation of the grooves Hx2 and Hx4, and are washer-shaped film-like portions forming the bottom portions of the grooves. Here, these film-like portions are referred to as "lower film portions." On the other hand, the projections dx2 and dx4 are cylindrical columnar structural bodies projecting upward inside the grooves Hx2 and Hx4, and are utilized for connecting the lower ends of the columnar portions as described later.

Similarly, views (A) and (C) of FIG. 13 are longitudinal sectional views of the lower substrate 200 shown in FIG. 12, cut along the cutting lines A-A and C-C, respectively. At the position of the cutting line A-A, no groove is formed, however, at the position of the cutting line C-C, lower grooves Hy3 and Hy4 are formed, and as a result, lower film portions Dy3 and Dy4 and the projections dy3 and dy4 are formed. Here, the lower groove Hy3, the lower film portion Dy3, and the projection dy3 are constituent elements positioned in the region Ay3 shown in FIG. 9, and the lower groove Hy4, the lower film portion Dy4, and the projection dy4 are constituent elements positioned in the region Ay4 shown in FIG. 9.

Figure 14:
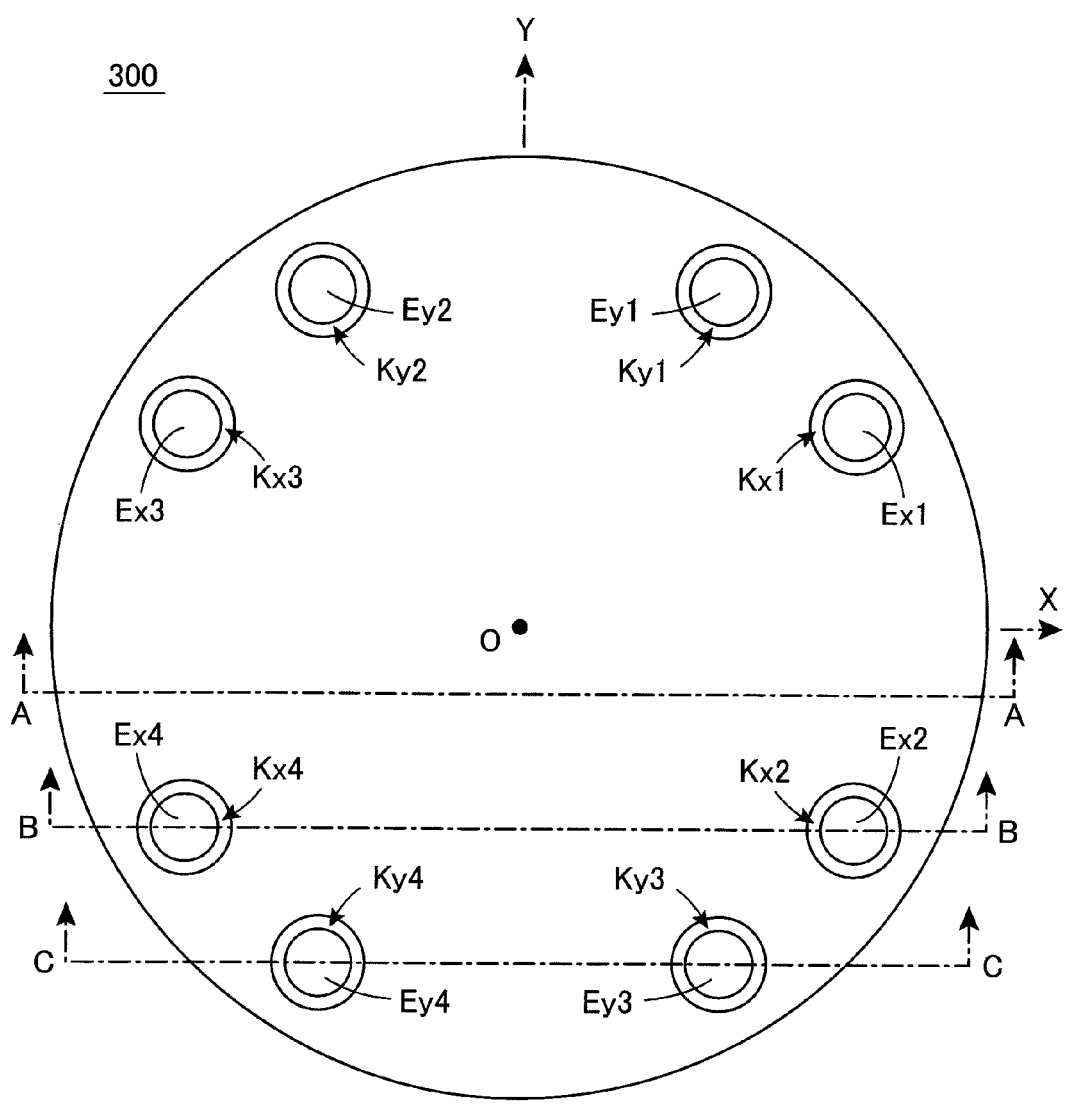
FIG. 14 is a top view of an auxiliary substrate 300 as a constituent element of the force detection device shown in FIG. 8.

FIG. 14 is a top view of the auxiliary substrate 300 as a constituent element of the force detection device shown in FIG. 8. In this figure, double circles are also drawn at eight positions, and these indicate grooves and electrodes formed on the upper surface of the auxiliary substrate 300. These eight double circles also correspond to the position of any of the eight regions shown in FIG. 9. The positions of the eight double circles shown in FIG. 14 and the positions of the eight double circles shown in FIG. 12 coincide with each other in a plan view. This is because eight electrodes on the auxiliary substrate 300 are positioned immediately below the eight lower film portions of the lower substrate 200, respectively.

In FIG. 14, the outer circle of the double circle indicates the outer periphery of the formed cylindrical columnar groove, and the inner circle indicates the outer periphery of the disk-shaped electrode formed on the bottom surface of the groove. On this auxiliary substrate 300, the groove is indicated by "a reference symbol of three characters including K as the initial character," and the electrode is indicated by "a reference symbol of three characters including E as the initial character." The latter two characters of each reference symbol still compose a position reference symbol described above. For example, the portion indicated by the reference symbol "Kx2" at the right end of FIG. 14 indicates a groove positioned in the region Ax2, and the portion indicated by the reference symbol "Ex2" indicates an electrode positioned in the region Ax2.

The structures of the groove Kx2 and the electrode Ex2 are clearly shown in the longitudinal sectional view (B) of FIG. 15. View (B) of FIG. 15 is a longitudinal sectional view of the auxiliary substrate 300 shown in FIG. 14, cut along the cutting line B-B. As illustrated, the grooves Kx2 and Kx4 are cylindrical columnar grooves dug in the upper surface of the auxiliary substrate 300, and herein, they are referred to as "auxiliary grooves." The upper grooves on the upper substrate 100 and the lower grooves on the lower substrate 200 perform a role of forming the upper film portions and the lower film portions which have flexibility, and the auxiliary grooves on the auxiliary substrate 300 perform a role of forming electrodes supported below the lower substrate 200 via a predetermined distance. As shown in view (B) of FIG. 15, the electrode Ex2 is a disk-shaped electrode fixed to the bottom surface of the auxiliary groove Kx2, and the electrode Ex4 is a disk-shaped electrode fixed to the bottom surface of the auxiliary groove Kx4. Here, the eight electrodes fixed to the auxiliary substrate 300 are referred to as "fixed electrodes."

Similarly, views (A) and (C) of FIG. 15 are longitudinal sectional views of the auxiliary substrate 300 shown in FIG. 14, cut along the cutting lines A-A and C-C, respectively. At the position of the cutting line A-A, no groove is formed, however, at the position of the cutting line C-C, auxiliary grooves Ky3 and Ky4 are formed, and to the bottom surface of these grooves, fixed electrodes Ey3 and Ey4 are fixed. Here, the auxiliary groove Ky3 and the fixed electrode Ey3 are constituent elements positioned in the region Ay3 shown in FIG. 9, and the auxiliary groove Ky4 and the fixed electrode Ey4 are constituent elements positioned in the region Ay4 shown in FIG. 9.

The configurations of the upper substrate 100, the lower substrate 200, and the auxiliary substrate 300 are described individually above, and next, the entire configuration of the device assembled from these substrates and eight columnar members will be described. In the example shown here, the eight cylindrical columnar members are substantially columnar members.

Figure 16:
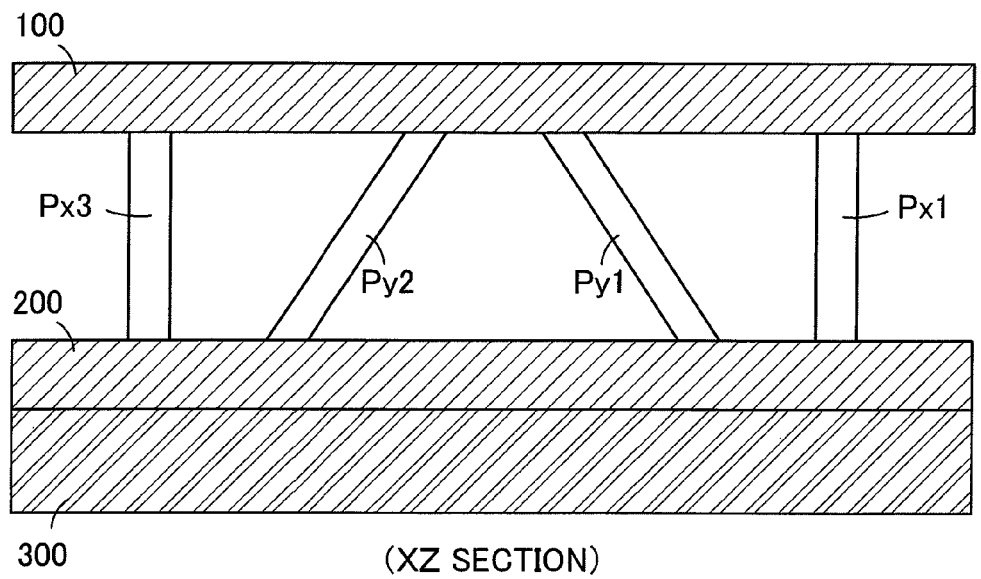
FIG. 16 is a longitudinal sectional view of the force detection device shown in FIG. 8, cut along the XZ plane.

FIG. 16 is a longitudinal sectional view of the force detection device shown in FIG. 8, cut along the XZ plane. A state where the four columnar members Px1, Px3, Py1 and Py2 positioned at the deep side of the XZ plane are sandwiched between the upper substrate 100 and the lower substrate 200 is shown. Here, the columnar member Px1 at the right end and the columnar member Px3 at the left end seem to stand upright in the figure, however, in actuality, they are inclined in the depth direction in the figure.

Figure 17:
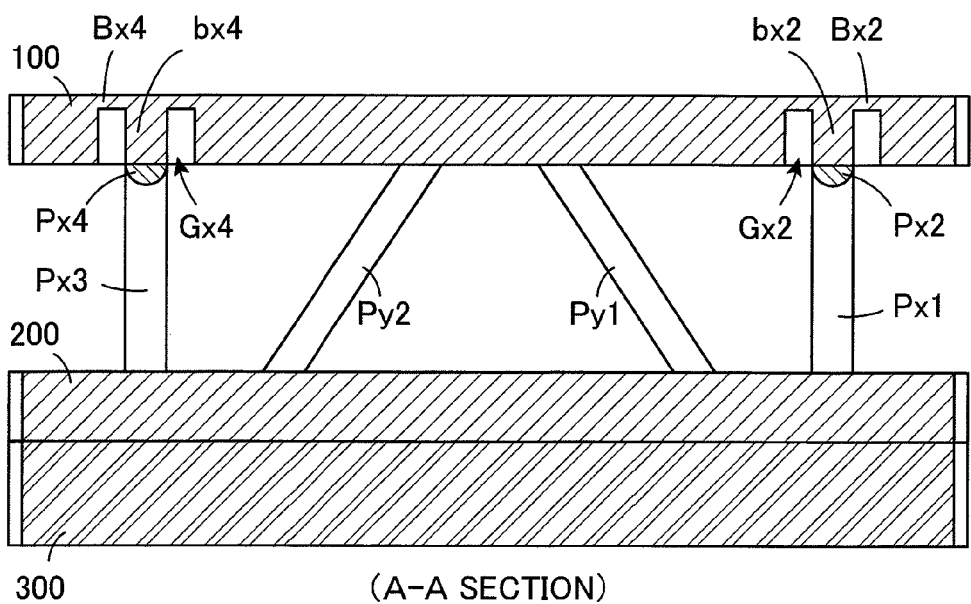
FIG. 17 is a longitudinal sectional view of the force detection device shown in FIG. 8, cut along the cutting line A-A shown in FIGS. 10, 12, and 14.

FIG. 17 is a longitudinal sectional view of the force detection device shown in FIG. 8, cut along the cutting line A-A shown in FIGS. 10, 12, and 14. As shown in FIG. 10, on the cutting line A-A, the upper grooves Gx2 and Gx4, the upper film portions Bx2 and Bx4, and the projections bx2 and bx4 are arranged, and in FIG. 17, cross sections of these are shown. A state where the columnar members Px2 and Px4 are connected to the lower surfaces of the respective projections bx2 and bx4 is shown. For example, the columnar member Px2 positioned below the projection bx2 is a member extending forward in the figure from the lower surface of the projection bx2, and only the surface cut along the cutting line A-A is shown. The upper end of the columnar member Px1 positioned behind the columnar member Px2 is joined not to the projection bx2 but to the lower surface of the projection bx1 positioned behind the projection bx2.

Figure 18:
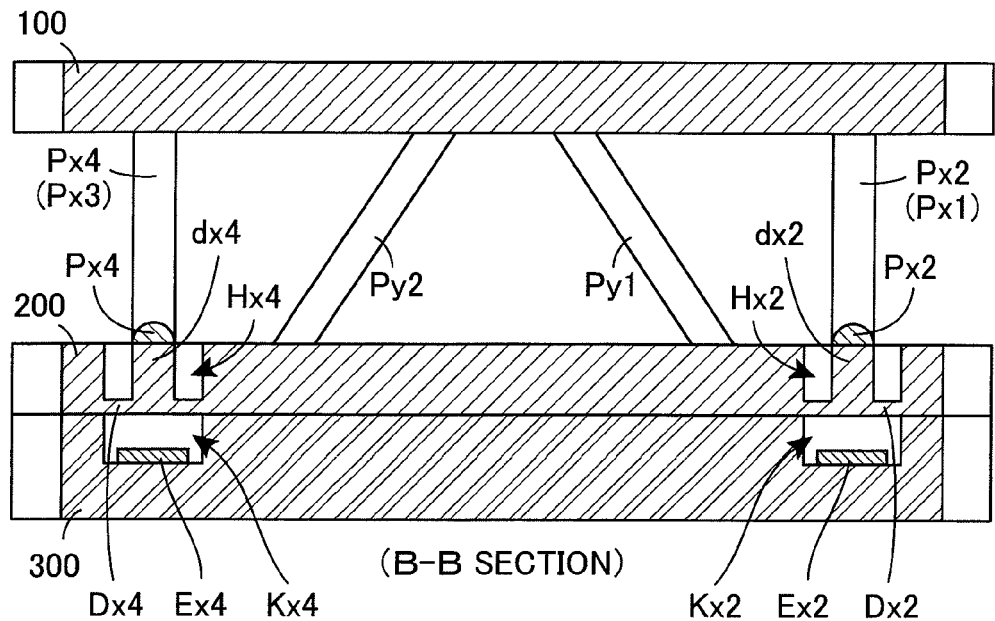
FIG. 18 is a longitudinal sectional view of the force detection device shown in FIG. 8, cut along the cutting line B-B shown in FIGS. 10, 12, and 14.

FIG. 18 is a longitudinal sectional view of the force detection device shown in FIG. 8, cut along the cutting line B-B shown in FIGS. 10, 12, and 14. As shown in FIGS. 12 and 14, on the cutting line B-B, the lower grooves Hx2 and Hx4, the lower film portions Dx2 and Dx4, the projections dx2 and dx4, the auxiliary grooves Kx2 and Kx4, and the fixed electrodes Ex2 and Ex4 are arranged, and in FIG. 18, cross sections of these are shown. A state where the columnar members Px2 and Px4 are connected to the upper surfaces of the projections dx2 and dx4 is shown. For example, the columnar member Px2 positioned above the projection dx2 is a member extending in the depth direction in the figure from the upper surface of the projection dx2, and in the figure, a surface cut along the cutting line B-B and a portion deeper than this surface are shown. Another columnar member Px1 positioned on the further deeper side is concealed behind the columnar member Px2 and is not shown in the figure.

Figure 19:
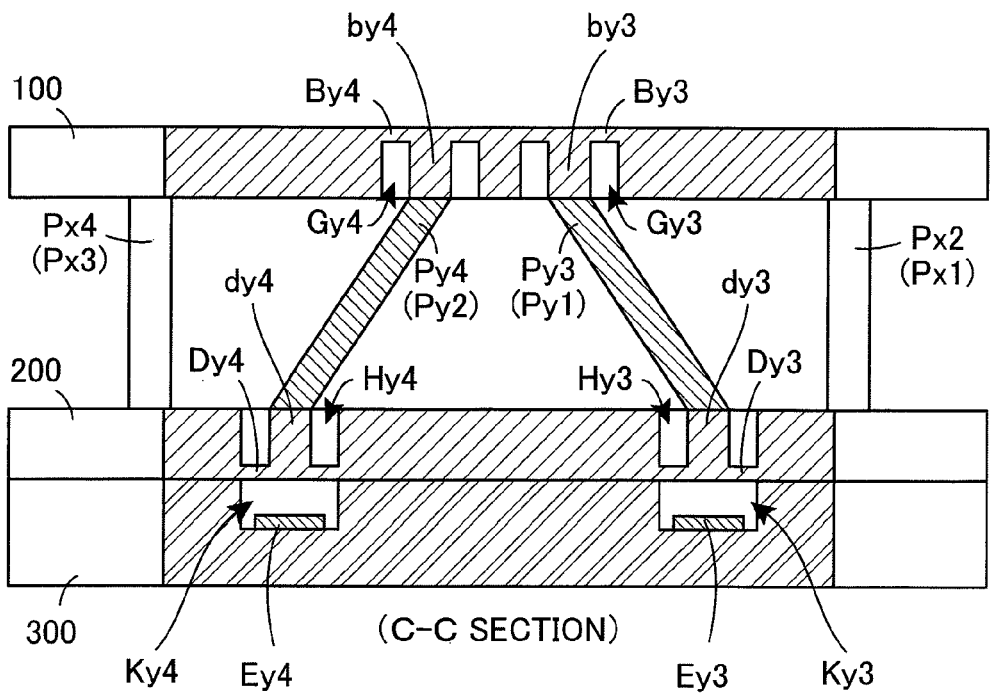
FIG. 19 is a longitudinal sectional view of the force detection device shown in FIG. 8, cut along the cutting line C-C shown in FIGS. 10, 12, and 14.

FIG. 19 is a longitudinal sectional view of the force detection device shown in FIG. 8, cut along the cutting line C-C shown in FIGS. 10, 12, and 14. On the cutting line C-C, as shown in FIG. 10, the upper grooves Gy3 and Gy4, the upper film portions By3 and By4, and the projections by3 and by4 are arranged, and as shown in FIG. 12, the lower grooves Hy3 and Hy4, the lower film portions Dy3 and Dy4, and the projections dy3 and dy4 are arranged, and further, as shown in FIG. 14, the auxiliary grooves Ky3 and Ky4 and the fixed electrodes Ey3 and Ey4 are arranged. In FIG. 19, cross sections of these are shown.

The central axes of the columnar members Py3 and Py4 are positioned on a longitudinal section along the cutting line C-C, so that in FIG. 19, the connection states of the upper ends and the lower ends of the two columnar members Py3 and Py4 are clearly shown. Specifically, the upper ends of the columnar members Py3 and Py4 are joined to the lower surfaces of the projections by3 and by4 on the upper substrate 100, and the lower ends are joined to the upper surfaces of the projections dy3 and dy4 on the lower substrate 200. Further, the columnar member Py3 is inclined so that its upper end inclines to the left, and on the other hand, the columnar member Py4 is inclined so that its upper end inclines to the right, and these columnar members Py3 and Py4 are inclined mutually opposite.

As shown in FIG. 18, immediately below the lower film portion Dx2, a fixed electrode Ex2 is disposed via a predetermined space, and immediately below the lower film portion Dx4, a fixed electrode Ex4 is disposed via a predetermined space. As shown in FIG. 19, immediately below the lower film portion Dy3, a fixed electrode Ey3 is disposed via a predetermined space, and immediately below the lower film portion Dy4, a fixed electrode Ey4 is disposed via a predetermined space. Thus, in a case of the embodiment shown herein, immediately below the eight lower film portions Dx1 to Dx4 and Dy1 to Dy4, fixed electrodes Ex1 to Ex4 and Ey1 to Ey4 are disposed via the predetermined space. The lower substrate 200 is made of a conductive material, so that the eight lower film portions Dx1 to Dx4 and Dy1 to Dy4 function as displacement electrodes, and constitute capacitance elements Cx1 to Cx4 and Cy1 to Cy4 in cooperation with the opposite fixed electrodes Ex1 to Ex4 and Ey1 to Ey4. Each capacitance element functions as a sensor which detects a displacement in the up-down direction (Z-axis direction) of each lower film portion.

Figure 20:
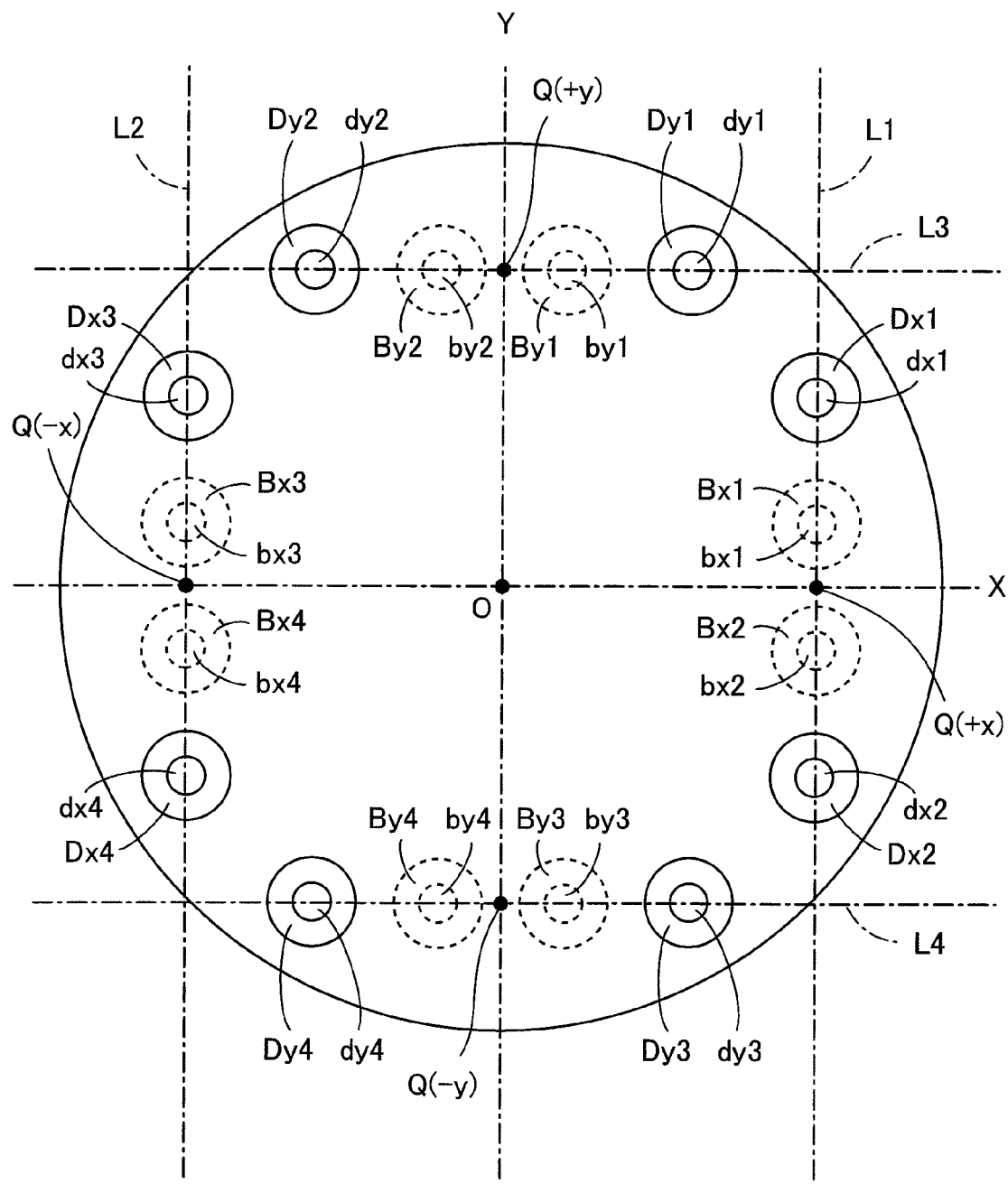
FIG. 20 is a plan view showing a positional relationship of upper film portions and lower film portions in the force detection device shown in FIG. 8.

FIG. 20 is a plan view showing a positional relationship of the upper film portions and the lower film portions in the force detection device shown in FIG. 8. Specifically, the eight double circles (constituent elements of the upper substrate 100) shown in FIG. 10 and the eight double circles (constituent elements of the lower substrate 200) shown in FIG. 12 are shown by overlapping on the same plane. As indicated by the alternate long and short dashed lines in the figure, when a reference line L1 which passes through the point Q(+x) on the X-axis positive side and is parallel to the Y-axis, a reference line L2 which passes through the point Q(−x) on the X-axis negative side and is parallel to the Y-axis, a reference line L3 which passes through the point Q(+y) on the Y-axis positive side and is parallel to the X-axis, and a reference line L4 which passes through the point Q(−y) on the Y-axis negative side and is parallel to the X-axis are defined, the centers of a total of 16 double circles are arranged on the reference lines L1 to L4.

Here, considering the eight regions shown in FIG. 9, the inner circles (projections) of the double circles belonging to the same region in FIG. 20 indicate the connection positions of the upper end and the lower end of the same columnar member. For example, the projections dx1 and bx1 in the region Ax1 are connection objects to which the lower end and the upper end of the same columnar member Px1 are connected, and the projections dx2 and bx2 in the region Ax2 are connection objects to which the lower end and the upper end of the same columnar member Px2 are connected. Similarly, the projections dy1 and by1 in the region Ay1 are connection objects to which the lower end and the upper end of the same columnar member Py1 are connected, and the projections dy2 and by2 in the region Ay2 are connection objects to which the lower end and the upper end of the same columnar member Py2 are connected.

Figure 21:
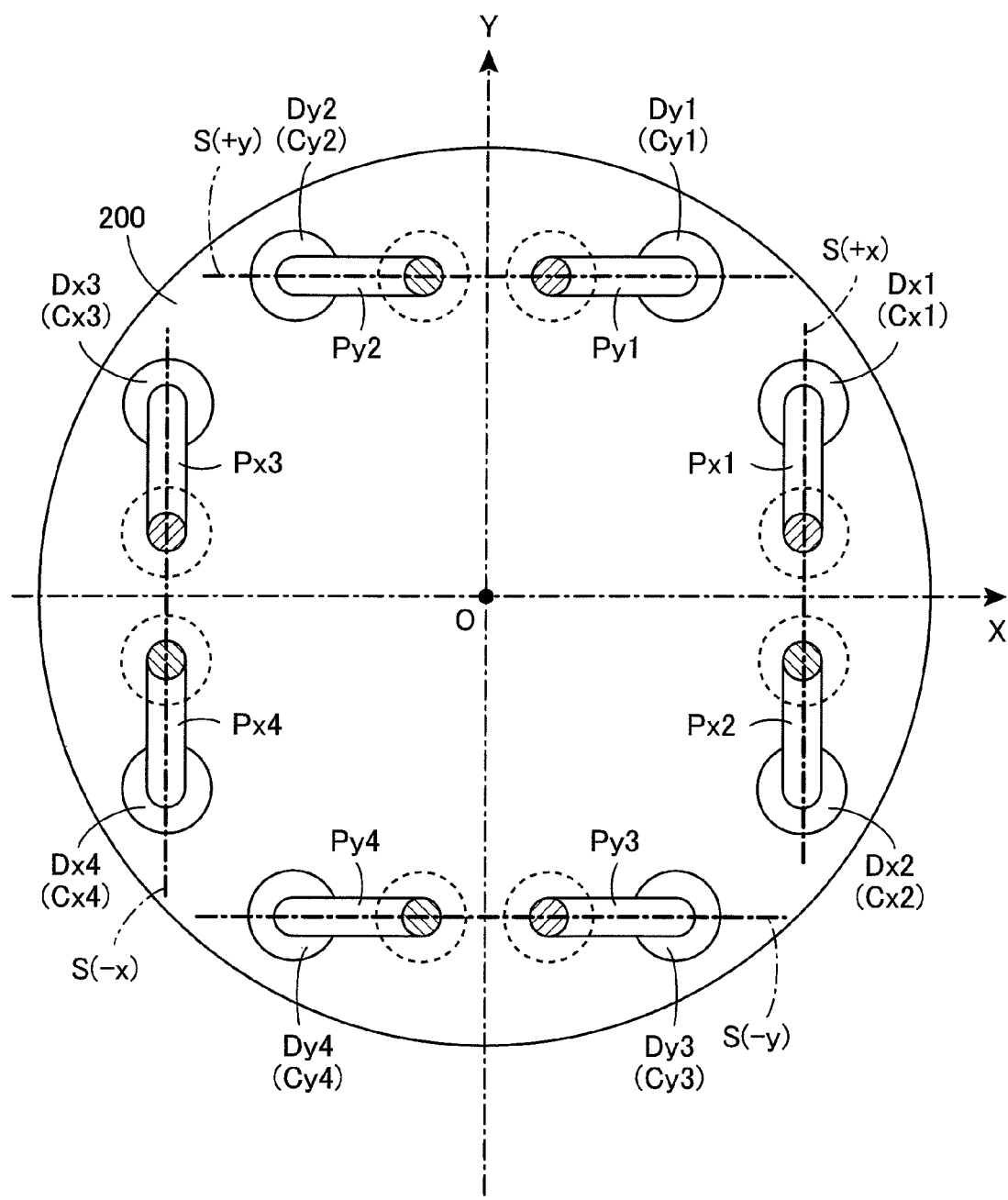
FIG. 21 is a plan view showing the lower substrate 200 and eight columnar members attached to the upper surface of the lower substrate 200 in the force detection device shown in FIG. 8 (the hatched portions show upper end faces of the columnar members).

FIG. 21 is a plan view showing the lower substrate 200 and eight columnar members attached to the upper surface of the lower substrate 200 in the force detection device shown in FIG. 8. In other words, this figure corresponds to a top view in which the upper substrate 100 is removed in the force detection device shown in FIG. 8, and the remaining structural bodies are observed from above. Here, hatching does not show cross sections, but shows upper end faces of the columnar members. For reference, the positions of the upper grooves formed on the upper substrate 100 are indicated by dashed lines. Surfaces S(+x), S(−x), S(+y), and S(−y), which are indicated by the alternate long and short dashed line, indicate vertical surfaces standing on the reference lines L1, L2, L3, and L4 shown in FIG. 20. Specifically, S(+x) indicates an X-axis positive side orthogonal plane orthogonal to the X-axis on the positive side, S(−x) indicates an X-axis negative side orthogonal plane orthogonal to the X-axis on the negative side, S(+y) indicates a Y-axis positive side orthogonal plane orthogonal to the Y-axis at the positive side, and S(−y) indicates a Y-axis negative side orthogonal plane orthogonal to the Y-axis on the negative side.

As illustrated, the central axes of the columnar members Px1 and Px2 are positioned on the X-axis positive side orthogonal plane S(+x), the central axes of the columnar members Px3 and Px4 are positioned on the X-axis negative side orthogonal plane S(−x), the central axes of the columnar members Py1 and Py2 are positioned on the Y-axis positive side orthogonal plane S(+y), and the central axes of the columnar members Py3 and Py4 are positioned on the Y-axis negative side orthogonal plane S(−y).

This means that the columnar members Px1, Px2, Px3, and Px4 (hereinafter, referred to as X-axis columnar members) are inclined with respect to the Y-axis direction, but are not inclined with respect to the X-axis direction, and the columnar members Py1, Py2, Py3, and Py4 (hereinafter, referred to as Y-axis columnar members) are inclined with respect to the X-axis direction, but are not inclined with respect to the Y-axis direction. The inclinations of the X-axis columnar members Px1 and Px2 with respect to the XZ plane are opposite to each other, and the inclinations of the X-axis columnar members Px3 and Px4 with respect to the XZ plane are also opposite to each other. Similarly, the inclinations of the Y-axis columnar members Py1 and Py2 with respect to the YZ plane are opposite to each other, and the inclinations of the Y-axis columnar members Py3 and Py4 with respect to the YZ plane are also opposite to each other. These inclination characteristics of the eight columnar members are very important for detection of six-axis components of a force described in Section 4.

The force detection device of the embodiment shown in FIG. 8 has a function of detecting forces applied in predetermined directions in an XYZ three-dimensional coordinate system, and includes an upper substrate 100 which has a substrate surface parallel to the XY plane, a lower substrate 200 which has a substrate surface parallel to the XY plane and is disposed below the upper substrate 100, first to fourth X-axis columnar members Px1 to Px4 and first to fourth Y-axis columnar members Py1 to Py4 having upper ends joined to the lower surface of the upper substrate 100 and lower ends joined to the upper surface of the lower substrate 200, and a detector which outputs electric signals showing the applied forces based on displacements of the eight columnar members (the eight capacitance elements Cx1 to Cx4 and Cy1 to Cy4 not shown in FIG. 8 and the detection circuit 500 shown as a block in FIG. 8).

Here, on the upper substrate 100, the vicinities of the joined portions to which the upper ends of the first to fourth X-axis columnar members Px1 to Px4 are joined constitute first to fourth X-axis upper film portions Bx1 to Bx4 with flexibility, and the vicinities of the joined portions to which the upper ends of the first to fourth Y-axis columnar members Py1 to Py4 are joined constitute first to fourth Y-axis upper film portions By1 to By4 with flexibility. Similarly, on the lower substrate 200, the vicinities of the joined portions to which the lower ends of the first to fourth X-axis columnar members Px1 to Px4 are joined constitute first to fourth X-axis lower film portions Dx1 to Dx4 with flexibility, and the vicinities of the joined portions to which the lower ends of the first to fourth Y-axis columnar members Py1 to Py4 are joined constitute first to fourth Y-axis lower film portions Dy1 to Dy4 with flexibility.

The thicknesses of the film portions are set suitably for obtaining flexibility necessary for force detection. The film portions function as so-called diaphragms. The thicknesses of the film portions are determined by the depths of the grooves, and in the process of manufacturing this device, the film portions are formed through processing for forming grooves with predetermined depths on a substrate as a material. In the case of the device manufactured by way of trial by the inventor of the present invention, when the upper substrate 100 and the lower substrate 200 were formed of substrates made of aluminum or stainless steel with thicknesses of 10 millimeters, and the diameters of the grooves were set to 20 millimeters and the diameters of the projections were set to 10 millimeters, by setting the thicknesses of the film portions to not more than 1.0 millimeters, film portions having flexibility sufficient for general purposes could be formed.

Between the upper end of each columnar member and the upper film portion and between the lower end of each columnar member and the lower film portion, direct connection may be made or indirect connection via some member may be made. In the case of the embodiment shown herein, each columnar member is indirectly connected to each film portion via a projection. For example, FIG. 19 shows a state where the upper end of the columnar member Py3 is connected to the upper film portion By3 via the projection by3, the lower end of the columnar member Py3 is connected to the lower film portion Dy3 via the projection dy3, the upper end of the columnar member Py4 is connected to the upper film portion By4 via the projection by4, and the lower end of the columnar member Py4 is connected to the lower film portion Dy4 via the projection dy4.

Of course, a structure in which the ends of the columnar members are directly joined to the film portions without interposing the projections may also be adopted. However, according to the interposition of the projections, the major structure portion can be configured only by joining the upper and lower ends of each columnar member to the exposed surface of the projections, so that the assembly becomes easier. If the upper and lower ends of the columnar members are set inside the grooves and directly joined to the film portions, the columnar members may come into contact with the edges of the grooves when they excessively incline, so that in practical use, the structure of indirect joining via the projections as an illustrated example is preferably adopted.

Specifically, it is preferable that the upper grooves Gx1 to Gx4 and Gy1 to Gy4 are formed on the lower surface of the upper substrate 100, projections bx1 to bx4 and by1 to by4 extending downward to the substrate surface position from the bottom surfaces of the grooves are provided inside the grooves, and the upper ends of the columnar members Px1 to Px4 and Py1 to Py4 are joined to the upper film portions Bx1 to Bx4 and By1 to By4 via these projections. Similarly, it is preferable that lower grooves Hx1 to Hx4 and Hy1 to Hy4 are formed on the upper surface of the lower substrate 200, projections dx1 to dx4 and dy1 to dy4 extending upward to the substrate surface position from the bottom surfaces of the grooves are provided inside the grooves, and the lower ends of the columnar members Px1 to Px4 and Py1 to Py4 are joined to the lower film portions Dx1 to Dx4 and Dy1 to Dy4 via these projections.

In the illustrated embodiment, the upper grooves Gx1 to Gx4 and Gy1 to Gy4 are formed on the lower surface of the upper substrate 100, and the bottom portions of these grooves form the upper film portions Bx1 to Bx4 and By1 to By4, however, it is also allowed that the upper grooves are formed on the upper surface of the upper substrate 100, and the groove bottom portions remaining in the vicinity of the lower surface of the upper substrate 100 form the upper film portions. In this case, it is sufficient that the upper ends of the columnar members are directly joined to the upper film portions without using the projections. Similarly, in the illustrated embodiment, the lower grooves Hx1 to Hx4 and Hy1 to Hy4 are formed on the upper surface of the lower substrate 200, and the bottom portions of the grooves form the lower film portions Dx1 to Dx4 and Dy1 to Dy4, however, it is also allowed that the lower grooves are formed on the lower surface of the lower substrate 200, and the groove bottom portions remaining in the vicinity of the upper surface of the lower substrate 200 form the lower film portions. In this case, it is also sufficient that the lower ends of the columnar members are directly joined to the lower film portions without using the projections.

In the embodiment described in this Section 3, the inclination state of the columnar members is still important. As described above, in the state where an external force as a detection target is not applied, the eight columnar members are disposed so as to be inclined with respect to the Z-axis. Here, for performing the measurement based on the basic principle described in Section 2, arrangement satisfying the condition "a pair of columnar members connecting the upper substrate and the lower substrate are inclined mutually opposite" is required.

In detail, as shown in FIG. 21, the first X-axis columnar member Px1 and the second X-axis columnar member Px2 are arranged so that their central axes are included in the X-axis positive side orthogonal plane S(+x) orthogonal to the X-axis in the positive region of the X-axis, and these columnar members are inclined mutually opposite with respect to the XZ plane, and the third X-axis columnar member Px3 and the fourth X-axis columnar member Px4 are arranged so that their central axes are included in the X-axis negative side orthogonal plane S(−x) orthogonal to the X-axis in the negative region of the X-axis, and these columnar members are inclined mutually opposite with respect to the XZ plane. Similarly, the first Y-axis columnar member Py1 and the second Y-axis columnar member Py2 are arranged so that their central axes are included in the Y-axis positive side orthogonal plane S(+y) orthogonal to the Y-axis in the positive region of the Y-axis, and these columnar members are inclined mutually opposite with respect to the YZ plane, and the third Y-axis columnar member Py3 and the fourth Y-axis columnar member Py4 are arranged so that their central axes are included in the Y-axis negative side orthogonal plane S(−y) orthogonal to the Y-axis in the negative region of the Y-axis, and these columnar members are inclined mutually opposite with respect to the YZ plane.

Here, in the state where the lower substrate 200 is fixed, when an external force is applied to the upper substrate 100, the eight columnar members are displaced. The detector is a constituent element having a function of outputting electric signals showing the applied forces based on these displacements, and includes sensors which detect displacements in the Z-axis direction of the lower film portions connected to the lower ends of the columnar members, and a detection circuit 500 which outputs electric signals obtained based on the detection values of these sensors as detection values of the force applied to the upper substrate 100 in the state where the lower substrate 200 is fixed.

Specifically, in the embodiment described herein, a first X-axis sensor which detects a displacement in the Z-axis direction of the first X-axis lower film portion Dx1, a second X-axis sensor which detects a displacement in the Z-axis direction of the second X-axis lower film portion, a third X-axis sensor which detects a displacement in the Z-axis direction of the third X-axis lower film portion, a fourth X-axis sensor which detects a displacement in the Z-axis direction of the fourth X-axis lower film portion, a first Y-axis sensor which detects a displacement in the Z-axis direction of the first Y-axis lower film portion, a second Y-axis sensor which detects a displacement in the Z-axis direction of the second Y-axis lower film portion, a third Y-axis sensor which detects a displacement in the Z-axis direction of the third Y-axis lower film portion, and a fourth Y-axis sensor which detects a displacement in the Z-axis direction of the fourth Y-axis lower film portion, are used.

Furthermore, in the embodiment described herein, each sensor consists of a capacitance element including a displacement electrode formed on the lower film portion and a fixed electrode fixed to a position opposed to the displacement electrode. The sensor consisting of the capacitance element can grasp a change in electrode-electrode distance between the displacement electrode and the fixed electrode based on a static capacitance value change, so that a displacement in the Z-axis direction of each lower film portion can be detected as a static capacitance value change.

In the case of the embodiment described herein, the lower substrate 200 is made of a conductive material, so that each lower film portion functions as a displacement electrode with conductivity. Therefore, the first X-axis sensor consists of a first X-axis capacitance element Cx1 including: a first X-axis displacement electrode consisting of the first X-axis lower film portion Dx1; and a first X-axis fixed electrode Ex1 fixed to a position opposed to the first X-axis displacement electrode, the second X-axis sensor consists of a second X-axis capacitance element Cx2 including: a second X-axis displacement electrode consisting of the second X-axis lower film portion Dx2; and a second X-axis fixed electrode Ex2 fixed to a position opposed to the second X-axis displacement electrode, the third X-axis sensor consists of a third X-axis capacitance element Cx3 including: a third X-axis displacement electrode consisting of the third X-axis lower film portion Dx3; and a third X-axis fixed electrode Ex3 fixed to a position opposed to the third X-axis displacement electrode, and the fourth X-axis sensor consists of a fourth X-axis capacitance element Cx4 including: a fourth X-axis displacement electrode consisting of the fourth X-axis lower film portion Dx4; and a fourth X-axis fixed electrode Ex4 fixed to a position opposed to the fourth X-axis displacement electrode.

Similarly, the first Y-axis sensor consists of a first Y-axis capacitance element Cy1 including: a first Y-axis displacement electrode consisting of the first Y-axis lower film portion Dy1; and a first Y-axis fixed electrode Ey1 fixed to a position opposed to the first Y-axis displacement electrode, the second Y-axis sensor consists of a second Y-axis capacitance element Cy2 including: a second Y-axis displacement electrode consisting of the second Y-axis lower film portion Dy2; and a second Y-axis fixed electrode Ey2 fixed to a position opposed to the second Y-axis displacement electrode, the third Y-axis sensor consists of a third Y-axis capacitance element Cy3 including: a third Y-axis displacement electrode consisting of the third Y-axis lower film portion Dy3; and a third Y-axis fixed electrode Ey3 fixed to a position opposed to the third Y-axis displacement electrode, and the fourth Y-axis sensor consists of a fourth Y-axis capacitance element Cy4 including: a fourth Y-axis displacement electrode consisting of the fourth Y-axis lower film portion Dy4; and a fourth Y-axis fixed electrode Ey4 fixed to a position opposed to the fourth Y-axis displacement electrode.

The detection circuit 500 outputs, as detection values, electric signals obtained based on a static capacitance fluctuation value Cx1 of the first X-axis capacitance element Cx1 (here, for convenience, the capacitance element and the static capacitance fluctuation value of this capacitance element are indicated by the same reference symbols), a static capacitance fluctuation value Cx2 of the second X-axis capacitance element Cx2, a static capacitance fluctuation value Cx3 of the third X-axis capacitance element Cx3, a static capacitance fluctuation value Cx4 of the fourth X-axis capacitance element Cx4, a static capacitance fluctuation value Cy1 of the first Y-axis capacitance element Cy1, a static capacitance fluctuation value Cy2 of the second Y-axis capacitance element Cy2, a static capacitance fluctuation value Cy3 of the third Y-axis capacitance element Cy3, and a static capacitance fluctuation value Cy4 of the fourth Y-axis capacitance element Cy4. A method for obtaining detailed detection values will be described in detail in Section 4.

When the lower substrate 200 is made of a nonconductive material, the lower film portions do not have conductivity, so that the lower film portions themselves cannot be utilized as displacement electrodes. In this case, it is allowed that a separate conductive film is formed on the lower surface of each lower film portion and is used as a displacement electrode. Of course, in practical use, as in the embodiment shown herein, for simplifying the structure, it is preferable that the lower substrate 200 is made of a conductive material and each lower film portion itself is made to function as a displacement electrode. When the lower substrate 200 is made of a conductive material, the displacement electrodes are put into conductive states, however, as long as fixed electrodes opposed to the displacement electrodes are electrically independent from each other, the capacitance elements also become electrically independent from each other, and the conductive states do not influence the detecting operation.

The fixed electrodes may be attached according to any method as long as they are fixed to positions opposed to the displacement electrodes, however, in practical use, as in the embodiment described herein, it is preferable that the auxiliary substrate 300 is firmly fixed to the lower surface of the lower substrate 200, and the fixed electrodes are attached to the upper surface of the auxiliary substrate 300. Particularly, as in the illustrated example, when the auxiliary grooves Kx1 to Kx4 and Ky1 to Ky4 are formed respectively at positions below the lower film portions (displacement electrodes) on the upper surface of the auxiliary substrate 300, and the fixed electrodes Ex1 to Ex4 and Ey1 to Ey4 are formed respectively on the bottom surfaces of these auxiliary grooves, the structure becomes simpler, and the assembly also becomes easier.

When configuring the force detection device of the present invention, although the materials of the parts are not especially limited, the upper substrate, the lower substrate, and the columnar members may be made of a metal such as aluminum or stainless steel. Particularly, making the lower substrate of a conductive material enables the lower film portions themselves to be utilized as displacement electrodes. On the other hand, the auxiliary substrate is preferably made of an insulating material such as glass epoxy or ceramic for keeping the fixed electrodes insulated from each other. Of course, it is also allowed that the entirety including the upper substrate, the lower substrate, the columnar members, and the auxiliary substrate is made of an insulating material such as a synthetic resin. In this case, as the displacement electrodes and fixed electrodes, metal plating layers, etc., may be formed.

<<<Section 4>>>

Operations of Force Detection Device of Practical Embodiment of the Present Invention Here, operations of the force detection device of the practical embodiment of the present invention the structure of which is described in Section 3 will be described in detail. This device has a function of detecting six forces of forces Fx, Fy, and Fz in coordinate axis directions and moments Mx, My, and Mz around the coordinate axes in an XYZ three-dimensional coordinate system. For example, when this device is utilized for detecting a force applied to a lower arm with respect to an upper arm of a robot, it is allowed that the auxiliary substrate 300 is fixed to the upper arm side, the upper substrate 100 is fixed to the lower arm side, and this device itself is used as a joint at the elbow portion. Accordingly, six forces Fx, Fy, Fz, Mx, My, and Mz applied to the lower arm can be detected in the state where the upper arm is fixed.

In the application of the present invention, the word "force" is appropriately used for different meanings, that is, a force in a specific coordinate axis direction, and a collective force including moment components. For example, the above-described forces Fx, Fy, and Fz in the coordinate axis directions mean force components in the coordinate axis directions which are not moments, and the wording of six forces Fx, Fy, Fz, Mx, My, and Mz means a collective force including force components in the coordinate axis directions and moment components around the coordinate axes.

In Section 2, in the device of a basic embodiment including only two columnar members, the state when a force in the X-axis direction is applied is described with reference to FIG. 3B. In detail, a deformation form when a force +Fx is applied rightward in the figure to the center of gravity Q of the upper substrate 10 in the state where the lower substrate 20 is fixed is shown, and the upper substrate 10 is in a state where it is moved parallel in the horizontal direction. However, in actuality, it is difficult to apply a force so as to move the upper substrate 10 in only the horizontal direction as described above. The upper substrate 10 is connected to the lower substrate 20 by the two columnar members P1 and P2, so that, for example, when a rightward pressing force is applied horizontally to the left side surface of the upper substrate 10, the upper substrate 10 moves rightward in the figure as a whole, however, the motion of the upper substrate 10 is not only the horizontal motion but also includes a rotational motion.

Specifically, when the origin O is defined at the illustrated position, the force of pressing the left side surface of the upper substrate 10 rightward acts as a moment with respect to the origin O. In other words, the force of pressing the left side surface of the upper substrate 10 rightward can be recognized as a force +Fx in the X-axis direction applied to this force detection device, and can also be recognized as a moment +My around the Y-axis. In addition, the absolute value of the moment changes depending on the position at which the origin O is defined. Thus, as long as the moments Mx, My, and Mz around the respective coordinate axes are handled as detection targets, it is inevitable to identify the position in the coordinate system which becomes a rotation axis of this moment component, and the origin O must be defined at a proper position.

In the example shown in FIG. 3A, the Z-axis is set in the direction perpendicular to the substrates so as to penetrate through the centers of the substrates, and the origin O is defined at an intermediate position between the lower surface of the displacement substrate 20 and the upper surface of the auxiliary substrate 30 on the Z-axis. This is because an intermediate position between a pair of electrodes constituting capacitance elements to be used as sensors is adopted as a reference for determining the origin O on the Z-axis (position reference with respect to the up-down direction). The reason for determining this position as a reference of the origin O is because, as shown in FIG. 3B, when the two columnar members P1 and P2 are displaced by application of an external force, the displacements are detected as static capacitance value changes of the capacitance elements, so that the origin position with respect to the Z-axis direction set at the center position of the capacitance elements which are sensors for directly detecting the displacements is regarded as most appropriate (more strictly, the intermediate position between the upper surfaces of the fixed electrodes E5 and E6 and the lower surfaces of the lower film portions 21 and 22).

Of course, in the device shown in FIGS. 3A and 3B, the force Fx and the moment My cannot be detected distinctly, and a difference in static capacitance value between the pair of capacitance elements includes detection values of both the force Fx and the moment My. Therefore, the device of the basic embodiment shown in FIGS. 3A and 3B is utilized in an environment which does not need strict distinction between a force and a moment, for measuring. On the other hand, a device (the device shown in FIG. 8) of a practical embodiment the structure of which is described in Section 3 has a function of measuring a force and a moment distinctly. Hereinafter, this measuring function will be described.

In the case of this embodiment as well, the position of the origin O of the XYZ three-dimensional coordinate system is defined by defining the Z-axis at a position penetrating through the center points of the substrates and defining the center position of the capacitance elements constituting sensors as a reference position with respect to the Z-axis direction. The origin O shown in FIG. 8 is defined on this assumption.

Figure 22:
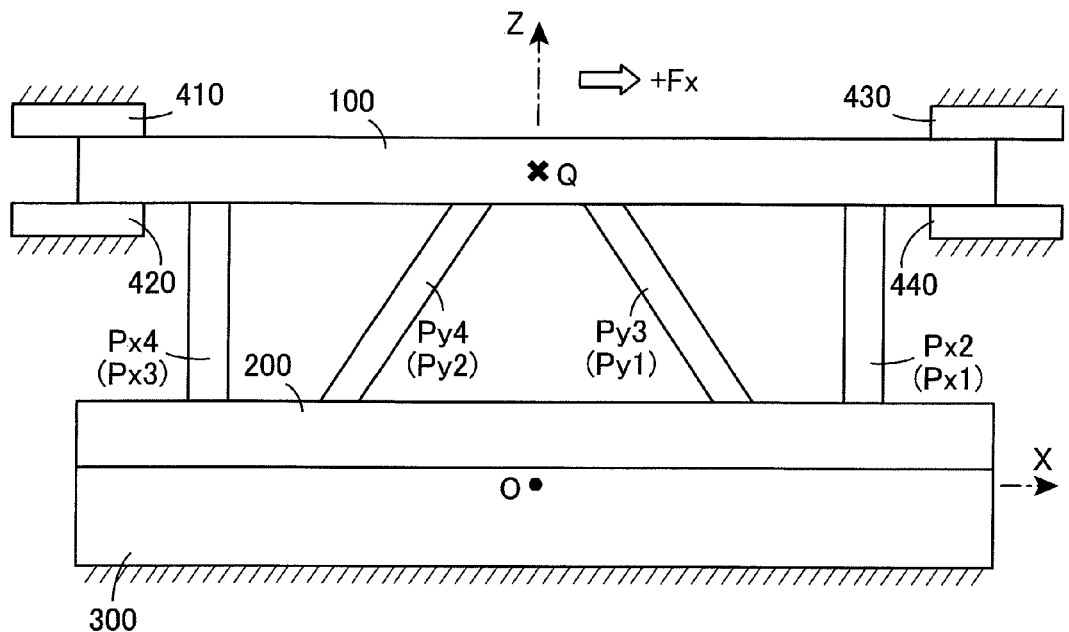
FIG. 22 is a front view showing a structure example for causing the force detection device shown in FIG. 8 to be deformed only by a force +Fx.

In the device shown in FIG. 8, for example, when a rightward pressing force is applied horizontally to the left side surface of the upper substrate 100, the upper substrate 100 moves rightward in the figure as a whole, and the motion of the upper substrate 100 is still not only the horizontal motion but also includes a rotational motion. When it is desired to apply only the force component +Fx in the X-axis direction to this device, for example, the guide members 410 to 440 as shown in FIG. 22 may be provided. The guide members 410 and 420 are members which support both upper and lower surfaces of the left portion of the upper substrate 100, and the guide members 430 and 440 are members which support both upper and lower surfaces of the right portion of the upper substrate 100.

As illustrated, by fixing the auxiliary substrate 300 and the guide members 410 to 440, the movement direction of the upper substrate 100 is limited to only the horizontal direction, so that when a rightward pressing force is applied to the left side surface of the upper substrate 100, the upper substrate 100 moves only rightward in the figure horizontally. The deformation state of the device at this time is a deformation state when only the force +Fx is applied to the device. On the contrary, a state when a leftward pressing force is applied to the right side surface of the upper substrate 100 is a deformation state when only the force −Fx is applied to the device. A deformation state when the force +Fy or −Fy is applied to this device is also the same.

Figure 23:
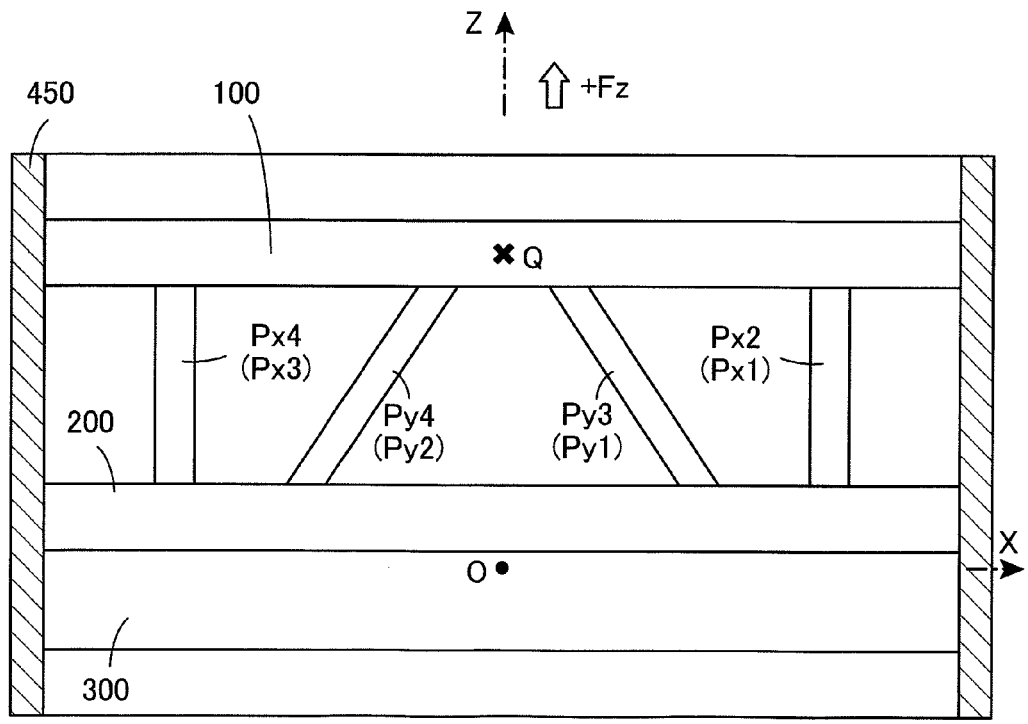
FIG. 23 is a front view showing a structure example for causing the force detection device shown in FIG. 8 to be deformed only by a force +Fz (a guide member 450 is shown in a section).

Next, a case where this device is provided with a guide member 450 as shown in FIG. 23 is considered. The guide member 450 is a cylindrical member having an inner periphery substantially equal to the outer peripheries of the substrates 100, 200, and 300, and can house the whole device inside. Here, in a state where the substrates 200 and 300 are fixed to the guide member 450, when a force of pulling the upper substrate 100 upward is applied, a deformation state of the device at this time is a deformation state when only the force +Fz is applied to the device. On the contrary, when a force of pushing-down is applied to the upper substrate 100, a deformation state of the device at this time is a deformation state when only the force −Fz is applied to the device.

Figure 24:
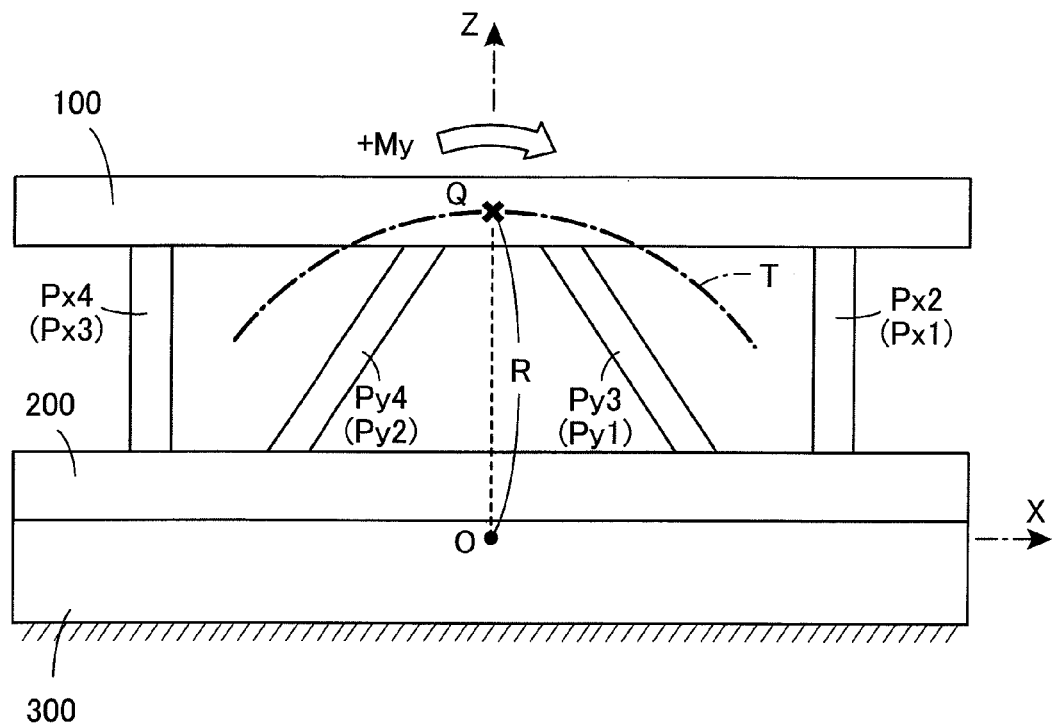
FIG. 24 is a front view showing the way of causing the force detection device shown in FIG. 8 to be deformed only by a moment +My.

Subsequently, a state where only a moment is applied to this device is considered. FIG. 24 is a front view showing the way of causing the force detection device shown in FIG. 8 to be determined only by the moment +My. In FIG. 24, the Y-axis is a vertical axis extending toward the back surface side of the paper sheet, so that the moment +My corresponds to a force of rotating the point of application Q of the upper substrate 100 clockwise around the origin O in the state where the lower substrate 200 is fixed. When this moment +My is applied, the point of application Q moves along an arc trajectory T (indicated by an alternate long and short dashed line) with a radius R. In the application of the present invention, the rotation direction of a right screw when the right screw is rotationally advanced in the positive direction of a predetermined coordinate axis is defined as a positive moment around the coordinate axis. The negative moment −My corresponds to a force of rotating the point of application Q counterclockwise around the origin O.

Of course, to move the point of application Q along the arc trajectory T, an external force must be applied to the upper substrate 100 by using a proper method, and by applying such an external force by some method, a deformation state when the moment My around the Y-axis is applied is obtained. The same applies to the deformation state when the moment Mx around the X-axis is applied.

Figure 25:
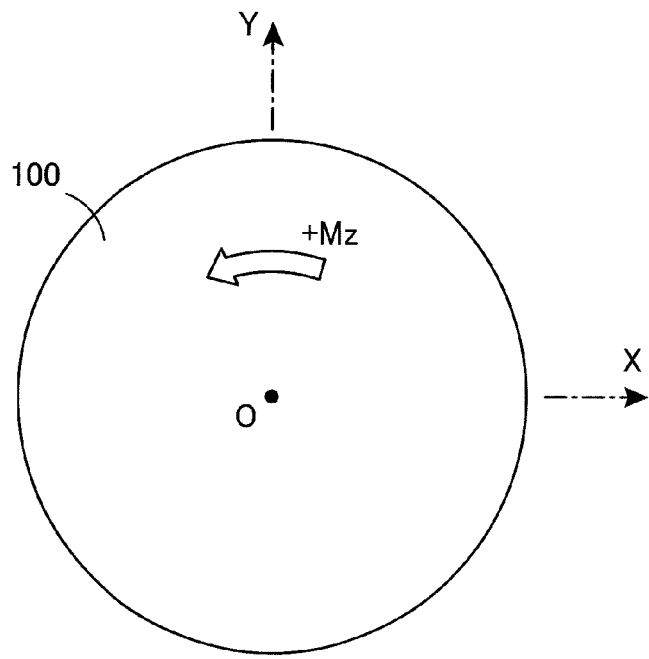
FIG. 25 is a top view showing the force detection device shown in FIG. 8 deformed only by a moment +Mz.

Last, a case where a moment Mz around the Z-axis is applied is considered. FIG. 25 is a top view showing the force detection device shown in FIG. 8 deformed only by the moment +Mz. As illustrated, the moment +Mz corresponds to a force of rotating the upper substrate 100 counterclockwise around the Z-axis as viewed from above in the state where the lower substrate 200 is fixed. Similarly, the moment −Mz corresponds to a force of rotating the upper substrate 100 clockwise around the Z-axis as viewed from above. Thus, to obtain the deformation state when only a moment Mz is applied, for example, as shown in FIG. 23, it is allowed that the whole device is housed in the cylindrical guide member 450, the substrates 200 and 300 are fixed to the guide member 450, and a rotative force around the Z-axis is applied to the upper substrate 100.

A method for obtaining a deformation state when only any one of six forces Fx, Fy, Fz, Mx, My, and Mz is applied to the point of application Q on the upper substrate 100 in the state where the lower substrate 200 is fixed, is described above. Of course, when utilizing this device in actuality, provision of the above-described guide members 410 to 450 are not always necessary. The above-described utilization example in which the guide members 410 to 450 are provided is just for describing the deformation states when only one force component is applied, and in actuality, a utilization form which does not use such guide members is more general. Therefore, in practical use, a plurality of force components among the six force components are mixed and applied.

The force detection device shown herein can detect six force components independent of each other even in an environment in which a plurality of force components are mixed and applied. First, changes of the static capacitance values of the eight capacitance elements Cx1 to Cx4 and Cy1 to Cy4 when the six forces are applied singly, are considered. FIG. 26 is a table showing capacitance value changes of the capacitance elements in the six deformation states.

The symbols in the columns of the table indicate capacitance value changes with respect to a reference state where no external force is applied, and "0" means no change, "+Δ" or "+δ" means an increase, and "−Δ" or "−δ" means a decrease. Here, "+Δ" and "+δ" mean a capacitance value increase, and "+Δ" means a change greater than "+δ." Similarly, "−Δ" and "−δ" mean a capacitance value decrease, and "−Δ" means a change greater than "−δ."

Of course, "Δ" and "δ" do not indicate specific absolute values but indicate degrees of changes, so that, for example, the actual capacitance value fluctuation amounts in the plurality of columns with "+Δ" are not always equal to each other. FIG. 26 shows capacitance value changes when positive forces +Fx, +Fy, +Fz, +Mx, +My and +Mz are applied, and capacitance value changes when negative forces −Fx, −Fy, −Fz, −Mx, −My, and −Mz are applied are values with signs reverse to the signs shown in the columns.

The reason why the static capacitance values of the eight capacitance elements Cx1 to Cx4 and Cy1 to Cy4 change as the table in FIG. 26 when six forces are applied singly can be easily understood by referring to the deformation state of the device including only two columnar members described in Section 2.

For example, when only the force +Fx is applied, as shown in FIG. 22, in an environment in which guide members 410 to 440 are provided, a state where the upper substrate 100 moves rightward horizontally is considered. At this time, the inclination form of the pair of Y-axis columnar members Py3 and Py4 and the inclination form of the pair of Y-axis columnar members Py1 and Py2 are the same as the inclination form of the pair of columnar members P1 and P2 shown in FIGS. 3A and 3B. Therefore, the capacitance value of the capacitance element Cy3 increases, and the capacitance value of the capacitance element Cy4 decreases. The capacitance value of the capacitance element Cy1 increases, and the capacitance value of the capacitance element Cy2 decreases. The indications "+Δ, −Δ, +Δ, −Δ" in the "columns of Cy1 to Cy4" in the row of "+Fx" of the table of FIG. 26 are based on these results of capacitance changes.

On the other hand, as shown in FIG. 22, in the standard state where no external force is applied, the four X-axis columnar members Px1 to Px4 are inclined with respect to the Y-axis direction, but are not inclined in the X-axis direction. Therefore, when the upper substrate 100 is moved rightward horizontally by application of the external force +Fx, the four X-axis columnar members Px1 to Px4 incline rightward in the figure, and the inclination form of these is the same as the inclination form of the pair of columnar members 41 and 42 shown in FIG. 2B.

However, in the case of the conventional device shown in FIG. 2B, the inclination degree of the columnar member 41 is measured as a capacitance value difference "C2−C1" between the pair of capacitance elements C1 and C2, and the inclination degree of the columnar member 42 is measured as a capacitance value difference "C4−C3" between the pair of capacitance elements C3 and C4. On the other hand, in the present invention, as shown in FIG. 18, for detecting a displacement of the columnar member Px2, only one capacitance element Cx2 (the lower film portion Dx2 and the fixed electrode Ex2) is provided, and for detecting a displacement of the columnar member Px4, only one capacitance element Cx4 (the lower film portion Dx4 and the fixed electrode Ex4) is provided. Therefore, even when the columnar members Px2 and Px4 incline rightward in the figure and the lower film portions Dx2 and Dx4 are deformed, the electrode-electrode distances of the capacitance elements Cx2 and Cx4 decrease in the right half of the figure and increase in the left half of the figure, so that no change occurs in static capacitance value in total for the capacitance elements Cx2 and Cx4. The indications "0" in the "columns of Cx1 to Cx4" in the row of "+Fx" of the table of FIG. 26 are based on these results.

A deformation state when only the force +Fy is applied is obtained by rotating the deformation state when only the force +Fx is applied around the Z-axis by 45 degrees, so that the results in which the capacitance value changes of the capacitance elements Cx1 to Cx4 and the capacitance value changes of the capacitance elements Cy1 to Cy4 are replaced with each other are obtained. The row of "+Fy" of the table of FIG. 26 is based on these results.

Next, a case where only the force +Fz is applied is considered. In this case, the deformation form as shown in FIG. 4A is obtained for all the eight columnar members. Therefore, all capacitance values of the eight capacitance elements Cx1 to Cx4 and Cy1 to Cy4 decrease. The row of "+Fz" of the table of FIG. 26 is based on these results.

Subsequently, a case where only a moment is applied is considered. Here, for convenience of the description, first, as shown in FIG. 24, a deformation state when only the moment +My around the Y-axis is applied is considered. In this case, the right half of the upper substrate 100 moves downward, and the left half moves upward. Therefore, to the lower ends of the four columnar members Px1, Px2, Py1, and Py3 disposed in the right half, a downward force is applied, and the lower film portions for these columnar members are warped downward. As a result, the electrode-electrode distances of the capacitance elements Cx1, Cx2, Cy1, and Cy3 decrease, and the capacitance values increase. On the other hand, to the lower ends of the four columnar members Px3, Px4, Py2, and Py4 disposed in the left half, an upward force is applied, and the lower film portions warp upward. As a result, the electrode-electrode distances of the capacitance elements Cx3, Cx4, Cy2, and Cy4 increase, and the capacitance values decrease.

Thus, the capacitance values of the capacitance elements Cx1, Cx2, Cy1, and Cy3 disposed in the right half of the figure increase, and the capacitance values of the capacitance elements Cx3, Cx4, Cy2, and Cy4 disposed in the left half of the figure decrease, and the degree of the increase or decrease is different among the capacitance elements. For example, when the columnar member Px2 is compared with the columnar member Py3 shown in FIG. 24, the columnar member Px2 is disposed outside of the upper substrate 100 with respect to the X-axis direction, and is not inclined with respect to the X-axis direction, so that the displacement amount in the up-down direction according to the moment +My is comparatively great. On the other hand, the columnar member Py3 is disposed inside of the upper substrate 100 with respect to the X-axis direction, and is inclined with respect to the X-axis direction, so that the displacement amount in the up-down direction according to the moment +My is comparatively small.

The row of "+My" of the table of FIG. 26 is based on these results. Specifically, a result "+" is shown for the capacitance elements Cx1, Cx2, Cy1, and Cy3 disposed in the right half of the figure, and a result "−" is shown for the capacitance elements Cx3, Cx4, Cy2, and Cy4 disposed in the left half of the figure. For the capacitance elements Cx1 to Cx4 with comparatively large displacement amounts in the up-down direction according to the moment +My, "Δ" indicating a large capacitance value fluctuation amount is shown, and for the capacitance elements Cy1 to Cy4 with comparatively large displacement amounts in the up-down direction according to the moment +My, "δ" indicating a small capacitance value fluctuation amount is indicated. The indication of "δ" in parentheses is for showing that, as described later, when obtaining of a detection value with comparatively low accuracy is sufficient, "δ" can be approximately regarded as δ=0.

A deformation state when only the moment +Mx is applied is equal to a state obtained by rotating the deformation state when only the moment +My is applied by 45 degrees around the Z-axis, and therefore, based on the same concept as described above, the capacitance value changes of the capacitance elements are obtained. The row of "+Mx" in the table of FIG. 26 is based on these results.

Last, a case where only the moment +Mz is applied is considered. In this case, as shown in FIG. 25, the upper substrate 100 rotates, so that all eight columnar members incline in directions depending on the rotation direction of the upper substrate 100. The detained inclination form of the columnar members can be easily understood by referring to the plan view of FIG. 21. The hatched circles shown in FIG. 21 indicate the upper end faces of the columnar members. When the moment +Mz is applied, these upper end faces rotate counterclockwise. As a result, the four columnar members Px1, Py2, Px4 and Py3 incline in directions of rising, so that a downward force is applied to the lower ends of the columnar members, and the lower film portions for these columnar members are warped downward. As a result, the electrode-electrode distances of the capacitance elements Cx1, Cy2, Cx4, and Cy3 decrease, and the capacitance values of these increase. On the other hand, the remaining four columnar members Px2, Py1, Px3, and Py4 incline in laying-down directions, and an upward force is applied to the lower ends of these columnar members, and the lower film portions for these columnar members are warped upward. As a result, the electrode-electrode distances of the capacitance elements Cx2, Cy1, Cx3, and Cy4 increase, and the capacitance values of these decrease. The row of "+Mz" in the table of FIG. 26 is based on these results.

Here, it is no longer necessary to describe that the capacitance value changes when the negative forces −Fx, −Fy, −Fz, −Mx, −My, and −Mz are applied are capacitance value changes with signs reverse to the signs shown in the columns of the table of FIG. 26. The results shown in the table of FIG. 26 are on the assumption that, as shown in the plan view of FIG. 21, the positive orthogonal projection image of the first X-axis columnar member Px1 onto the XY plane and the positive orthogonal projection image of the first Y-axis columnar member Py1 onto the XY plane are positioned in the first quadrant of the XY coordinate system, the positive orthogonal projection image of the third X-axis columnar member Px3 onto the XY plane and the positive orthogonal projection image of the second Y-axis columnar member Py2 onto the XY plane are positioned in the second quadrant of the XY coordinate system, the positive orthogonal projection image of the fourth X-axis columnar member Px4 onto the XY plane and the positive orthogonal projection image of the fourth Y-axis columnar member Py4 onto the XY plane are positioned in the third quadrant of the XY coordinate system, and the positive orthogonal projection image of the second X-axis columnar member Px2 onto the XY plane and the positive orthogonal projection image of the third Y-axis columnar member Py3 onto the XY plane are positioned in the fourth quadrant of the XY coordinate system.

The results shown in the table of FIG. 26 are on the assumption that a configuration is adopted in which the first to fourth X-axis columnar members Px1 to Px4 are inclined so that the upper ends thereof become closer to the XZ plane than the lower ends, and the first to fourth Y-axis columnar members Py1 to Py4 are inclined so that the upper ends thereof become closer to the YZ plane than the lower ends (in other words, as viewed from the front or lateral side, a pair of columnar members are inclined in an inverted V shape). Of course, a configuration opposite to the above-described configuration, that is, the configuration in which the first to fourth X-axis columnar members Px1 to Px4 are inclined so that the lower ends thereof become closer to the XZ plane than the upper ends, and the first to fourth Y-axis columnar members Py1 to Py4 are inclined so that the lower ends thereof become closer to the YZ plane than the upper ends (in other words, as viewed from the front or lateral side, a pair of columnar members are inclined in a V shape) can also be adopted. In this case, the signs shown in some columns in the table of FIG. 26 are reversed.

From the results shown in the table of FIG. 26, it can be understood that the six forces Fx, Fy, Fz, Mx, My, and Mz can be detected independent of each other based on the static capacitance values of the eight capacitance elements Cx1 to Cx4 and Cy1 to Cy4 (that is, displacements in the Z-axis direction of the eight lower film portions). In other words, the six forces Fx, Fy, Fz, Mx, My, and Mz can be calculated by arithmetic operations based on the eight static capacitance values Cx1 to Cx4 and Cy1 to Cy4.

However, to simplify the arithmetic operation, geometric symmetry is preferably secured at the mechanical structure portion of the device. In actuality, in the illustrated device, such symmetry is kept. Specifically, in the case of the device shown in FIG. 8, the main structural body including the upper substrate 100, the lower substrate 200, and the eight columnar members Px1 to Px4 and Py1 to Py4 is symmetrical about the XZ plane, and also symmetrical about the YZ plane. In other words, this means that the structural body including the eight columnar members, the eight upper film portions, and the eight lower film portions is symmetrical about the XZ plane and also symmetrical about the YZ plane, and when two external forces geometrically symmetrical to each other are applied, deformation forms caused in the structural body are also geometrically symmetrical.

For example, the deformation state when the force +Fx is applied and the deformation state when the force −Fx is applied are in a mirror image relationship with each other about the YZ plane. The deformation state when the force +Fx is applied is equal to a state obtained by rotating the deformation state when the force +Fy is applied by 90 degrees around the Z-axis. In the illustrated device, the same geometrical symmetry is also secured for the auxiliary substrate 300, however, the auxiliary substrate 300 is a structural body which performs a role of supporting the fixed electrodes, and the auxiliary substrate 300 itself may not have symmetry as long as the eight fixed electrodes have symmetry.

When such geometrical symmetry is secured, in the table of FIG. 26, the absolute values of "Δ" and "δ" at least belonging to the same row become equal to each other. Further, the absolute values of "Δ" in the columns belonging to the row of "+Fx" and the absolute values of "Δ" in the columns belonging to the row of "+Fy" become equal to each other, and the absolute values of "Δ" and "δ" in the columns belonging to the row of "+Mx" and the absolute values of these in the columns belonging to the row of "+My." Therefore, by the arithmetic operation shown in FIG. 27, the detection values V(Fx)*, V(Fy)*, V(Fz), V(Mx), V(My), and V(Mz) of the six forces Fx, Fy, Fz, Mx, My, and Mz can be obtained. Here, the detection values V(Fx)*, and V(Fy)* with the "*" mark are approximate values when δ=0.

Hereinafter, it is described that detection values of the six forces Fx, Fy, Fz, Mx, My, and Mz can be obtained according to the arithmetic expressions shown in FIG. 27. First, the detection value (approximate value) V(Fx)* of the force Fx can be obtained by an arithmetic operation based on an expression "(Cy1−Cy2)+(Cy3−Cy4)." Specifically, in the table of FIG. 26, by carrying out an arithmetic operation based on the expression for the columns belonging to the row of "+Fx," the value "4Δ" is obtained, and this indicates the applied force Fx. When the operated value is positive, this means that the force +Fx has been applied, and when the operated value is negative, this means that the force −Fx has been applied. Here, when δ=0, all results of arithmetic operations carried out based on the above-described expression for the columns belonging to five rows other than "+Fx" become zero. This means that the detection value V(Fx)* obtained according to the arithmetic expression becomes a value containing only the Fx component of the applied force when it is assumed that δ=0.

Similarly, the detection value (approximate value) V(Fy)* of the force Fy can be obtained by an arithmetic operation based on an expression "(Cx1−Cx2)+(Cx3−Cx4)." The reason for this can be easily understood from the results of arithmetic operations based on the expression carried out for the columns belonging to the row of "+Fy" in the table of FIG. 26. The operated value becomes also a value containing only the Fy component of the applied force when it is assumed that δ=0.

On the other hand, the detection value of the force Fz can be obtained by an arithmetic operation based on an arithmetic expression No. 1 "−(Cx1+Cx2+Cx3+Cx4+Cy1+Cy2+Cy3+Cy4)," or an arithmetic expression No. 2 "−(Cx1+Cx2+Cx3+Cx4)," or an arithmetic expression No. 3 "−(Cy1+Cy2+Cy3+Cy4)." The arithmetic expression No. 1 shows an arithmetic operation for summing up the capacitance fluctuation values of all eight capacitance elements and then reversing the sign. All columns belonging to the row of "+Fz" in the table of FIG. 26 show "−Δ," so that by summing up these and reversing the sign, a value "8Δ" is obtained. This value indicates the applied force Fz, and when the operated value is positive, this means that the force +Fz has been applied, and when the operated value is negative, this means that the force −Fz has been applied.

Here, all results of arithmetic operations carried out based on the above-described expression for the columns belonging to five rows other than "+Fz" become zero (in this case, δ=0 is not always required). This means that the detection value V(Fz) obtained according to the arithmetic expression contains only the Fz component of the applied force. Even when an arithmetic operation is carried out by using the arithmetic expression No. 2 or 3 instead of the arithmetic expression No. 1, the same results are obtained. However, the result of arithmetic operation seems to become highest in accuracy when using the arithmetic expression No. 1, so that the arithmetic expression No. 1 is preferably used in practical use.

Next, the detection value of the moment Mx can be obtained by an arithmetic operation based on an expression "(Cy3+Cy4)−(Cy1+Cy2)." Specifically, in the table of FIG. 26, by carrying out an arithmetic operation based on the expression for the columns belonging to the row of "+Mx," the value "4Δ" is obtained, and this indicates the applied moment Mx. When the operated value is positive, this means that a force +Mx has been applied, and when the operated value is negative, this means that a force −Mx has been applied. Here, all results of arithmetic operations carried out based on the above-described arithmetic expression for the columns belonging to five rows other than "+Mx" become zero (in this case, δ=0 is not always required). This means that the detection value V(Mx) obtained according to the above-described expression becomes a value containing only the Fx component of the applied force.

Similarly, the detection value V(My) of the moment My can be obtained by an arithmetic operation based on an expression "(Cx1+Cx2)−(Cx3+Cx4)." The reason for this can be easily understood by referring to the results of arithmetic operations based on the expression carried out for the columns belonging to the row of "+My" in the table of FIG. 26. This operated value also contains only the My component of the applied force.

Last, the detection value of the moment Mz can be obtained by an arithmetic operation based on an expression "(Cx1−Cx2)+(Cx4−Cx3)+(Cy2−Cy1)+(Cy3−Cy4)." Specifically, in the table of FIG. 26, by carrying out an arithmetic operation for the columns belonging to the row of "+Mz" based on the expression, the value "8Δ" is obtained, and this indicates the applied moment Mz. When the operated value is positive, this means that a force +Mz has been applied, and when the operated value is negative, this means that a force −Mz has been applied. Here, all results of arithmetic operations carried out based on the above-described expression for the columns belonging to five rows other than "+Mz" become zero (in this case, δ=0 is not always required). This means that the detection value V(Mz) obtained according to the arithmetic expression becomes a value containing only the Mz component of the applied force.

Eventually, in the force detection device shown in FIG. 8, by providing the detection circuit 500 with a function of detecting static capacitance fluctuation values of the eight capacitance elements Cx1 to Cx4 and Cy1 to Cy4 as electric signals, carrying out arithmetic operations based on the above-described arithmetic expressions described above by using these electric signals, and obtaining signal values corresponding to values obtained as results of the arithmetic operations as detection values of the six forces Fx, Fy, Fz, Mx, My, and Mz, the detection values can be output from the detection circuit 500. In detail, for example, the detection circuit 500 can include a C/V converter which converts static capacitance values of the capacitance elements into voltage values and an analog arithmetic unit which performs addition to and subtraction from these voltage values. Of course, a digital arithmetic unit or a microprocessor may be used instead of the analog arithmetic unit.

As described above, "δ" in the table of FIG. 26 shows a fluctuation amount smaller than "Δ" so that δ can be approximately handled as δ=0. In the arithmetic expressions shown in FIG. 27, V(Fx)* and V(Fy)* are approximate values obtained based on this handling. However, when detection with higher accuracy is required, accurate detection values can be obtained according to the following method.

Figures 28, 29:
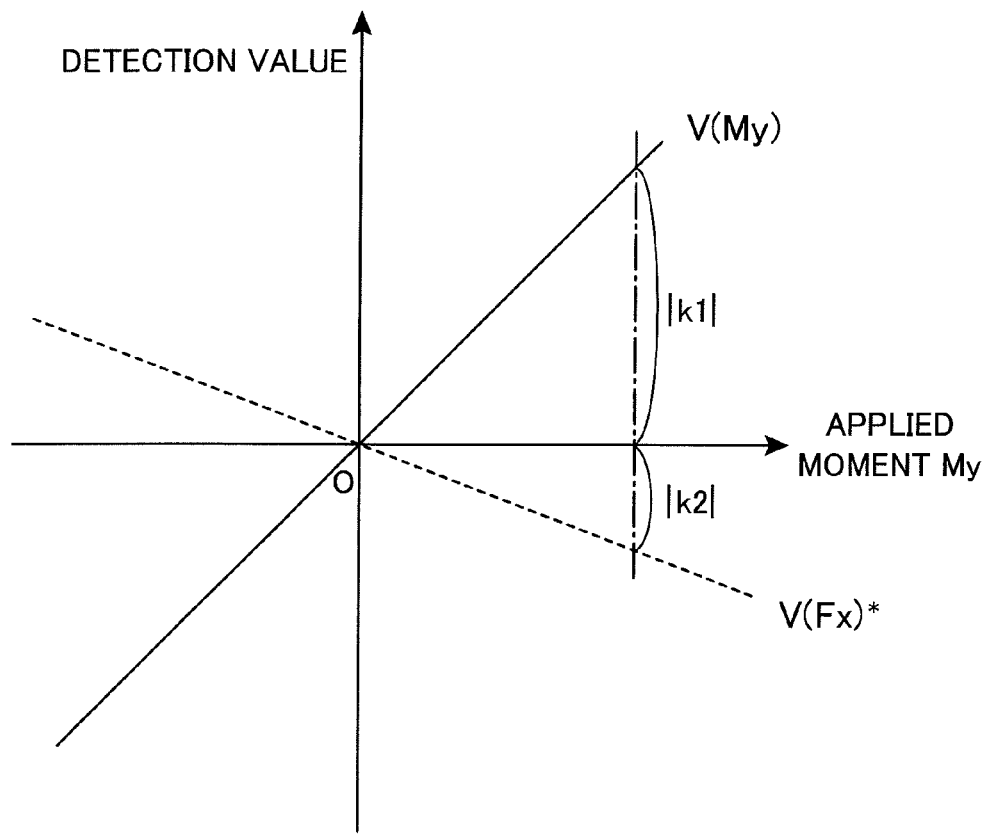
FIG. 28 is a graph showing other axis interference occurring in the force detection device shown in FIG. 8.
FIG. 29 is a view showing expressions to be used for obtaining accurate detection values by offsetting other axis interference shown in FIG. 28.

First, by using an actual device, an experiment in which only a moment My is applied to the point of application Q is carried out. In detail, as shown in FIG. 24, a force of moving the point of application Q along the arc trajectory T is applied. For example, it is allowed that some drive device which applies a rotational force around the Y-axis as a central axis is prepared, and the rotational force is applied to the point of application Q. At this time, static capacitance values of the capacitance elements are measured, and according to the arithmetic expressions of FIG. 27, detection values V(My) and V(Fx)* are obtained. The graph of FIG. 28 shows the results of this experiment. The horizontal axis of the graph indicates an actual value of the moment My applied experimentally, and the vertical axis of the graph indicates a detection value obtained at this time (operated value based on the expressions of FIG. 27). The right-upward aslant graph shown by the solid line indicates an operated value V(My) and the right-downward aslant graph shown by the dashed line indicates an operated value V(Fx)*.

In this experiment, only the moment My is applied, so that in principle, only the detection value of My shown by the solid-line graph is output, and the detection value of Fx shown by the dashed-line graph should not be output. The reason for the output of the detection value of Fx in spite of the principle is because "δ=0" is not true in actuality. In other words, the operated value V(Fx)* contains not only the detected component of the force Fx but also the detected component of the moment My, and this indicates other axis interference. The dashed-line graph of FIG. 28 obtained by the experiment indicates the detected component of the moment My.

Therefore, to obtain only the component of the force Fx accurately, it is allowed that an arithmetic operation for excluding the detected component of the moment My (that is, the component shown by the dashed-line graph of FIG. 28) from the operated value V(Fx)* is carried out.

As shown in FIG. 28, in the case of the force detection device of the present invention, unless an excessively great force is applied and causes an excessively great deformation, substantially linear outputs of the six force detection values are obtained. This means that the dashed-line graph is obtained by using the solid-line graph shown in FIG. 28. Specifically, the operated values V(My) and V(Fx)* indicated by the alternate long and short dashed line in FIG. 28, obtained when a specific moment My is applied, are defined as k1 and k2 (in the case of the example of FIG. 28, k1 is positive and k2 is negative), respectively, when an arbitrary moment My is applied, a ratio of the operated value V(My) to V(Fx)* becomes k1:k2. Therefore, by obtaining k1 and k2 as coefficients in advance by experiment, when the arbitrary moment My is applied, the absolute value of the detected component of the moment My (other axis interference component caused by the moment My) contained in the obtained V(Fx)* is obtained according to k2/k1·V(My).

Therefore, the accurate detection value V(Fx) of the force Fx from which this other axis interference component is removed can be obtained according to the arithmetic expression:

$$V(Fx)=V(Fx)*-k2/k1 \cdot V(My)$$

as shown in FIG. 29. Similarly, by obtaining the ratio "k3:k4" of the operated values V(Mx) to V(Fy)* when an arbitrary moment Mx is applied by experiment, an accurate detection value V(Fy) of the force Fy from which the other axis interference component is removed can be obtained according to the following arithmetic expression:

$$V(Fy)=V(Fy)*-k4/k3 \cdot V(Mx)$$

The coefficients k1 to k4 can be obtained by experiment using an actual device as described above, however, instead of this, the coefficients k1 to k4 can also be obtained through a computer simulation using the finite element method, etc.

Eventually, to obtain accurate values of the force Fx and the force Fy, it is allowed that the coefficients k1 to k4 are obtained in advance by experiment or computer simulations, and the detection circuit 500 is made to carry out arithmetic operations by using these coefficients based on the following arithmetic expressions:

$$V(Fx)=(Cy1-Cy2)+(Cy3-Cy4)-k2/k1 \cdot V(My)$$

$$V(Fy)=(Cx1-Cx2)+(Cx3-Cx4)-k4/k3 \cdot V(Mx)$$

and output signal values corresponding to these operation results as accurate detection values of the force Fx and the force Fy.

When the device of the present invention is provided as an industrial product, if an accurate position of the origin O must be described in product specifications, the accurate position of the origin O may be obtained by actual measurement using the actual device. In detail, for example, an application bar is joined to the upper surface center position of the upper substrate 10 in the device shown in FIGS. 3A and 3B so as to stand vertically. Then, the point of application is defined at the position of the height h of the application bar (height when the upper surface of the upper substrate 10 is defined as a reference h=0), and an experiment is carried out by applying a fixed force (for example, force of 10N) in the X-axis direction to the point of application. In this case, a detection value of the force Fx in the X-axis direction is fixed regardless of the height h of the point of application, however, a detection value of the moment My around the Y-axis changes linearly according to the height h of the point of application (as h becomes higher, the absolute value of the detection value also becomes higher). Therefore, for a plurality of heights h, detection values of the moment My are obtained, a graph showing the linear relationship between h and My is prepared, and by extrapolating the height h (is lower than the upper substrate 10, and becomes a negative value) which makes My=0 from this graph, the position corresponding to the height h on the Z-axis is the origin O of this device.

<<<Section 5>>>

Exemplary Variation of Force Detection Device of the Present Invention

Hereinafter, various exemplary variations of the force detection device of the present invention described in Sections 2 to 4 will be described.

<5-1: Exemplary Variation Using Annular Groove>

In the practical embodiment described in Section 3, at the connection positions of the upper substrate 100 and the lower substrate 200 to the columnar members, upper grooves Gx1 to Gx4 and Gy1 to Gy4 and lower grooves Hx1 to Hx4 and Hy1 to Hy4 are formed, the bottom portions of the individual upper grooves form upper film portions Bx1 to Bx4 and By1 to By4, and the bottom portions of the individual lower grooves form the lower film portions Dx1 to Dx4 and Dy1 to Dy4. In the exemplary variation described herein, an annular groove is formed by coupling the individual grooves to each other.

Figure 30:
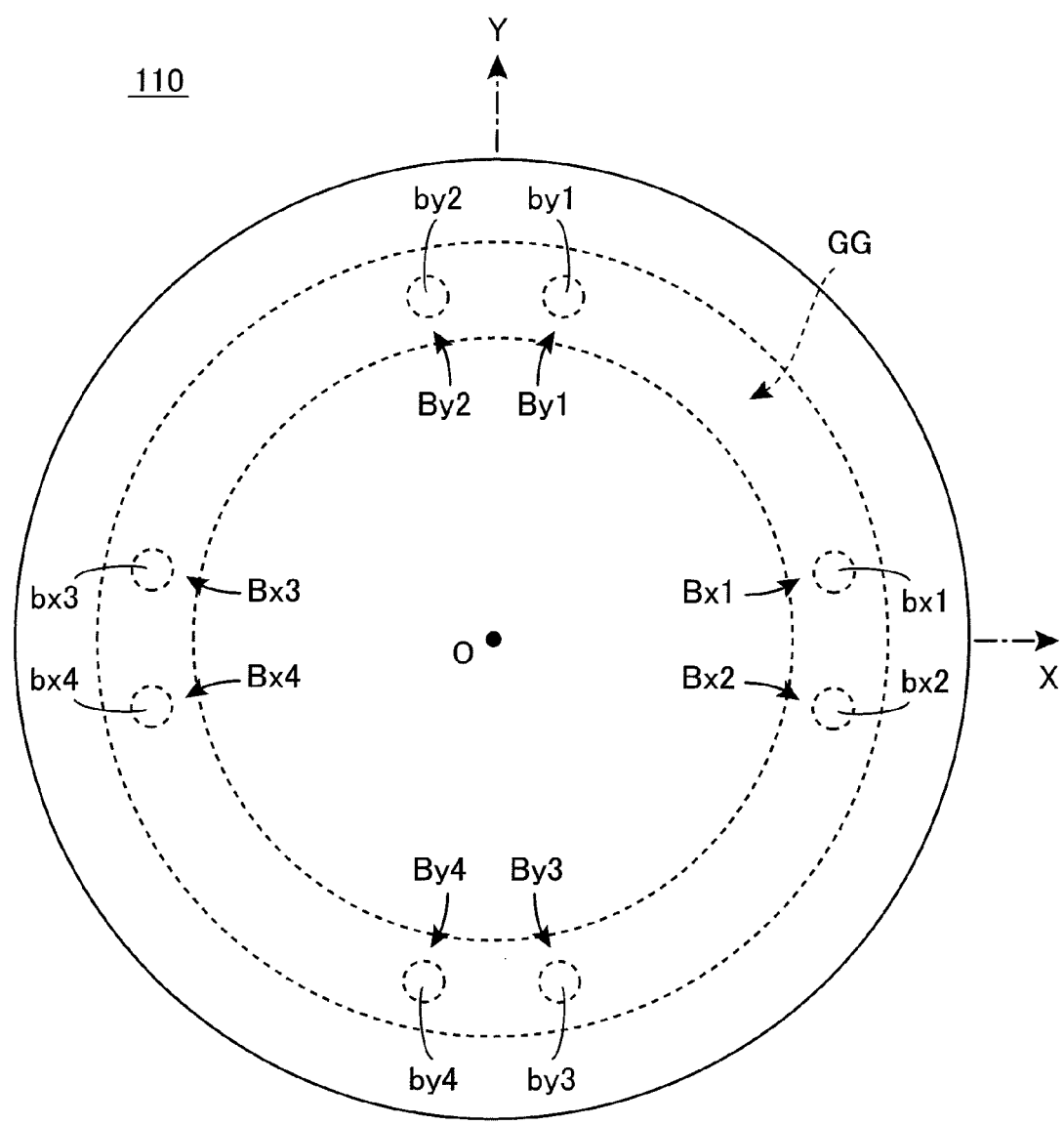
FIG. 30 is a top view showing an exemplary variation of the upper substrate of FIG. 10.

FIG. 30 is a top view showing an upper substrate 110 as an exemplary variation of the upper substrate 100 of FIG. 10. As illustrated, on the lower surface of the upper substrate 110, an upper annular groove GG is formed so as to couple the connection positions of the eight columnar members. This upper annular groove GG is a ring-shaped groove coupling the eight upper grooves Gx1 to Gx4 and Gy1 to Gy4 shown in FIG. 10. At the bottom portion of the groove, projections bx1 to bx4 and by1 to by4 are formed, and the upper ends of the columnar members are joined to these projections as in the case of the embodiment described in Section 3. In this exemplary variation, the entire ring-shaped region in which the upper annular groove GG is formed forms an upper film portion having flexibility, and particularly, peripheral portions of the projections bx1 to bx4 and by1 to by4 function as upper film portions Bx1 to Bx4 and By1 to By4.

Of course, the upper annular groove GG may be formed on the upper surface of the upper substrate 110. That is, in this exemplary variation, it is allowed that on the upper surface side or the lower surface side of the upper substrate 110, an upper annular groove GG coupling the connection positions of the columnar members is formed, and portions of the bottom portion of this upper annular groove GG form the first to fourth X-axis upper film portions Bx1 to Bx4 and the first to fourth Y-axis upper film portions By1 to By4.

Figure 31:
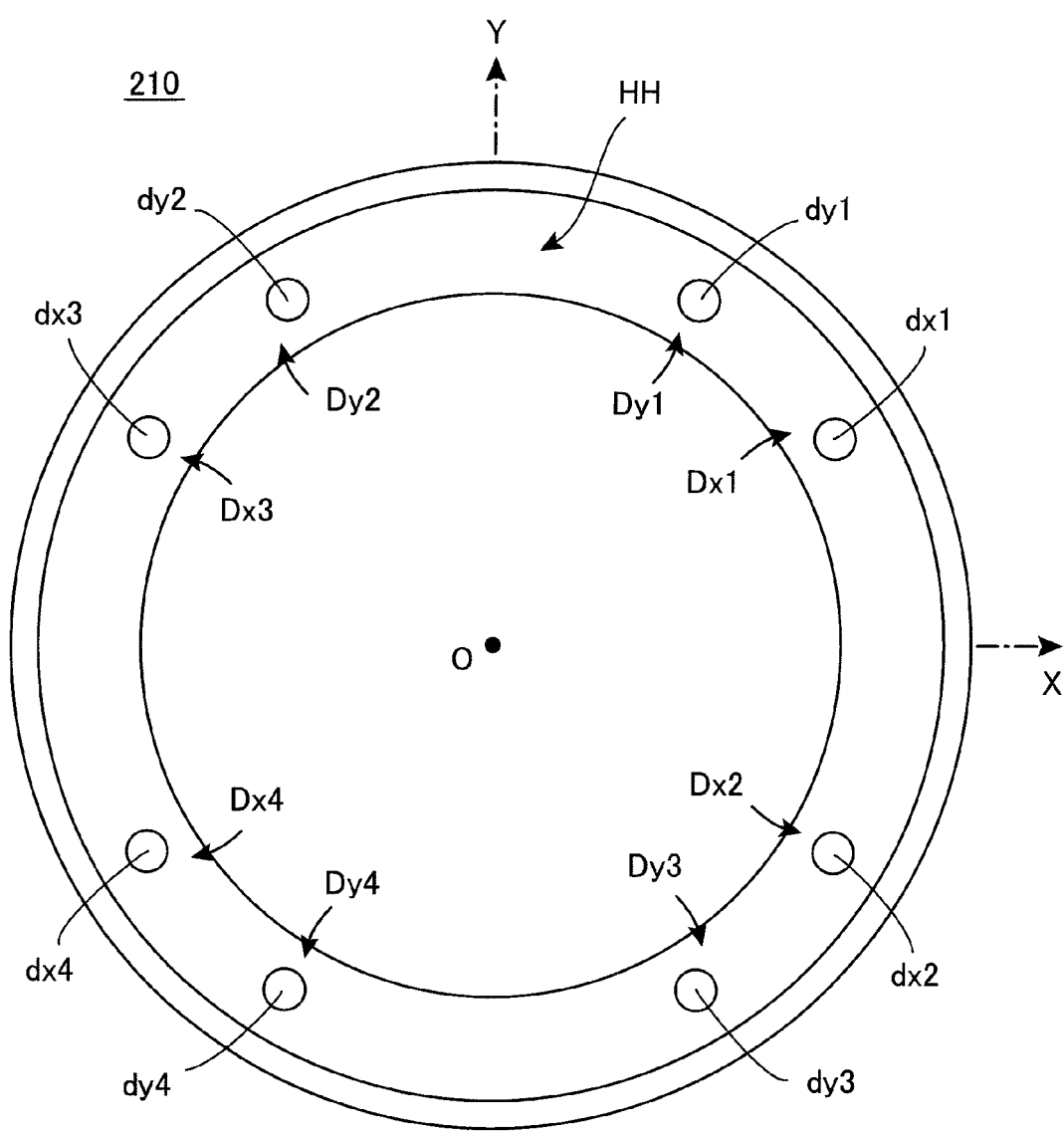
FIG. 31 is a top view showing an exemplary variation of the lower substrate of FIG. 12.

On the other hand, FIG. 31 is a top view showing a lower substrate 210 as an exemplary variation of the lower substrate 200 of FIG. 12. As illustrated, on the upper surface of the lower substrate 210, a lower annular groove HH is formed so as to couple the connection positions of the eight columnar members. This lower annular groove HH is a ring-shaped groove coupling the eight lower grooves Hx1 to Hx4 and Hy1 to Hy4 shown in FIG. 12. On the bottom portion of the groove, projections dx1 to dx4 and dy1 to dy4 are formed, and the lower ends of the columnar members are joined to these projections as in the case of the embodiment described in Section 3. In this exemplary variation, the entire ring-shaped region in which the lower annular groove HH is formed forms a lower film portion having flexibility, and particularly, peripheral portions of the projections dx1 to dx4 and dy1 to dy4 function as lower film portions Dx1 to Dx4 and Dy1 to Dy4.

Of course, the lower annular groove HH may be formed on the lower surface of the lower substrate 210. That is, in this exemplary variation, it is allowed that, on either the upper surface or lower surface of the lower substrate 210, the lower annular groove HH coupling the connection positions of the columnar members is formed, and portions of the bottom portion of the lower annular groove HH form the first to fourth X-axis lower film portions Dx1 to Dx4 and the first to fourth Y-axis lower film portions Dy1 to Dy4.

Figure 32:
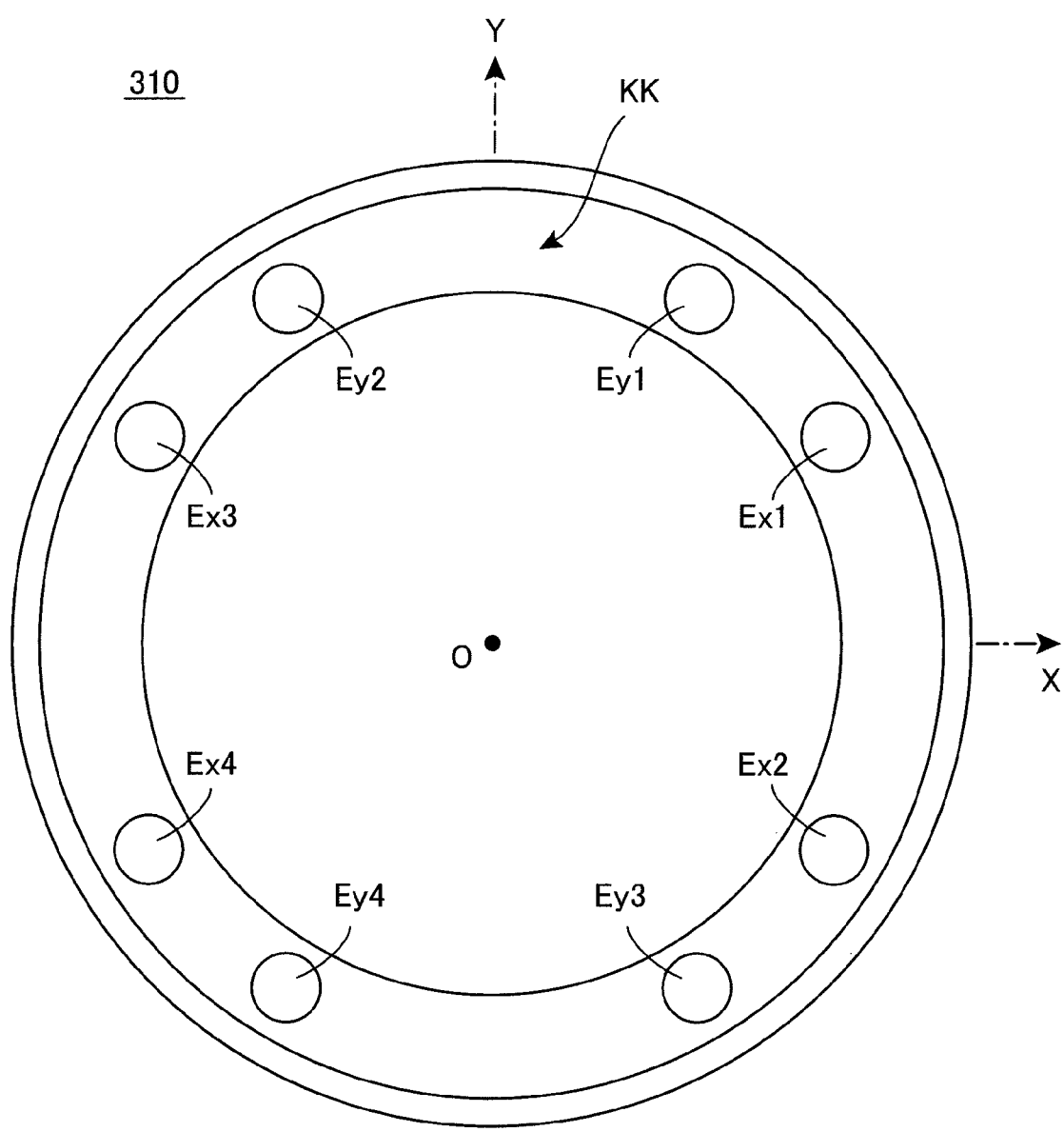
FIG. 32 is a top view showing an exemplary variation of the auxiliary substrate of FIG. 14.

FIG. 32 is a top view showing an auxiliary substrate 310 as an exemplary variation of the auxiliary substrate 300 of FIG. 14. As illustrated, on the upper surface of the auxiliary substrate 310, an auxiliary annular groove KK is formed so as to couple the connection positions of the eight columnar members. This auxiliary annular groove KK is a ring-shaped groove coupling the eight auxiliary grooves Kx1 to Kx4 and Ky1 to Ky4 shown in FIG. 14. The fixed electrodes Ex1 to Ex4 and Ey1 to Ey4 are formed on the bottom surface of the groove as in the case of the embodiment described in Section 3.

That is, in this exemplary variation, it is allowed that the annular auxiliary groove KK coupling the positions below the first to fourth X-axis lower film portions Dx1 to Dx4 and coupling the positions below the first to fourth Y-axis lower film portions Dy1 to Dy4 on the upper surface of the auxiliary substrate 310 is formed, and on the bottom surface of this annular auxiliary groove KK, the first to fourth X-axis fixed electrodes Ex1 to Ex4 and the first to fourth Y-axis fixed electrodes Ey1 to Ey4 are formed.

<5-2: Exemplary Variation Using Flexible Substrate>

In the embodiments described above, grooves are dug in the upper substrate and the lower substrate, and as the bottom portions of these grooves, upper film portions and lower film portions which have flexibility are formed. In an exemplary variation described herein, the upper substrate and the lower substrate are formed of substrates having flexibility as a whole, and the flexible substrates are partially utilized as the upper film portions and lower film portions of the embodiments described above.

Figure 33:
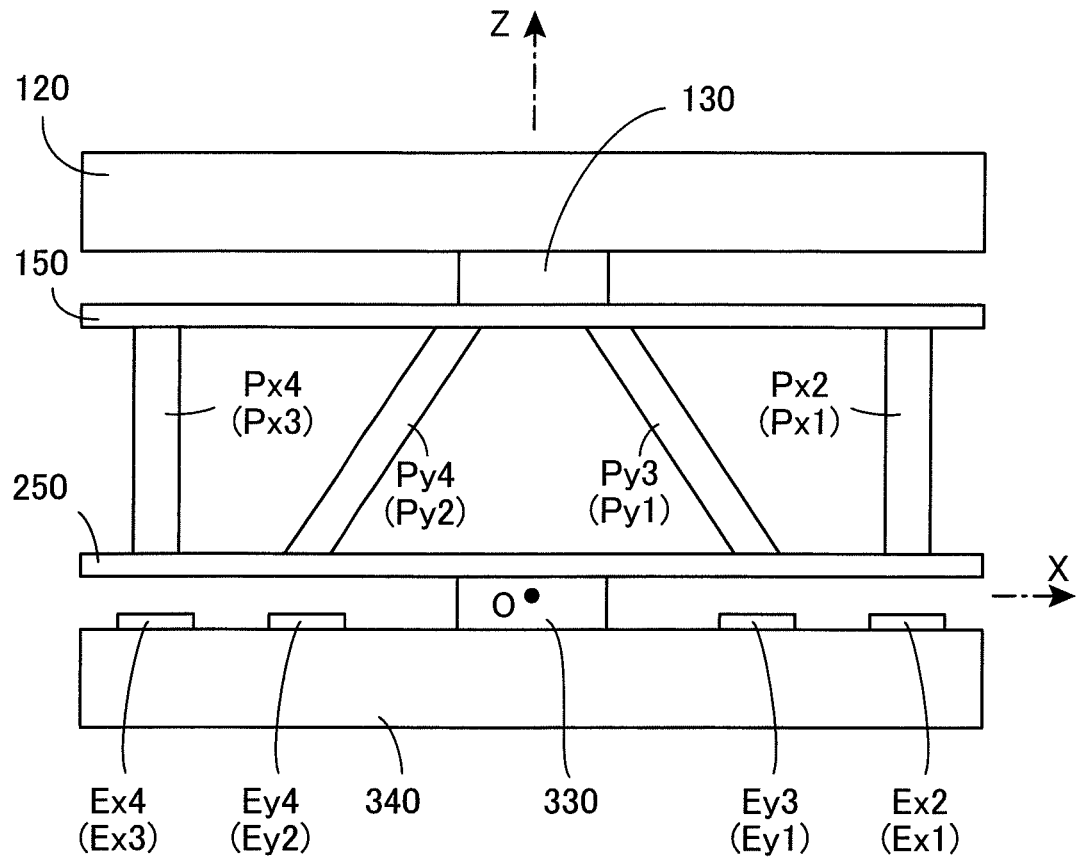
FIG. 33 is a front view showing a force detection device of an exemplary variation of the present invention using flexible substrates.

FIG. 33 is a front view showing a force detection device of an exemplary variation of the present invention using such flexible substrates. The basic operations of the device of this exemplary variation are completely the same as those of the device of the practical embodiment shown in FIG. 8, and based on displacements of the eight columnar members, six force components can be detected.

However, the upper ends of the eight columnar members Px1 to Px4 and Py1 to Py4 are directly connected to the lower surface of the upper substrate 150 formed of a flexible substrate, and the lower ends are directly connected to the upper surface of the lower substrate 250 formed of a flexible substrate. Here, the upper substrate 150 and the lower substrate 250 are disk-shaped substrates as shown in the perspective view of FIG. 34, and their thicknesses are set so as to make the substrates flexible as a whole. For example, when the upper substrate 150 and the lower substrate 250 are made of aluminum or stainless steel, by setting their thicknesses to not more than 3.0 millimeters, flexibility which does not obstruct general operations of the force detection device can be secured.

Figure 35:
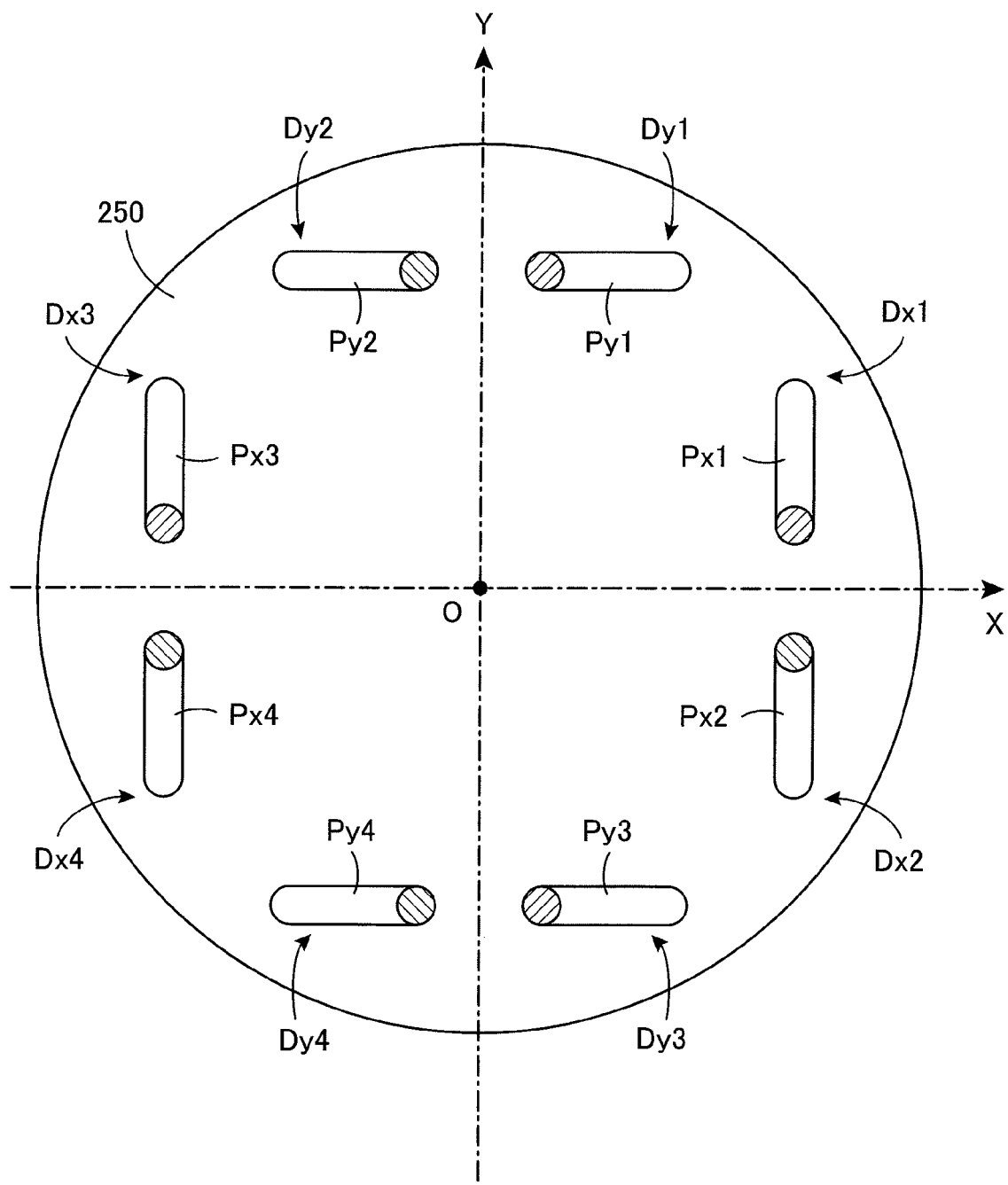
FIG. 35 is a plan view showing a lower substrate 250 and eight columnar members attached to the upper surface of the lower substrate 250 in the force detection device shown in FIG. 33 (the hatched portions show upper end faces of the columnar members).

FIG. 35 is a plan view showing the lower substrate 250 and eight columnar members Px1 to Px4 and Py1 to Py4 attached to the upper surface of the lower substrate 250 in the force detection device shown in FIG. 33. Here, the hatched portions in the figure do not show sections but show upper end faces of the columnar members.

In FIG. 35, the lower substrate 250 is a substrate with flexibility as a whole, and when the columnar members Px1 to Px4 and Py1 to Py4 are displaced, portions to which the lower ends of the columnar members are connected of the lower substrate 250 are most greatly warped. Therefore, the vicinities of the portions to which the lower ends of the columnar members Px1 to Px4 and Py1 to Py4 are connected of the flexible substrate 250 (lower substrate), respectively, function as the first to fourth X-axis lower film portions Dx1 to Dx4 and the first to fourth Y-axis lower film portions Dy1 to Dy4. Similarly, the vicinities of the portions to which the upper ends of the columnar members Px1 to Px4 and Py1 to Py4 are connected of the flexible substrate 150 (upper substrate), respectively, function as the first to fourth X-axis upper film portions Bx1 to Bx4 and the first to fourth Y-axis upper film portions By1 to By4.

As shown in the front view of FIG. 33, in the case of the device of this exemplary variation, a coupling member 130 is firmly fixed to the central portion of the upper surface of the upper substrate 150, and a force receiver 120 for receiving a force as a detection target is joined above the coupling member 130. The reason for provision of this is because the upper substrate 150 is a flexible substrate, and when an external force as a detection target is directly applied to the upper substrate 150, the external force directly influences warping of the upper substrate 150 itself, and this may obstruct accurate measurement. By adopting a structure in which the illustrated force receiver 120 is provided so that an external force as a detection target is applied to the force receiver 120 and then made to propagate to the upper substrate 150 via the coupling member 130, more accurate measurement can become possible.

The coupling member 130 is not necessarily provided at the central portion of the upper substrate 150. That is, it is allowed that the coupling member 130 is firmly fixed to a predetermined position of the upper surface of the upper substrate 150 except for the portions which substantially function as the first to fourth X-axis upper film portions Bx1 to Bx4 and the portions which substantially function as the first to fourth Y-axis upper film portions By1 to By4, and the force receiver 120 for receiving a force as a detection target is joined above the coupling member 130.

Similarly, in the case of the device of this exemplary variation, a spacer member 330 is firmly fixed to the central portion of the lower surface of the lower substrate 250, and below the spacer member 330, an auxiliary substrate 340 for supporting the fixed electrodes Ex1 to Ex4 and Ey1 to Ey4 is joined. This is also for preventing warping of the lower substrate 250 from being obstructed by the auxiliary substrate 340 due to the flexibility of the lower substrate 250. As illustrated, by adopting a structure in which the auxiliary substrate 340 is joined to the lower substrate 250 via the spacer member 330, more accurate measurement becomes possible.

The spacer member 330 is not necessarily provided at the central portion of the lower substrate 250. That is, it is allowed that the spacer member 330 is firmly fixed to a predetermined position of the lower surface of the lower substrate 250 except for the portions which substantially function as the first to fourth X-axis lower film portions Dx1 to Dx4 and the portions which substantially function as the first to fourth Y-axis lower film portions Dy1 to Dy4, and below the spacer member 330, the auxiliary substrate 340 is firmly fixed, and the first to fourth X-axis fixed electrodes Ex1 to Ex4 and the first to fourth Y-axis fixed electrodes Ey1 to Ey4 are formed on the upper surface of the auxiliary substrate 340.

In the exemplary variation shown in FIG. 33, when the upper end or the lower end of one columnar member is displaced in the Z-axis direction, if the upper substrate 150 and the lower substrate 250 have sufficient flexibility, warping of the substrates caused by this displacement in the Z-axis direction occurs at only the vicinities of the connection portions of this columnar member. However, in actuality, when the upper substrate 150 and the lower substrate 250 are made of metal, etc., warping caused by a displacement of one columnar member may spread to the vicinities of the connection portions of adjacent columnar members. If this phenomenon occurs, one sensor detects displacements of adjacent columnar members, and accurate measurement becomes impossible.

To prevent this negative effect, slits are formed in the flexible substrates so as to prevent warping caused by a displacement of one columnar member from spreading to the vicinities of the connection portions of adjacent columnar members.

Figure 34:
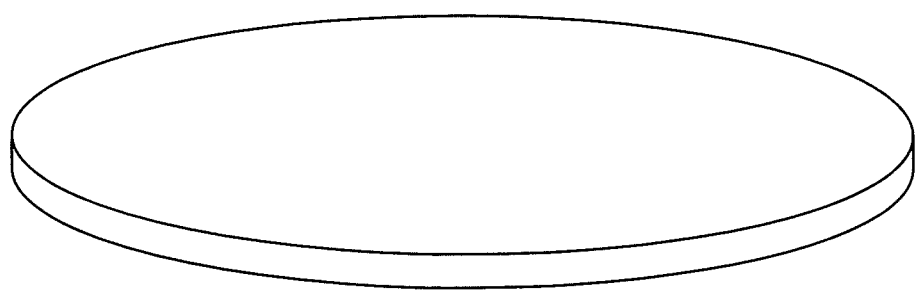
FIG. 34 is a perspective view of an upper substrate (flexible substrate) 150 and a lower substrate (flexible substrate) 250 in the force detection device shown in FIG. 33.
Figure 36:
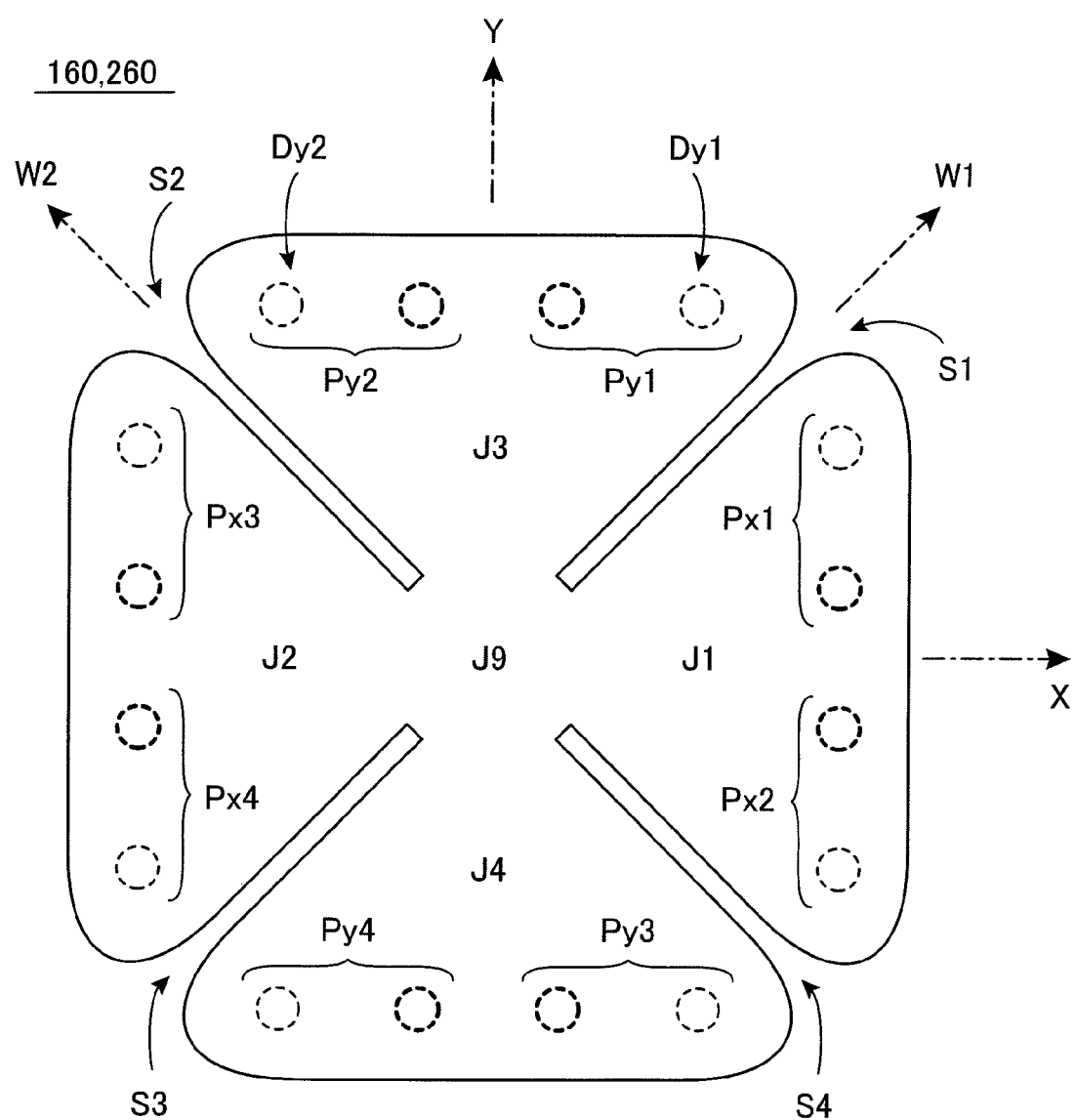
FIG. 36 is a top view showing an upper substrate (flexible substrate) 160 and a lower substrate (flexible substrate) 260 used in place of the upper substrate (flexible substrate) 150 and the lower substrate (flexible substrate) 250 shown in FIG. 34.

FIG. 36 is a top view showing an upper substrate (flexible substrate) 160 and a lower substrate (flexible substrate) 260 used in place of the upper substrate (flexible substrate) 150 and the lower substrate (flexible substrate) 250 shown in FIG. 34. As illustrated, the upper substrate 160 and the lower substrate 260 have external shapes nearly square, however, this external shape difference is not an important difference. The important feature of the upper substrate 160 and the lower substrate 260 is to have slits S1 to S4 formed in these. The slits S1 and S3 are slits formed from the outer peripheral side toward the central portion of the substrate along an arrangement axis W1, and the slits S2 and S4 are slits formed from the outer peripheral side toward the central portion of the substrate along an arrangement axis W2. Here, the arrangement axes W1 and W2 are axes at an angle of 45 degrees with respect to the X-axis or the Y-axis.

The thick dashed line circles shown in FIG. 36 indicate connection positions of the eight columnar members to the upper substrate 160, and the thin dashed line circles indicate connection positions of the eight columnar members to the lower substrate 260. As illustrated, each of the upper substrate 160 and the lower substrate 260 consists of four wing-like portions J1 to J4 and a central portion J9 joining the wing-like portions J1 to J4 together at the center position, and the slits S1 to S4 function as contours of the wing-like portions J1 to J4.

Here, the first X-axis columnar member Px1 and the second X-axis columnar member Px2 are arranged on the wing-like portion J1, and the third X-axis columnar member Px3 and the fourth X-axis columnar member Px4 are arranged on the wing-like portion J2. Similarly, the first Y-axis columnar member Py1 and the second Y-axis columnar member Py2 are arranged on the wing-like portion J3, and the third Y-axis columnar member Py3 and the fourth Y-axis columnar member Py4 are arranged on the wing-like portion J4. The wing-like portions J1 to J4 are physically separated from each other by the slits S1 to S4, so that warping of one wing-like portion can be prevented from propagating to adjacent wing-like portions. Therefore, an error caused by detection of displacements of adjacent columnar members by one sensor can be prevented.

That is, in this exemplary variation, it is allowed that when four regions of a region (wing-like portion J1) including the first X-axis upper/lower film portion and the second X-axis upper/lower film portion, a region (wing-like portion J2) including the third X-axis upper/lower film portion and the fourth X-axis upper/lower film portion, a region (wing-like portion J3) including the first Y-axis upper/lower film portion and the second Y-axis upper/lower film portion, and a region (wing-like portion J4) including the third Y-axis upper/lower film portion and the fourth Y-axis upper/lower film portion, are defined on the flexible substrates 160 and 260, the slits S1 to S4 are formed from the outer peripheral side toward the central portion of the flexible substrate along the boundaries of these four regions.

For example, on the wing-like portion J1, the first X-axis columnar member Px1 and the second X-axis columnar member Px2 are arranged, and this pair of columnar members keeps geometrical symmetry about the XZ plane, so that even when warping caused on one columnar member spreads to an arrangement region of another columnar member, this does not cause a great error. Of course, if necessary, it is also allowed that another four slits are formed along the X-axis and the Y-axis and the eight columnar members are connected to the eight wing-like portions.

<5-3: Exemplary Variation Using Flexible Columnar Members>

In the embodiments described above, description is given on the assumption that each columnar member itself does not warp, however, when carrying out the present invention, it is also allowed that each columnar member is made flexible. In the exemplary variation described herein, the device is configured by using flexible columnar members.

Figure 37:
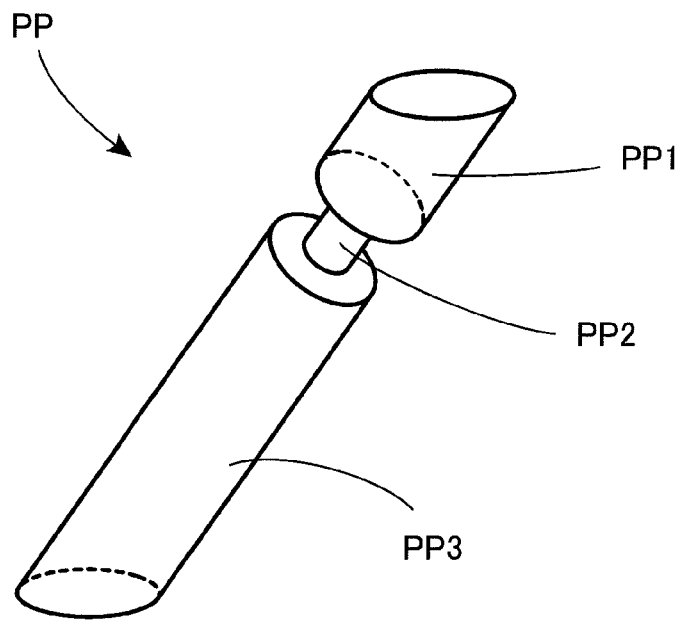
FIG. 37 is a perspective view showing an exemplary variation of a columnar member to be used in the present invention.

FIG. 37 is a perspective view showing an example of a columnar member PP having flexibility. As illustrated, this columnar member PP consists of an upper portion PP1, a constricted portion PP2, and a lower portion PP3. The constricted portion PP2 is a portion configured so as to have flexibility by making the diameter smaller than the upper portion PP1 and the lower portion PP3. When an external force of deforming the columnar member PP is applied to the upper end and the lower end of the columnar member PP, only the constricted portion PP2 is deformed and the columnar member PP bends.

Figure 38:
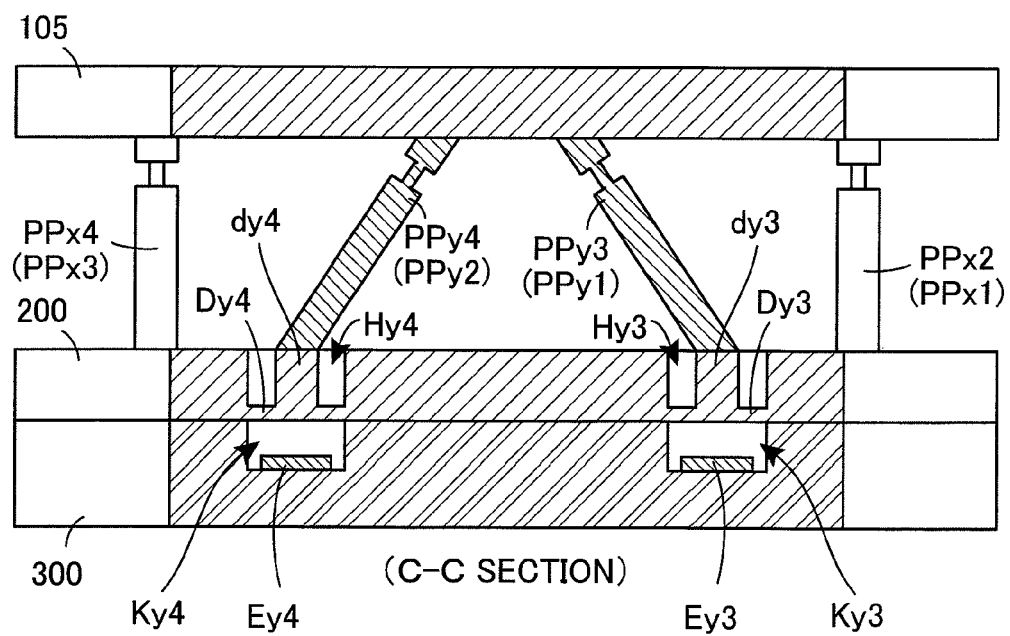
FIG. 38 is a longitudinal sectional view showing a force detection device of an exemplary variation of the present invention using the columnar member shown in FIG. 37.

Thus, by using the columnar member PP having flexibility, the upper film portion can be omitted. FIG. 38 is a longitudinal sectional view showing a force detection device of an exemplary variation using this columnar member PP. The exemplary variation shown in FIG. 38 is an exemplary variation of the practical embodiment shown in FIG. 8, and the longitudinal sectional view of FIG. 38 corresponds to the longitudinal sectional view (sectional view along CC) of FIG. 19. Comparing FIG. 19 and FIG. 38 with each other, it is understood that the eight columnar members Px1 to Px4 and Py1 to Py4 in the former figure are replaced with, in the latter figure, the eight columnar members PPx1 to PPx4 and PPy1 to PPy4 which have constricted portions as shown in FIG. 37. It is also understood that the upper grooves Gx1 to Gx4 and Gy1 to Gy4 in the former figure are not formed in the latter figure.

Specifically, the upper substrate 105 in the exemplary variation shown in FIG. 38 is a disk having no groove, and the upper ends of the eight columnar members PPx1 to PPx4 and PPy1 to PPy4 are directly connected to the lower surface of this disk. In other words, in the exemplary variation shown in FIG. 38, the upper film portions Bx1 to Bx4 and By1 to By4 are not provided. This is because the eight columnar members PPx1 to PPx4 and PPy1 to PPy4 which have flexibility can serve as the upper film portions Bx1 to Bx4 and By1 to By4, respectively. On the other hand, for the lower substrate 200, sensors must consist of capacitance elements, so that the lower film portions Dx1 to Dx4 and Dy1 to Dy4 are necessary.

The columnar member PP shown in FIG. 37 is made deformable when an external force is applied by providing a part (the constricted portion PP2) of the columnar member PP so as to have flexibility, however, it is also allowed that the whole of the columnar member is provided having flexibility. Specifically, by making the entire columnar member of a material have flexibility, the entire columnar member is allowed to be deformed when an external force is applied. For example, when a columnar member T made of a material such as elastic plastic is used, the columnar member itself can be provided having flexibility without providing the constricted portion.

Figure 39:
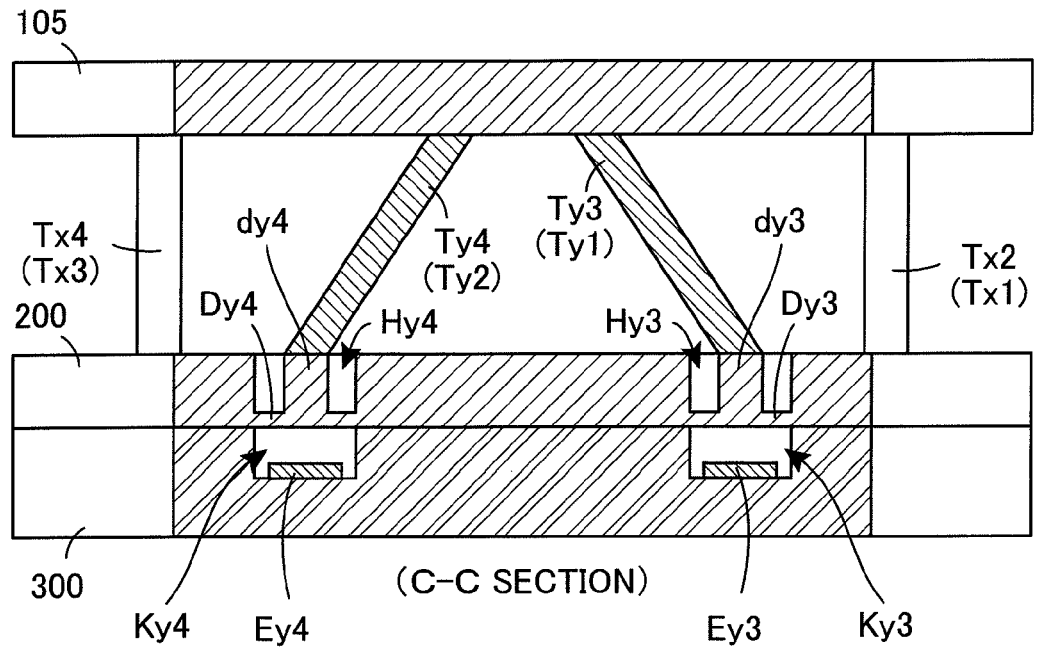
FIG. 39 is a longitudinal sectional view showing a force detection device of an exemplary variation of the present invention using columnar members made of a material with flexibility.

FIG. 39 shows columnar members Tx1 to Tx4 and Ty1 to Ty4 made of a material such as elastic plastic which replace the eight columnar members PPx1 to PPx4 and PPy1 to PPy4 of FIG. 38. In this case as well, the columnar members Tx1 to Tx4 and Ty1 to Ty4 themselves have flexibility, so that they can serve as the upper film portions Bx1 to Bx4 and By1 to By4. Therefore, as the upper substrate 105, a disk having no groove can be used.

Figure 40:
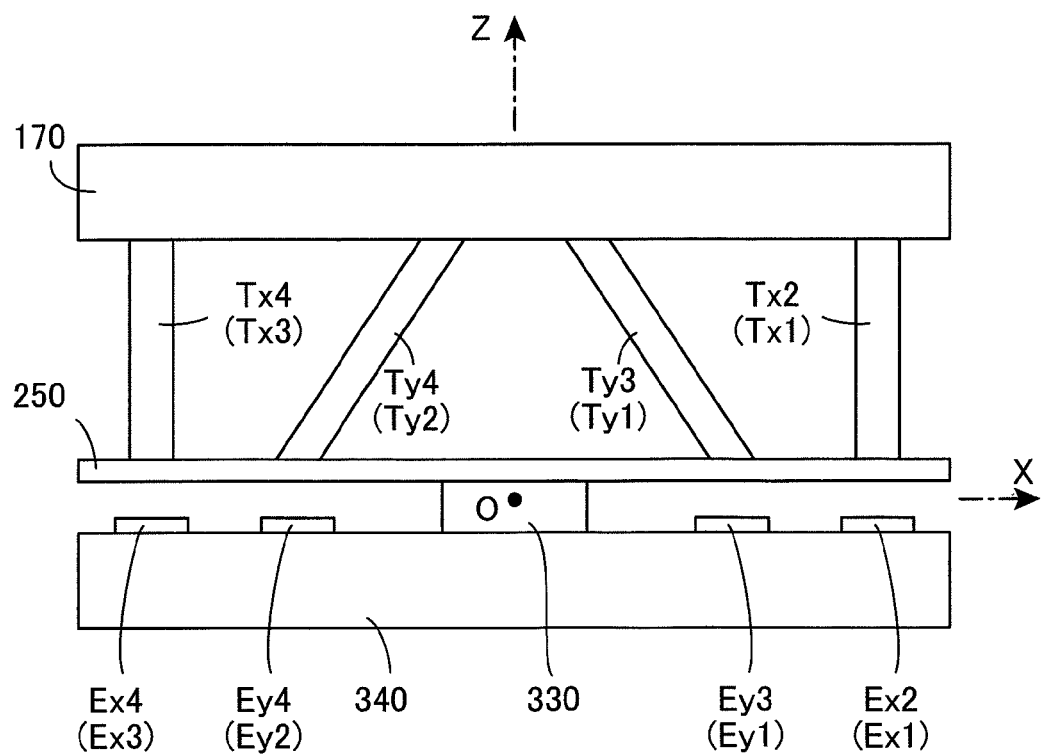
FIG. 40 is a front view showing a force detection device of another exemplary variation of the present invention using columnar members made of a material with flexibility.

FIG. 40 shows columnar members Tx1 to Tx4 and Ty1 to Ty4 made of a material such as elastic plastic which replace the eight columnar members Px1 to Px4 and Py1 to Py4 of the exemplary variation shown in FIG. 33 (of course, replacement with the columnar member PP shown in FIG. 37 is also possible). Comparing FIG. 33 and FIG. 40, it is understood that the upper substrate 150, the coupling member 130, and the force receiver 120 in the former figure are replaced with one upper substrate 170 in the latter figure. Here, the upper substrate 170 does not necessarily have flexibility, and can be directly subjected to an external force. This is because the columnar members Tx1 to Tx4 and Ty1 to Ty4 with flexibility serve as the upper substrate 150.

<5-4: Exemplary Variation Using Structural Bodies Having Arbitrary Shapes>

The embodiments described above adopt a structure in which a plurality of columnar members are laid across the upper substrate and the lower substrate. However, when carrying out the present invention, the structural body which supports the upper portions or the lower portions of the columnar members is not necessarily a substrate-like structural body, and may be a structural body having an arbitrary shape.

For example, in the force detection device of the basic embodiment of the present invention described in Section 2, a structure is adopted in which two columnar members P1 and P2 are sandwiched between the upper substrate 10 and the lower substrate 20, however, the upper substrate 10 and the lower substrate 20 are not necessarily substrate-like structural bodies, and may be replaced with structural bodies having arbitrary shapes.

That is, it is sufficient that the force detection device of the basic embodiment includes a first columnar member and a second columnar member disposed so as to incline in predetermined directions with respect to the Z-axis defined in the up-down direction, an upper structural body disposed above the first columnar member and the second columnar member, a lower structural body disposed below the first columnar member and the second columnar member, and a detector which outputs electric signals showing applied forces based on displacements of the first columnar member and the second columnar member.

Further, it is sufficient that the upper ends of the columnar members are directly or indirectly joined to the lower surface of the upper structural body, the lower ends of the columnar members are directly or indirectly joined to the upper surface of the lower structural body, a projection image obtained by orthogonally projecting the central axis of the first columnar member onto the XZ plane is inclined in a first direction with respect to the Z-axis, and a projection image obtained by orthogonally projecting the central axis of the second columnar member onto the XZ plane is inclined in a second direction opposite to the first direction with respect to the Z-axis.

In the above-described structure, by providing at least a part of "the lower structural body" and at least a part of "the upper structural body, the first columnar member, the second columnar member, and their mutual connection portions" with flexibility, in a state where the lower structural body is fixed to a predetermined position, when an external force is applied to the upper structural body, it is possible that the inclination state of the columnar members changes and displaces the upper structural body. Then, by providing the detector with a first sensor which detects a displacement in the Z-axis direction of the lower end of the first columnar member and a second sensor which detects a displacement in the Z-axis direction of the lower end of the second columnar member, an electric signal showing a difference between a detection value of the first sensor and a detection value of the second sensor can be output as a detection value of a force Fx in the X-axis direction applied to the upper structural body in the state where the lower structural body is fixed to the predetermined position. Further, an electric signal showing a sum of the detection value of the first sensor and the detection value of the second sensor can be output as a detection value of a force Fz in the Z-axis direction applied to the upper structural body in the state where the lower structural body is fixed to the predetermined position.

When a capacitance element is utilized as each sensor, it is sufficient that an auxiliary substrate fixed below the lower structural body via a predetermined space is further provided, and the first sensor consists of a first capacitance element including a first displacement electrode formed at a position to which the lower end of the first columnar member is joined with the lower structural body and a first fixed electrode fixed to a position opposed to the first displacement electrode on the upper surface of the auxiliary substrate, and a second sensor consists of a second capacitance element including a second displacement electrode formed at a position to which the lower end of the second columnar member is joined with the lower structural body and a second fixed electrode fixed to a position opposed to the second displacement electrode on the upper surface of the auxiliary substrate. In this case, by making the lower structural body of a conductive material, the portion to which the lower end of the first columnar member is joined with the lower structural body can be made to function as the first displacement electrode, and the portion to which the lower end of the second columnar member is joined with the lower structural body can be made to function as the second displacement electrode.

On the other hand, in the force detection device of the practical embodiment of the present invention described in Section 3, a structure in which the eight columnar members Px1 to Px4 and Py1 to Py4 are sandwiched between the upper substrate 100 and the lower substrate 200 is adopted, however, in this case as well, the upper substrate 100 and the lower substrate 200 are not necessarily substrate-like structural bodies, and may be replaced with structural bodies having arbitrary shapes.

That is, it is sufficient that the force detection device of this practical embodiment includes an upper structural body expanding on a plane parallel to the XY plane, a lower structural body which expands on a plane parallel to the XY plane and is disposed below the upper structural body, first to fourth X-axis columnar members and first to fourth Y-axis columnar members having upper ends directly or indirectly joined to the lower surface of the upper structural body and lower ends directly or indirectly joined to the upper surface of the lower structural body, and a detector which outputs electric signals showing applied forces based on displacements of these eight columnar members.

It is sufficient that the central axis of the first X-axis columnar member and the central axis of the second X-axis columnar member are included in an X-axis positive side orthogonal plane orthogonal to the X-axis in the positive region of the X-axis, and are inclined mutually opposite with respect to the XZ plane, and the central axis of the third X-axis columnar member and the central axis of the fourth X-axis columnar member are included in an X-axis negative side orthogonal plane orthogonal to the X-axis in the negative region of the X-axis, and are inclined mutually opposite with respect to the XZ plane, the central axis of the first Y-axis columnar member and the central axis of the second Y-axis columnar member are included in an Y-axis positive side orthogonal plane orthogonal to the Y-axis in the positive region of the Y-axis, and are inclined mutually opposite with respect to the YZ plane, and the central axis of the third Y-axis columnar member and the central axis of the fourth Y-axis columnar member are included in a Y-axis negative side orthogonal plane orthogonal to the Y-axis in the negative region of the Y-axis, and inclined mutually opposite with respect to the YZ plane.

Here, by providing a detector including a first X-axis sensor which detects a displacement in the Z-axis direction of the lower end of the first X-axis columnar member, a second X-axis sensor which detects a displacement in the Z-axis direction of the lower end of the second X-axis columnar member, a third X-axis sensor which detects a displacement in the Z-axis direction of the lower end of the third X-axis columnar member, a fourth X-axis sensor which detects a displacement in the Z-axis direction of the lower end of the fourth X-axis columnar member, a first Y-axis sensor which detects a displacement in the Z-axis direction of the lower end of the first Y-axis columnar member, a second Y-axis sensor which detects a displacement in the Z-axis direction of the lower end of the second Y-axis columnar member, a third Y-axis sensor which detects a displacement in the Z-axis direction of the lower end of the third Y-axis columnar member, and a fourth Y-axis sensor which detects a displacement in the Z-axis direction of the lower end of the fourth Y-axis columnar member, electric signals obtained based on the detection values of the sensors can be output as detection values of forces applied to the upper structural body in the state where the lower structural body is fixed to the predetermined position.

Figure 41:
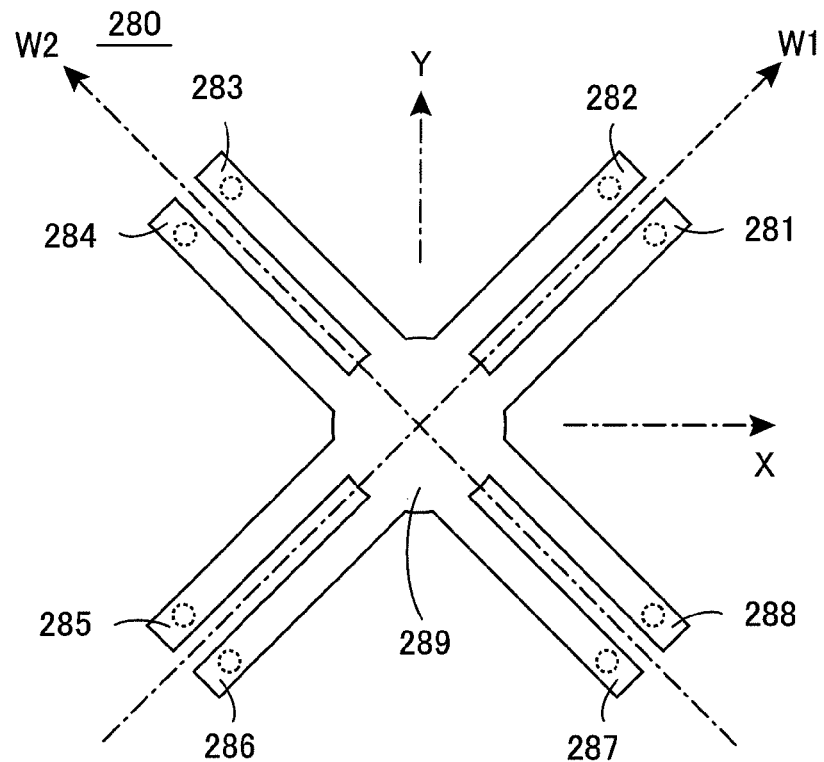
FIG. 41 is a top view of a lower structural body 280 used in place of the lower substrate 250 in the force detection device shown in FIG. 33.

FIG. 41 is a top view of the lower structural body 280 used in place of the lower substrate 250 in the force detection device shown in FIG. 33. The lower structural body 280 shown in the figure includes a central portion 289 positioned on the Z-axis, and eight branch portions 281 to 288 having flexibility which extend from this central portion 289 to connection positions to the lower ends of the first to fourth X-axis columnar members and connection positions to the lower ends of the first to fourth Y-axis columnar members, respectively. Here, the branch portions 281 to 288 extend along an arrangement axis W1 or W2 at 45 degrees with respect to the X-axis or Y-axis. The dashed line circles shown in the figure indicate portions to which the lower ends of the columnar members Px1 to Px4 and Py1 to Py4 are connected.

This lower structural body 280 can be obtained by cutting an aluminum plate or a stainless-steel plate, for example. The eight branch portions 281 to 288 have flexibility, so that in the state where the central portion 289 is fixed, when the columnar members Px1 to Px4 and Py1 to Py4, respectively, are displaced in the Z-axis direction, the branch portions 281 to 288 warp independently according to the displacements of the respective corresponding columnar members.

Figure 42:
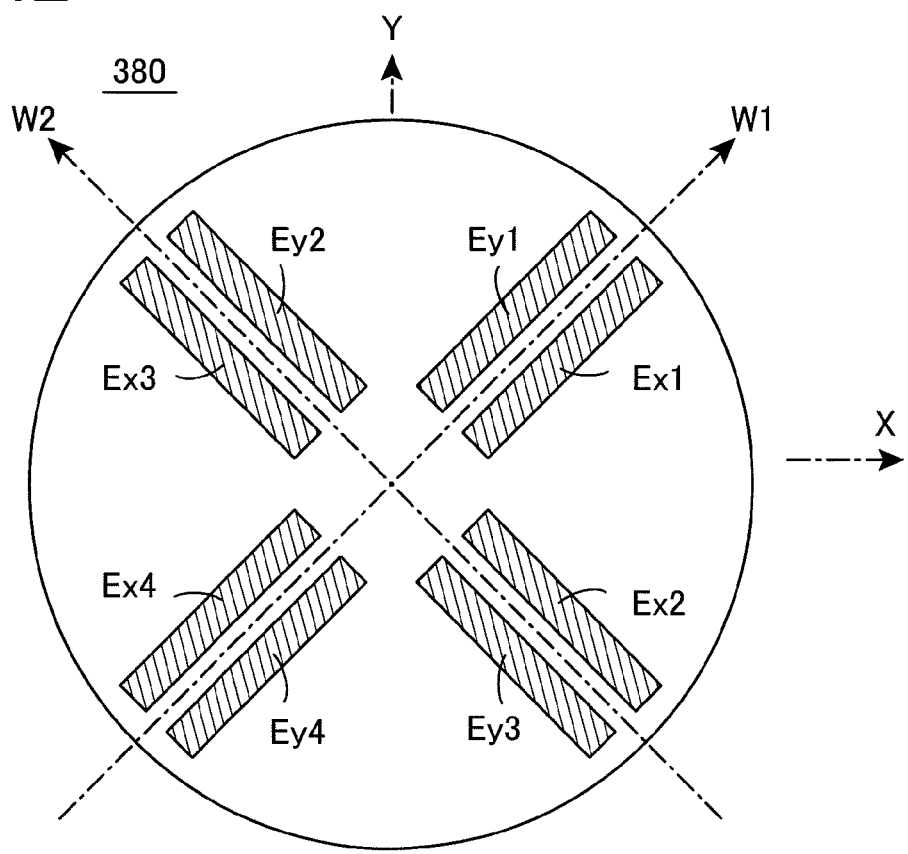
FIG. 42 is a top view showing an auxiliary substrate 380 used in place of the auxiliary substrate 340 in the force detection device shown in FIG. 33 (hatching does not show a cross section, but shows electrode shapes).

FIG. 42 is a top view showing an auxiliary substrate 380 used in place of the auxiliary substrate 340 in the force detection device shown in FIG. 33. As illustrated, on the upper surface of this auxiliary substrate 380, eight fixed electrodes Ex1 to Ex4 and Ey1 to Ey4 are formed (hatching shows electrode shapes). The eight fixed electrodes on the auxiliary substrate 380 have shapes different from those of the eight fixed electrodes on the auxiliary substrate 340 shown in FIG. 33, but perform the same function, so that the eight fixed electrodes are indicated by the same reference symbols Ex1 to Ex4 and Ey1 to Ey4 for convenience.

The eight fixed electrodes Ex1 to Ex4 and Ey1 to Ey4 shown in FIG. 42 have shapes opposite to the eight branch portions 281 to 288 shown in FIG. 41, and are arranged at positions opposed to the eight branch portions 281 to 288. In the case of this embodiment, the lower structural body 280 is made of a conductive material, so that the branch portions 281 to 288 function as displacement electrodes by themselves, and form eight capacitance elements in cooperation with the opposite fixed electrodes Ex1 to Ex4 and Ey1 to Ey4. Here, these capacitance elements are also referred to as capacitance elements Cx1 to Cx4 and Cy1 to Cy4 as in the embodiments described above.

Figure 43:
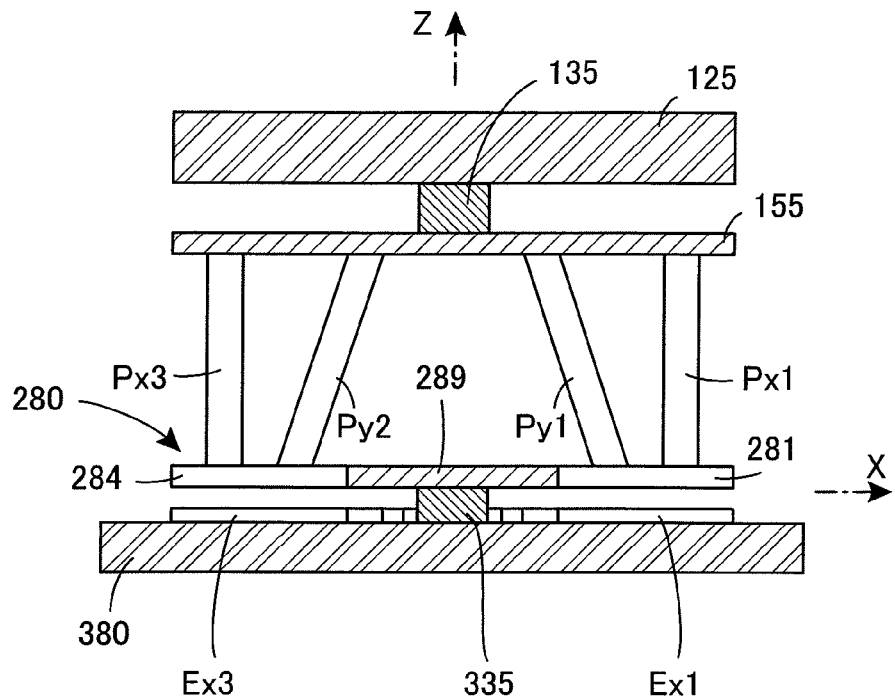
FIG. 43 is a longitudinal sectional view (sectional view cut along the XZ plane) showing an exemplary variation using the lower structural body 280 shown in FIG. 41 and the auxiliary substrate 380 shown in FIG. 42.

FIG. 43 is a longitudinal sectional view (sectional view cut along the XZ plane) showing an exemplary variation using the lower structural body 280 shown in FIG. 41 and the auxiliary substrate 380 shown in FIG. 42. The basic operation principle of this exemplary variation is the same as that of the embodiment shown in FIG. 33. Specifically, an external force applied to the force receiver 125 is transmitted to the upper substrate 155 via the coupling member 135. In the case of this example, the upper substrate 155 is a disk having flexibility, and below this upper substrate 155, the lower structural body 280 is disposed, and between these, eight columnar members Px1 to Px4 and Py1 to Py4 are connected. The arrangements and inclination state of these eight columnar members are the same as in the device of the practical embodiment described in Section 3. To the central portion lower surface of the lower structural body 280, the spacer member 335 is joined, and to the lower surface of the spacer member 335, the auxiliary substrate 380 is joined.

Here, the lower structural body 280 is a structural body including eight branch portions 280 to 288 extending outward from the central portion 289 as shown in the top view of FIG. 41, and on the upper surface of the auxiliary substrate 380, as shown in the top view of FIG. 42, fixed electrodes Ex1 to Ex4 and Ey1 to Ey4 opposed to the branch portions 281 to 288 are formed. With this configuration, the eight capacitance elements Cx1 to Cx4 and Cy1 to Cy4 function as sensors which detect displacements in the Z-axis direction of the lower ends of the columnar members Px1 to Px4 and Py1 to Py4. The detection of six components of the applied external force is enabled based on the static capacitance values of these eight capacitance elements as described in Section 4 above.

Specifically, in the force detection device shown in FIG. 43, a first X-axis sensor consists of a first X-axis capacitance element Cx1 including: a first X-axis displacement electrode formed by the branch portion 281 extending to the connection position to the lower end of the first X-axis columnar member Px1; and a first X-axis fixed electrode Ex1 fixed to a position opposed to the first X-axis displacement electrode on the upper surface of the auxiliary substrate 380, a second X-axis sensor consists of a second X-axis capacitance element Cx2 including: a second X-axis displacement electrode formed by the branch portion 288 extending to the connection position to the lower end of the second X-axis columnar member Px2; and a second X-axis fixed electrode Ex2 fixed to a position opposed to the second X-axis displacement electrode on the upper surface of the auxiliary substrate 380, a third X-axis sensor consists of a third X-axis capacitance element Cx3 including: a third X-axis displacement electrode formed by the branch portion 284 extending to the connection position to the lower end of the third X-axis columnar member Px3; and a third X-axis fixed electrode Ex3 fixed to a position opposed to the third X-axis displacement electrode on the upper surface of the auxiliary substrate 380, and a fourth X-axis sensor consists of a fourth X-axis capacitance element Cx4 including: a fourth X-axis displacement electrode formed by the branch portion 285 extending to the connection position to the lower end of the fourth X-axis columnar member Px4; and a fourth X-axis fixed electrode Ex4 fixed to a position opposed to the fourth X-axis displacement electrode on the upper surface of the auxiliary substrate 380.

Further, a first Y-axis sensor consists of a first Y-axis capacitance element Cy1 including: a first Y-axis displacement electrode formed by the branch portion 282 extending to the connection position to the lower end of the first Y-axis columnar member Py1; and a first Y-axis fixed electrode Ey1 fixed to a position opposed to the first Y-axis displacement electrode on the upper surface of the auxiliary substrate 380, a second Y-axis sensor consists of a second Y-axis capacitance element Cy2 including: a second Y-axis displacement electrode formed by the branch portion 283 extending to the connection position to the lower end of the second Y-axis columnar member Py2; and a second Y-axis fixed electrode Ey2 fixed to a position opposed to the second Y-axis displacement electrode on the upper surface of the auxiliary substrate 380, a third Y-axis sensor consists of a third Y-axis capacitance element Cy3 including: a third Y-axis displacement electrode formed by the branch portion 287 extending to the connection position to the lower end of the third Y-axis columnar member Py3; and a third Y-axis fixed electrode Ey3 fixed to a position opposed to the third Y-axis displacement electrode on the upper surface of the auxiliary substrate 380, and a fourth Y-axis sensor consists of a fourth Y-axis capacitance element Cy4 including: a fourth Y-axis displacement electrode formed by the branch portion 286 extending to the connection position to the lower end of the fourth Y-axis columnar member Py4; and a fourth Y-axis fixed electrode Ey4 fixed to a position opposed to the fourth Y-axis displacement electrode on the upper surface of the auxiliary substrate 380.

The detector outputs, as detection values, electric signals obtained based on a static capacitance fluctuation value Cx1 of the first X-axis capacitance element, a static capacitance fluctuation value Cx2 of the second X-axis capacitance element, a static capacitance fluctuation value Cx3 of the third X-axis capacitance element, a static capacitance fluctuation value Cx4 of the fourth X-axis capacitance element, a static capacitance fluctuation value Cy1 of the first Y-axis capacitance element, a static capacitance fluctuation value Cy2 of the second Y-axis capacitance element, a static capacitance fluctuation value Cy3 of the third Y-axis capacitance element, and a static capacitance fluctuation value Cy4 of the fourth Y-axis capacitance element.

Here, an example is described in which the lower structural body 280 is made of a conductive material and the branch portions 281 to 288 themselves function as displacement electrodes, however, when the lower structural body 280 is made of a nonconductive material, it is sufficient that conductive layers which function as displacement electrodes are formed on the lower surfaces of the branch portions 281 to 288.

When the lower structural body 280 including the eight branch portions as shown in FIG. 41 is used, the branch portions 281 to 288 supporting the lower ends of the columnar members function as cantilever beams independent of each other, so that the degree of freedom of displacement of the whole device is improved, and the displacement amount of the upper substrate 155 may become very large. Such a great displacement state may cause a detection error and cause the parts to be broken. Therefore, in practical use, a control member for controlling the displacement of the upper substrate 155 is preferably provided.

Figure 44:
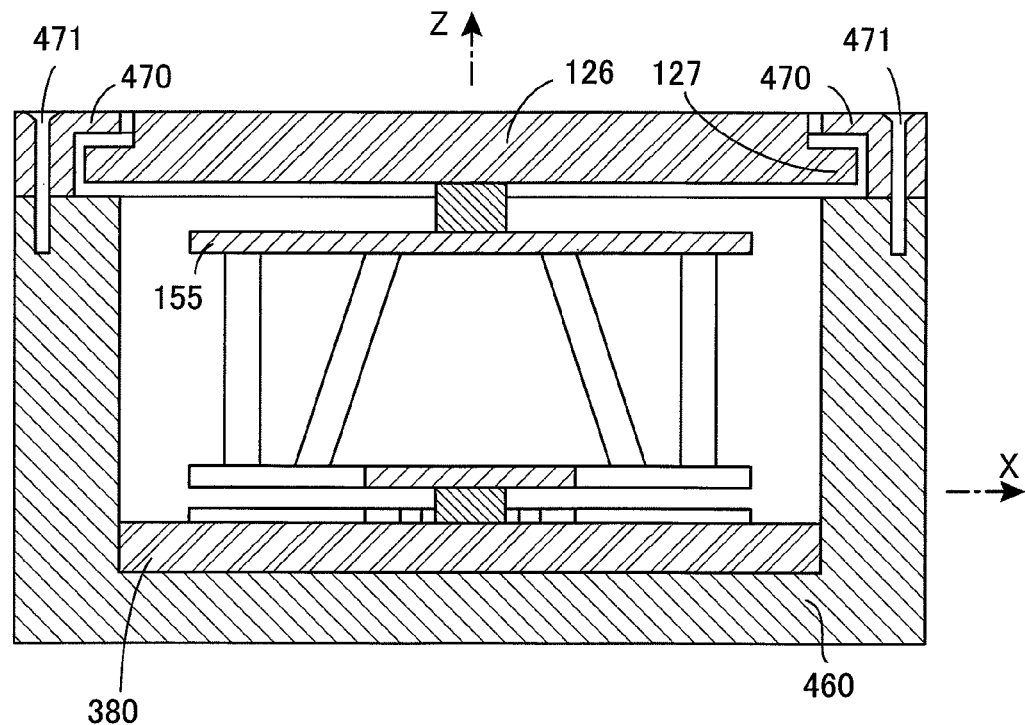
FIG. 44 is a longitudinal sectional view showing a state where the exemplary variation shown in FIG. 43 is housed in a device housing.

FIG. 44 is a longitudinal sectional view showing a state where the device shown in FIG. 43 is housed in the device housing 460. To this device housing 460, a control member which controls the displacement of the upper substrate 155 is attached, and can restrain the upper substrate 155 from being excessively displaced. Specifically, the device shown in FIG. 43 is housed in the device casing 460 and the auxiliary substrate 380 is fixed to the bottom surface of the device housing 460. The force receiver 125 in the device shown in FIG. 43 is replaced with a force receiver 126 having a slightly different shape. This force receiver 126 is basically a disk-shaped member, and around this, a collar portion 127 is provided.

On the other hand, to the upper surface of the device housing 460, a ring-shaped control member 470 is attached by screws 471. This control member 470 performs a function of restraining the force receiver 126 from being excessively displaced upward and laterally by coming into contact with the upper surface and side surface of the collar portion 127. The upper edge surface of the device housing 460 performs a function of restraining the force receiver 126 from being excessively displaced downward by coming into contact with the lower surface of the collar portion 127. By thus restraining the force receiver 126 from being excessively displaced, the upper surface 155 can be restrained from being excessively displaced.

In the example shown in FIGS. 43 and 44, the lower substrate is replaced with the lower structural body 280 including eight branch portions, and of course, it is also allowed that the upper substrate is replaced with an upper structural body including eight branch portions. Further, the lower substrate 200 and the auxiliary substrate 300 in the example shown in FIGS. 38 and 39 may be replaced with the lower structural body 280 and the auxiliary substrate 380 shown in FIGS. 41 and 42, and the lower substrate 250 and the auxiliary substrate 340 in the example shown in FIG. 40 may also be replaced with the lower structural body 280 and the auxiliary substrate 380 shown in FIGS. 41 and 42. Other than these, arbitrary combinations are possible without departing from the basic concept of the present invention.

<5-5: Additional Function when Using Lower Structural Body Including Branch Portions>

In FIGS. 41 to 44, an exemplary variation using the lower structural body 280 including the eight branch portions 281 to 288 is shown, and in such an exemplary variation using a structural body including the branch portions, an additional function may be provided in addition to the normal force detection function described above. The additional function is a function of electrically detecting great displacements of the branch portions which cause the branch portions to come into contact with the auxiliary substrate 380.

Figure 45:
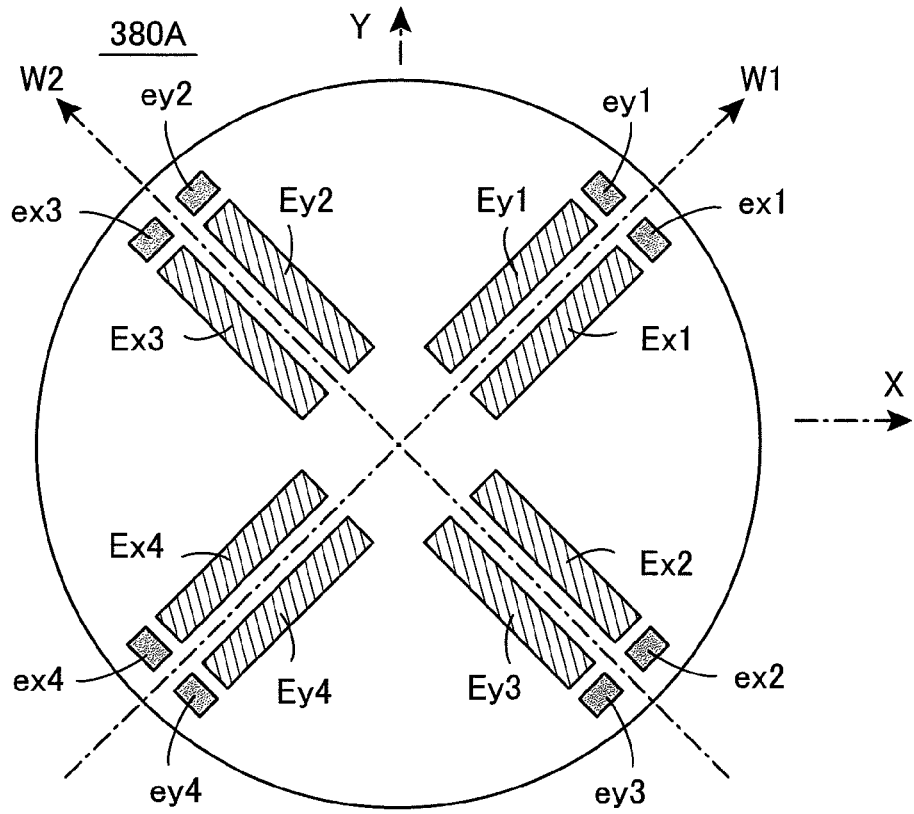
FIG. 45 is a top view showing a first exemplary variation of the auxiliary substrate 380 shown in FIG. 42 (hatching does not show a cross section, but shows electrode shapes).

For example, a case where, in place of the auxiliary substrate 380 shown in FIG. 42, the auxiliary substrate 380A shown in FIG. 45 is used will be considered. As a difference between these, the lengths of the fixed electrodes Ex1 to Ex4 and Ey1 to EY4 are slightly shorter in the latter case, and in this space, contact determining electrodes ex1 to ex4 and ey1 to ey4 are provided. In FIG. 45, the fixed electrodes Ex1 to Ex4 and Ey1 to Ey4 are hatched diagonally, and the contact determining electrodes ex1 to ex4 and ey1 to ey4 are gray-hatched (hatching of these does not show cross sections but shows shapes of electrodes). Here, the contact determining electrodes ex1 to ex4 and ey1 to ey4 are disposed at positions with which the tip end portions of the branch portions 281 to 288 come into contact when they are warped downward.

That is, at the positions opposed to the tip end portions of the branch portions 281 to 288 on the upper surface of the auxiliary substrate 380A, contact determining electrodes ex1 to ex4 and ey1 to ey4 electrically insulated from the fixed electrodes Ex1 to Ex4 and Ey1 to Ey4 are provided. By adopting this configuration, it can be determined whether the tip end portion of the branch portion and the contact determining electrode have come into physical contact with each other based on an electric continuity state between these.

In this device, to measure static capacitance values of the eight capacitance elements by the detection circuit 500, respectively, wiring must be provided between the fixed electrodes Ex1 to Ex4 and Ey1 to Ey4 and the detection circuit 500 and wiring must also be provided between the lower structural body 280 which functions as a common displacement electrode and the detection circuit 500, and in addition, wiring is also provided between the contact determining electrodes ex1 to ex4 and ey1 to ey4 and the detection circuit 500. Accordingly, the detection circuit 500 can determine whether the tip end portions of the branch portions 281 to 288 and the contact determining electrodes ex1 to ex4 and ey1 to ey4 have come into physical contact with each other by checking the electric continuity states between the lower structural body 280 and the contact determining electrodes ex1 to ex4 and ey1 to ey4.

For example, when an electric continuity state between the contact determining electrode ex1 and the lower structural body 280 can be detected, physical contact of the tip end portion of the branch portion 281 with the contact determining electrode ex1 can be recognized. This means that the lower end of the first X-axis columnar member Px1 has been greatly displaced downward, and a great external force which causes this displacement has been applied. When such a great external force is applied, a correct detection value cannot be output, so that, for example, an error signal is output, or if necessary, a measure is taken in which a warning which shows the risk of breakage due to an excessive external force is issued.

Figure 46:
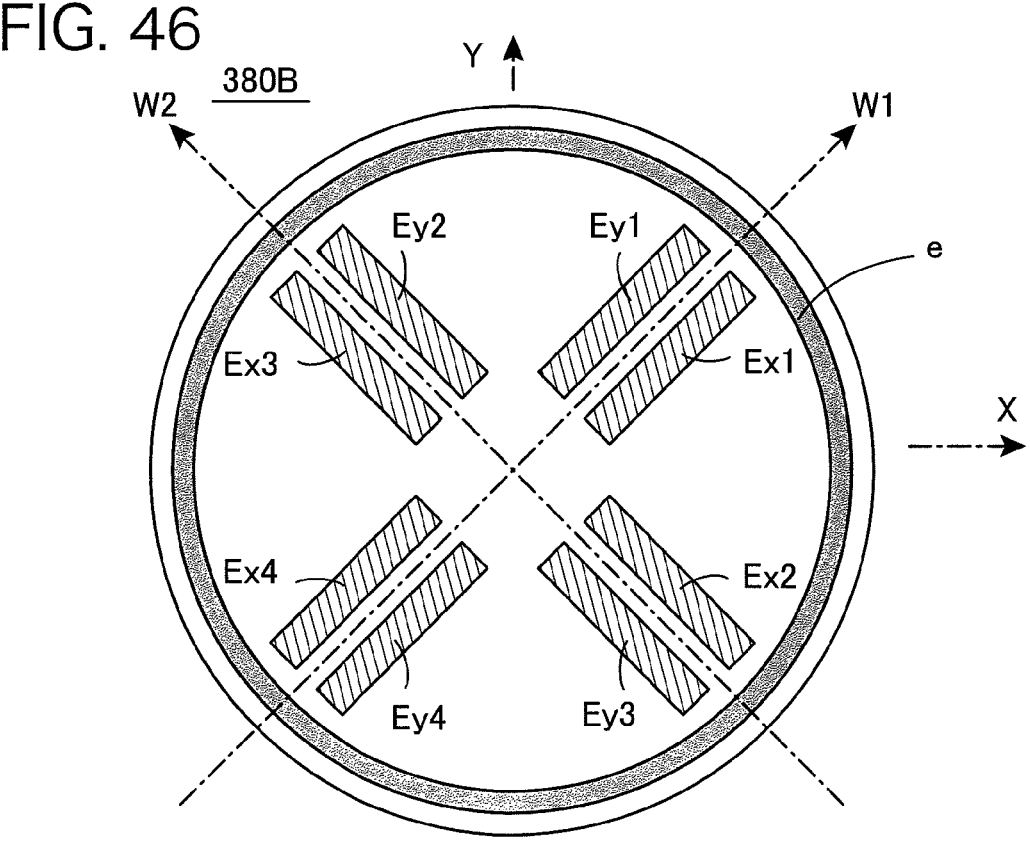
FIG. 46 is a top view showing a second exemplary variation of the auxiliary substrate 380 shown in FIG. 42 (hatching does not show a cross section, but shows electrode shapes).

The auxiliary substrate 380B shown in FIG. 46 is an exemplary variation of the auxiliary substrate 380A shown in FIG. 45. In this exemplary variation, the eight contact determining electrodes ex1 to ex4 and ey1 to ey4 are replaced with a single contact determining annular electrode e (gray hatching shows the shape of this contact determining annular electrode e). Specifically, in an annular region which couples the positions opposed to the tip end portions of the branch portions 281 to 288 on the upper surface of the auxiliary substrate 380B, a contact determining annular electrode e electrically insulated from the fixed electrodes Ex1 to Ex4 and Ey1 to Ey4 is provided. In this case, it can be detected that the tip end portion of any of the eight branch portions 281 to 288 has come into physical contact with the contact determining annular electrode e. Information for identifying which has come into contact among the eight branch portions 281 to 288 cannot be obtained, so that it cannot be recognized which branch portion has been greatly displaced, however, this configuration of FIG. 46 is sufficient as long as a measure is taken in which an error signal is output or a warning is issued.

Figure 47:
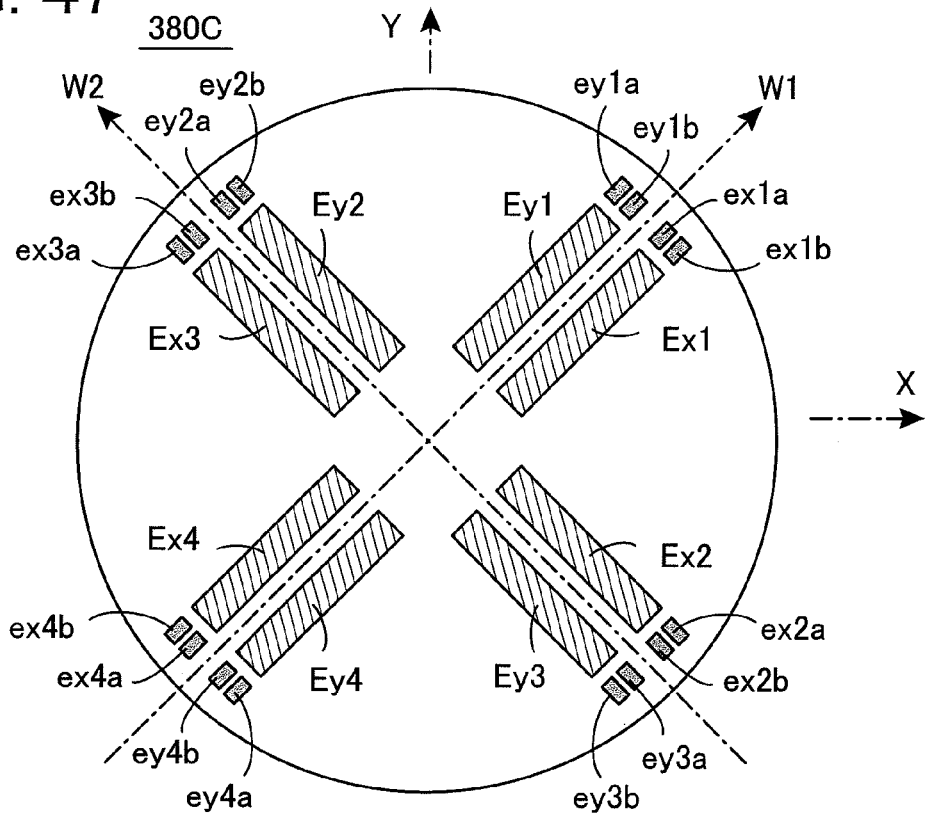
FIG. 47 is a top view showing a third exemplary variation of the auxiliary substrate 380 shown in FIG. 42 (hatching does not show a cross section, but shows electrode shapes).

The auxiliary substrate 380C shown in FIG. 47 is another exemplary variation of the auxiliary substrate 380A shown in FIG. 45. In this exemplary variation, in place of the eight contact determining electrodes ex1 to ex4 and ey1 to ey4, sixteen contact determining electrodes ex1$a$ to ex4$b$ and ey1$a$ to ey4$b$ are provided. That is, each contact determining electrode on the auxiliary substrate 380A is divided into two.

The advantage of this exemplary variation is that application of a great external force can be electrically detected without utilizing the wiring to the lower structural body 280. For example, assuming that the lower end of the first X-axis columnar member Px1 has been greatly displaced downward and the tip end portion of the branch portion 281 has come into contact with the contact determining electrodes ex1$a$ and ex1$b$, the pair of contact determining electrodes ex1$a$ and ex1$b$ are made electrically continuous to each other via the tip end portion of the branch portion 281. Therefore, only by checking the electric continuity state between the pair of contact determining electrodes ex1$a$ and ex1$b$, can a physical contact of the branch portion 281 be detected. The same applies to other pairs of contact determining electrodes.

That is, by providing a pair of contact determining electrodes insulated from each other at the positions opposed to the tip end portion of one branch portion, it can be determined whether the tip end portion of the branch portion and the pair of contact determining electrodes have come into physical contact with each other based on the electric continuity state between the pair of contact determining electrodes.

Figure 48:
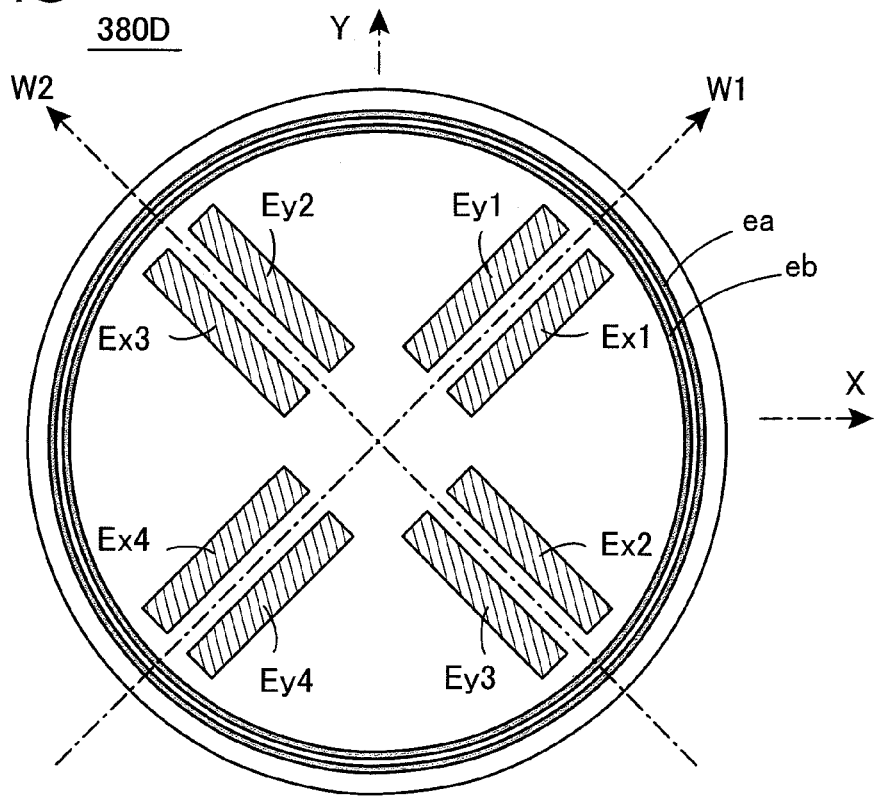
FIG. 48 is a top view showing a fourth exemplary variation of the auxiliary substrate 380 shown in FIG. 42 (hatching does not show a cross section, but shows electrode shapes).

The auxiliary substrate 380D shown in FIG. 48 is an exemplary variation of the auxiliary substrate 380B shown in FIG. 46. In this exemplary variation, in place of the single contact determining annular electrode e, a pair of contact determining annular electrodes ea and eb are provided. That is, the pair of contact determining annular electrodes ea and eb which are insulated from each other and concentric with each other are provided in the annular region of the contact determining annular electrode e on the auxiliary substrate 380B. In this case, it can also be determined whether the tip end portion of the branch portion and the pair of contact determining annular electrodes ea and eb have come into physical contact with each other based on the electric continuity state between the pair of contact determining annular electrodes ea and eb, so that even without utilizing the wiring to the lower structural body 280, application of a great external force can be electrically detected.

An example in which contact determining electrodes are provided to enable electric detection of application of a great external force, and a measure is taken by outputting an error signal or issuing a warning in this case is described above, and on the contrary, it is also possible that detection values are output only in a case where such a great external force is applied.

For example, a case where the force detection device shown in FIG. 43 is utilized as an input device for digital equipment is considered. Specifically, when a person puts this device in his/her palm, puts his/her thumb on the upper surface of the force receiver 125, and performs some input operation, a very small force is continuously applied from the thumb, so that even when the person does not intentionally perform some input operation, this device detects the force applied from the thumb. However, output of such a very small force as a signal showing an input operation performed by a person is not preferable. In other words, when the force detection device is utilized as an input device of digital equipment, only when an external force so great as to allow determination that a person intentionally performed some input operation (in detail, for example, an operation of inclining the force receiver 125 in the X-axis positive or negative direction or an operation of inclining the force receiver 125 in the Y-axis positive or negative direction) is applied, detection values corresponding to the input operation should be output.

In the case of this kind of application, only when contact of the tip end of the branch portion with the contact determining electrode can be electrically detected, is a detection value output. When this utilization form is assumed, wiring to the lower structural body 280 is not necessary at all. This is because the conduction path formed by physical contact between the contact determining electrode (contact determining annular electrode) and the branch portion can be utilized as a wiring path which electrically connects each displacement electrode and the detector.

For example, in the case of the exemplary variation utilizing the auxiliary substrate 380C shown in FIG. 47, when the lower end of the first X-axis columnar member Px1 is greatly displaced downward and the tip end portion of the branch portion 281 comes into contact with the contact determining electrodes ex1$a$ and ex1$b$, as described above, the pair of contact determining electrodes ex1$a$ and ex1$b$ are made electrically continuous via the tip end portion of the branch portion 281. Therefore, only by checking the electric continuity state between the pair of contact determining electrodes ex1$a$ and ex1$b$, can the physical contact of the branch portion 281 be detected. In addition, in the state where the tip end portion of the branch portion 281 is in contact with the contact determining electrodes ex1$a$ and ex1$b$, the entire lower structural body 280 is electrically continuous to the contact determining electrodes ex1a and ex1b, so that the wiring provided between the contact determining electrodes ex1a and ex1b and the detection circuit 500 can be directly utilized as wiring to the lower structural body 280. Therefore, without directly providing wiring to the lower structural body 280, the static capacitance values of the capacitance elements can be detected.

Of course, when any of the eight branch portions 281 to 288 is not in contact with the contact determining electrodes, the lower structural body 280 without direct wiring is put in an electrically floating state, and the detection circuit 500 cannot detect the static capacitance values of the capacitance elements. However, on the assumption that the force detection device is utilized as an input device of digital equipment as described above, in this state, detection value output is not necessary, and no obstruction occurs.

<5-6: Exemplary Variation of Lower Structural Body Including Branch Portions>

Figure 49:
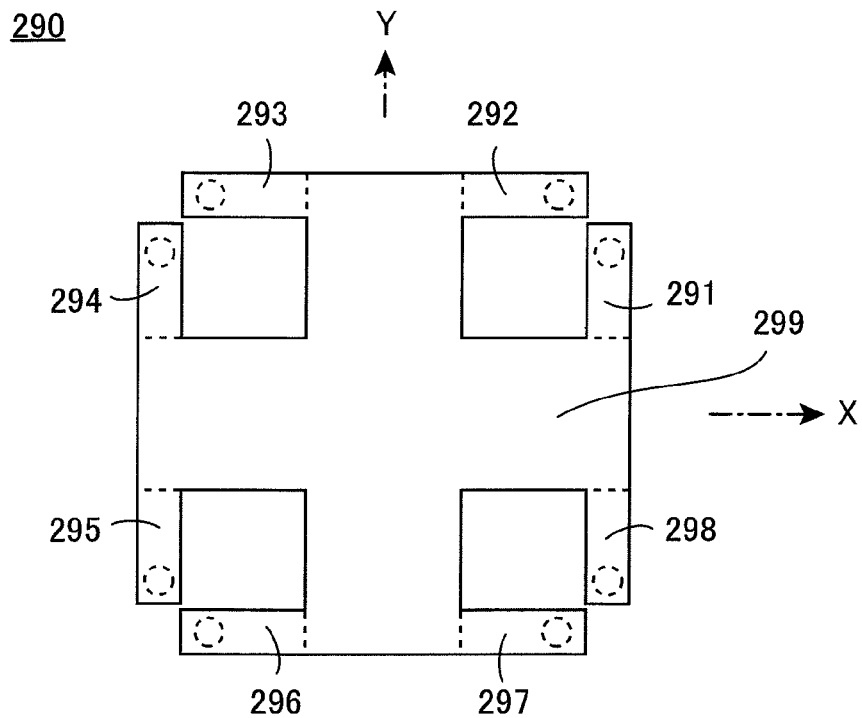
FIG. 49 is a top view of the lower substrate 290 concerning an exemplary variation of the lower structural body 280 shown in FIG. 41.

Here, an exemplary variation of the lower structural body 280 including the branch portions shown in FIG. 41 is shown. FIG. 49 is a top view of the lower structural body 290 of this exemplary variation. In the figure, the dashed straight lines indicate boundaries of portions of this structural body, and the dashed-line circles indicate portions to which the lower ends of the columnar members Px1 to Px4 and Py1 to Py4 are connected.

As illustrated, this lower structural body 290 includes a cross-shaped central portion 299 the center position of which crosses the Z-axis, and eight branch portions 291 to 298 having flexibility extending from the central portion 299 to the connection positions to the lower ends of the first to fourth X-axis columnar members and the connection positions to the lower ends of the first to fourth Y-axis columnar members. In this exemplary variation, the branch portions 291 to 298 function as cantilever beams extending in a direction parallel to the X-axis or Y-axis.

This lower structural body 290 can also be obtained by cutting an aluminum plate or a stainless-steel plate, for example. The eight branch portions 291 to 298 have flexibility, so that when the columnar members Px1 to Px4 and Py1 to Py4, respectively, are displaced in the Z-axis direction in a state where the central portion 299 is fixed, the branch portions 291 to 298 warp independently according to displacements of the respective corresponding columnar members. The lower structural body 290 shown in FIG. 49 has an advantage that manufacturing becomes easier than the lower structural body 280 shown in FIG. 41.

Figure 50:
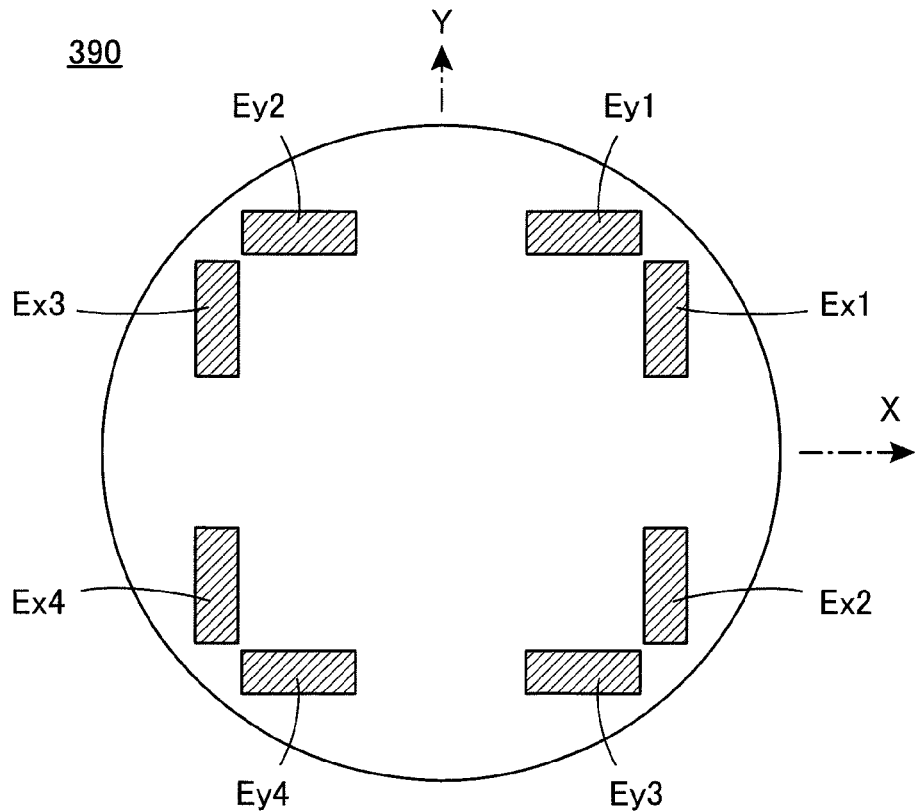
FIG. 50 is a top view of the auxiliary substrate 390 concerning an exemplary variation of the auxiliary substrate 380 shown in FIG. 42 (hatching does not show a cross section, but shows electrode shapes).

When the lower structural body 290 shown in FIG. 49 is used in place of the lower structural body 280 shown in FIG. 41, the auxiliary substrate 390 shown in FIG. 50 is used in place of the auxiliary substrate 380 shown in FIG. 42. On the upper surface of this auxiliary substrate 390, eight fixed electrodes Ex1 to Ex4 and Ey1 to Ey4 are formed (hatching shows electrode shapes). The eight fixed electrodes on the auxiliary substrate 390 have shapes opposite to the eight branch portions 291 to 298 shown in FIG. 49 and are disposed at positions opposed to the branch portions 291 to 298, so that these fixed electrodes perform the same function as that of the eight fixed electrodes shown in FIG. 42 although the shapes and arrangements are different, so that the fixed electrodes are indicated by the same reference symbols Ex1 to Ex4 and Ey1 to Ey4 for convenience.

<5-7: Exemplary Variation Using Sensors Other than Capacitance Elements>

A detailed arithmetic operation method for obtaining detection values of the six forces Fx, Fy, Fz, Mx, My, and Mz in the embodiments using capacitance elements as "sensors which detect displacements in the Z-axis direction of the lower ends of the columnar members" is described above. However, when carrying out the present invention, "sensors which detect displacements in the Z-axis direction of the lower ends of the columnar members" are not necessarily sensors using capacitance elements, and may be any sensors as long as the sensors are capable of electrically detecting displacements of specific portions by some method. For example, when a change in distance to a specific portion is measured by utilizing a sensor which measures distances by using ultrasonic waves or a sensor which measures distances by using light, a displacement of the specific portion can be detected.

Thus, even when "sensors which detect displacements in the Z-axis direction of the lower ends of the columnar members" are used in place of the capacitance sensors, the six forces Fx, Fy, Fz, Mx, My, and Mz can also be detected by the detection operations described in Section 4.

Specifically, the detector can output a signal value V(Fx)* corresponding to the sum of "the difference between the detection value of the first Y-axis sensor and the detection value of the second Y-axis sensor" and "the difference between the detection value of the third Y-axis sensor and the detection value of the fourth Y-axis sensor" as a detection value (approximate value) of an applied force Fx in the X-axis direction, and can output a signal value V(Fy)* corresponding to the sum of "the difference between the detection value of the first X-axis sensor and the detection value of the second X-axis sensor" and "the difference between the detection value of the third X-axis sensor and the detection value of the fourth X-axis sensor" as a detection value (approximate value) of an applied force Fy in the Y-axis direction.

The detector can output a signal value V(Fz) corresponding to "the sum of the detection values of the first to fourth X-axis sensors" or "the sum of the detection values of the first to fourth Y-axis sensors," or "the total of the sum of the detection values of the first to fourth X-axis sensors and the sum of the detection values of the first to fourth Y-axis sensors" as a detection value of an applied force Fz in the Z-axis direction.

On the other hand, concerning moments, the detector can output a signal value V(Mx) corresponding to the difference between "the sum of the detection value of the third Y-axis sensor and the detection value of the fourth Y-axis sensor" and "the sum of the detection value of the first Y-axis sensor and the detection value of the second Y-axis sensor" as a detection value of an applied moment Mx around the X-axis, and can output a signal value V(My) corresponding to the difference between "the sum of the detection value of the first X-axis sensor and the detection value of the second X-axis sensor" and "the sum of the detection value of the third X-axis sensor and the detection value of the fourth X-axis sensor" as a detection value of an applied moment My around the Y-axis.

The detector can output a signal value V(Mz) corresponding to the sum of "the difference between the detection value of the first X-axis sensor and the detection value of the second X-axis sensor," "the difference between the detection value of the fourth X-axis sensor and the detection value of the third X-axis sensor," "the difference between the detection value of the second Y-axis sensor and the detection value of the first Y-axis sensor," and "the difference between the detection value of the third Y-axis sensor and the detection value of the fourth Y-axis sensor" as a detection value of an applied moment Mz around the Z-axis.

Further, when a more accurate detection value must be obtained, the detector obtains a signal value V(Fx)* corresponding to the sum of "the difference between the detection value of the first Y-axis sensor and the detection value of the second Y-axis sensor" and "the difference between the detection value of the third Y-axis sensor and the detection value of the fourth Y-axis sensor," and a signal value V(Fy)* corresponding to the sum of "the difference between the detection value of the first X-axis sensor and the detection value of the second X-axis sensor" and "the difference between the detection value of the third X-axis sensor and the detection value of the fourth X-axis sensor," and can output a signal value V(Fx) corresponding to a value obtained according to an expression of "V(Fx)*−k2/K1·V(My)" as a detection value of an applied force Fx in the X-axis direction and output a signal value V(Fy) corresponding to a value obtained according to an expression of "V(Fy)*−k4/k3·V(Mx)" as a detection value of an applied force Fy in the Y-axis direction by using predetermined coefficients k1 to k4.

What is claimed is:

1. A force detection device which detects a force applied in a predetermined direction in an XYZ three-dimensional coordinate system, comprising:
    an upper substrate having a substrate surface parallel to an XY plane;
    a lower substrate having a substrate surface parallel to the XY plane and disposed below the upper substrate;
    a first columnar member having an upper end directly or indirectly joined to a lower surface of the upper substrate, and a lower end directly or indirectly joined to an upper surface of the lower substrate;
    a second columnar member having an upper end directly or indirectly joined to the lower surface of the upper substrate, and a lower end directly or indirectly joined to the upper surface of the lower substrate; and
    a detector which outputs an electric signal showing an applied force based on displacements of the first columnar member and the second columnar member, wherein
    a vicinity of a joined portion to which the lower end of the first columnar member is joined with the lower substrate constitutes a first lower film portion with flexibility;
    a vicinity of a joined portion to which the lower end of the second columnar member is joined with the lower substrate constitutes a second lower film portion with flexibility;
    a projection image obtained by orthogonally projecting a central axis of the first columnar member onto an XZ plane is inclined in a first direction with respect to a Z-axis, and a projection image obtained by orthogonally projecting a central axis of the second columnar member onto the XZ plane is inclined in a second direction opposite to the first direction with respect to the Z-axis; and
    the detector includes a first sensor which detects a displacement in the Z-axis direction of the first lower film portion and a second sensor which detects a displacement in the Z-axis direction of the second lower film portion, and outputs an electric signal showing a difference between a detection value of the first sensor and a detection value of the second sensor as a detection value of a force Fx in an X-axis direction applied to the upper substrate in a state where the lower substrate is fixed.

2. The force detection device according to claim 1, wherein the detector further outputs an electric signal showing a sum of a detection value of the first sensor and a detection value of the second sensor as a detection value of a force Fz in the Z-axis direction applied to the upper substrate in the state where the lower substrate is fixed.

3. The force detection device according to claim 1, wherein a first lower groove and a second lower groove are formed on an upper surface or a lower surface of the lower substrate, a first lower film portion is formed by a bottom portion of the first lower groove, and a second lower film portion is formed by a bottom portion of the second lower groove.

4. The force detection device according to claim 3, wherein each lower groove is formed on the upper surface of the lower substrate, a projection extending upward from a bottom surface of each lower groove to a substrate surface position is provided inside the lower groove, and the lower end of each columnar member is joined to the lower film portion via the projection.

5. The force detection device according to claim 1, wherein the lower substrate is formed of a flexible substrate, the first lower film portion is formed by a part of the flexible substrate, and the second lower film portion is formed by another part of the flexible substrate.

6. The force detection device according to claim 1, wherein a vicinity of a joined portion to which the upper end of the first columnar member is joined with the upper substrate constitutes a first upper film portion with flexibility, and a vicinity of a joined portion to which the upper end of the second columnar member is joined with the upper substrate constitutes a second upper film portion with flexibility.

7. The force detection device according to claim 6, wherein a first upper groove and a second upper groove are formed on an upper surface or a lower surface of the upper substrate, and a first upper film portion is formed by a bottom portion of the first upper groove, and a second upper film portion is formed by a bottom portion of the second upper groove.

8. The force detection device according to claim 7, wherein each upper groove is formed on the lower surface of the upper substrate, a projection extending downward from a bottom surface of each upper groove to a substrate surface position is provided inside the upper groove, and the upper end of each columnar member is joined to the upper film portion via the projection.

9. The force detection device according to claim 6, wherein the upper substrate is formed of a flexible substrate, a first upper film portion is formed by a part of the flexible substrate, and a second upper film portion is formed by another part of the flexible substrate.

10. The force detection device according to claim 1, wherein
    a central axis of the first columnar member and a central axis of the second columnar member are disposed on the XZ plane or a plane parallel to the XZ plane, and the first columnar member and the second columnar member are symmetrical about a YZ plane.

11. The force detection device according to claim 1, wherein
    a first sensor consists of a first capacitance element including: a first displacement electrode formed on the first lower film portion; and a first fixed electrode fixed to a position opposed to the first displacement electrode, and
    a second sensor consists of a second capacitance element including: a second displacement electrode formed on the second lower film portion; and a second fixed electrode fixed to a position opposed to the second displacement electrode.

12. The force detection device according to claim 11, wherein
    the lower substrate is made of a conductive material, the first lower film portion itself functions as a first displacement electrode, and the second lower film portion itself functions as a second displacement electrode.

13. The force detection device according to claim 11, further comprising:
an auxiliary substrate fixed to the lower surface of the lower substrate, wherein
a first auxiliary groove is formed at a position below the first lower film portion on an upper surface of the auxiliary substrate,
a second auxiliary groove is formed at a position below the second lower film portion on the upper surface of the auxiliary substrate, and
a first fixed electrode is formed on a bottom surface of the first auxiliary groove, and a second fixed electrode is formed on a bottom surface of the second auxiliary groove.

14. The force detection device according to claim 1, wherein
a part or the whole of the columnar member is provided having flexibility so that the columnar member is deformed when an external force is applied.

15. The force detection device according to claim 14, wherein
a constricted portion having flexibility is formed on a part of the columnar member so that the columnar member bends according to deformation of the constricted portion when an external force is applied.

16. The force detection device according to claim 14, wherein
the entire columnar member is made of a material having flexibility so that the entire columnar member is deformed when an external force is applied.

17. A force detection device which detects a force applied in a predetermined direction in an XYZ three-dimensional coordinate system, comprising:
a first columnar member and a second columnar member disposed so as to incline in predetermined directions with respect to a Z-axis defined in an up-down direction;
an upper structural body disposed above the first columnar member and the second columnar member;
a lower structural body disposed below the first columnar member and the second columnar member; and
a detector which outputs an electric signal showing an applied force based on displacements of the first columnar member and the second columnar member, wherein
an upper end of the first columnar member is directly or indirectly joined to a lower surface of the upper structural body, and a lower end of the first columnar member is directly or indirectly joined to an upper surface of the lower structural body;
an upper end of the second columnar member is directly or indirectly joined to a lower surface of the upper structural body, and a lower end of the second columnar member is directly or indirectly joined to an upper surface of the lower structural body;
a projection image obtained by orthogonally projecting a central axis of the first columnar member onto an XZ plane is inclined in a first direction with respect to the Z-axis, and a projection image obtained by orthogonally projecting a central axis of the second columnar member onto the XZ plane is inclined in a second direction opposite to the first direction with respect to the Z-axis;
at least a part of "the lower structural body" and at least a part of "the upper structural body, the first columnar member, the second columnar member, and their mutual connection portions" have flexibility so as to change the inclination state of the first columnar member and the second columnar member and allow the upper structural body to be displaced when an external force is applied to the upper structural body in a state where the lower structural body is fixed to a predetermined position; and
the detector includes a first sensor which detects a displacement in the Z-axis direction of the lower end of the first columnar member and a second sensor which detects a displacement in the Z-axis direction of the lower end of the second columnar member, and outputs an electric signal showing a difference between a detection value of the first sensor and a detection value of the second sensor as a detection value of a force Fx in an X-axis direction applied to the upper structural body in the state where the lower structural body is fixed to the predetermined position.

18. The force detection device according to claim 17, wherein
the detector further outputs an electric signal showing a sum of a detection value of the first sensor and a detection value of the second sensor as a detection value of a force Fz in the Z-axis direction applied to the upper structural body in the state where the lower structural body is fixed to a predetermined position.

19. The force detection device according to claim 17, wherein
a central axis of the first columnar member and a central axis of the second columnar member are disposed on the XZ plane or a plane parallel to the XZ plane, and the first columnar member and the second columnar member are symmetrical about a YZ plane.

20. The force detection device according to claim 17, further comprising:
an auxiliary substrate fixed below the lower structural body via a predetermined space, wherein
the first sensor consists of a first capacitance element including: a first displacement electrode formed at a position to which the lower end of the first columnar member is joined with the lower structural body; and a first fixed electrode fixed to a position opposed to the first displacement electrode on an upper surface of the auxiliary substrate, and
the second sensor consists of a second capacitance element including: a second displacement electrode formed at a position to which the lower end of the second columnar member is joined with the lower structural body; and a second fixed electrode fixed to a position opposed to the second displacement electrode on an upper surface of the auxiliary substrate.

21. The force detection device according to claim 20, wherein
the lower structural body is made of a conductive material, a portion to which the lower end of the first columnar member is joined with the lower structural body functions as a first displacement electrode, and a portion to which the lower end of the second columnar member is joined with the lower structural body functions as a second displacement electrode.

22. A force detection device which detects forces applied in predetermined directions in an XYZ three-dimensional coordinate system, comprising:
an upper substrate having a substrate surface parallel to an XY plane;
a lower substrate having a substrate surface parallel to the XY plane and disposed below the upper substrate;
first to fourth X-axis columnar members having upper ends directly or indirectly joined to a lower surface of the upper substrate, and lower ends directly or indirectly joined to an upper surface of the lower substrate;

first to fourth Y-axis columnar members having upper ends directly or indirectly joined to the lower surface of the upper substrate, and lower ends directly or indirectly joined to the upper surface of the lower substrate; and a detector which outputs electric signals showing applied forces based on displacements of the first to fourth X-axis columnar members and the first to fourth Y-axis columnar members, wherein vicinities of joined portions to which the lower ends of the first to fourth X-axis columnar members are joined with the lower substrate constitute first to fourth X-axis lower film portions with flexibility;

vicinities of joined portions to which the lower ends of the first to fourth Y-axis columnar members are joined with the lower substrate constitute first to fourth Y-axis lower film portions with flexibility;

a central axis of the first X-axis columnar member and a central axis of the second X-axis columnar member are included in an X-axis positive side orthogonal plane orthogonal to an X-axis in a positive region of the X-axis, and are inclined mutually opposite with respect to an XZ plane;

a central axis of the third X-axis columnar member and a central axis of the fourth X-axis columnar member are included in an X-axis negative side orthogonal plane orthogonal to the X-axis in a negative region of the X-axis, and are inclined mutually opposite with respect to the XZ plane;

a central axis of the first Y-axis columnar member and a central axis of the second Y-axis columnar member are included in a Y-axis positive side orthogonal plane orthogonal to the Y-axis in the positive region of the Y-axis, and are inclined mutually opposite with respect to the YZ plane;

a central axis of the third Y-axis columnar member and a central axis of the fourth Y-axis columnar member are included in a Y-axis negative side orthogonal plane orthogonal to the Y-axis in the negative region of the Y-axis, and are inclined mutually opposite with respect to the YZ plane; and the detector includes: a first X-axis sensor which detects a displacement in the Z-axis direction of the first X-axis lower film portion; a second X-axis sensor which detects a displacement in the Z-axis direction of the second X-axis lower film portion; a third X-axis sensor which detects a displacement in the Z-axis direction of the third X-axis lower film portion; a fourth X-axis sensor which detects a displacement in the Z-axis direction of the fourth X-axis lower film portion; a first Y-axis sensor which detects a displacement in the Z-axis direction of the first Y-axis lower film portion; a second Y-axis sensor which detects a displacement in the Z-axis direction of the second Y-axis lower film portion; a third Y-axis sensor which detects a displacement in the Z-axis direction of the third Y-axis lower film portion; and a fourth Y-axis sensor which detects a displacement in the Z-axis direction of the fourth Y-axis lower film portion, and outputs electric signals obtained based on detection values of the sensors as detection values of forces applied to the upper substrate in the state where the lower substrate is fixed.

23. The force detection device according to claim 22, wherein
first to fourth X-axis lower grooves and first to fourth Y-axis lower grooves are formed on an upper surface or a lower surface of the lower substrate, bottom portions of the first to fourth X-axis lower grooves form first to fourth X-axis lower film portions, and bottom portions of the first to fourth Y-axis lower grooves form first to fourth lower film portions.

24. The force detection device according to claim 23, wherein
each lower groove or the lower annular groove is formed on the upper surface of the lower substrate, a projection extending upward from a bottom surface of each lower groove or the lower annular groove to a substrate surface position is provided inside each lower groove or the lower annular groove, and the lower end of each columnar member is joined to the lower film portion via the projection.

25. The force detection device according to claim 22, wherein
a lower annular groove is formed on the upper surface or the lower surface of the lower substrate, and portions of a bottom of the lower annular groove form first to fourth X-axis lower film portions and first to fourth Y-axis lower film portions.

26. The force detection device according to claim 22, wherein
the lower substrate is formed of a flexible substrate, and portions of the flexible substrate form the first to fourth X-axis lower film portions and the first to fourth Y-axis lower film portions.

27. The force detection device according to claim 22, wherein
vicinities of joined portions to which the upper ends of the first to fourth X-axis columnar members are joined with the upper substrate constitute first to fourth X-axis upper film portions with flexibility, and
vicinities of joined portions to which the upper ends of the first to fourth Y-axis columnar members are joined with the upper substrate constitute first to fourth Y-axis upper film portions with flexibility.

28. The force detection device according to claim 27, wherein
first to fourth X-axis upper grooves and first to fourth Y-axis upper grooves are formed on an upper surface or a lower surface of the upper substrate, bottom portions of the first to fourth X-axis upper grooves form first to fourth X-axis upper film portions, and bottom portions of the first to fourth Y-axis upper grooves form first to fourth Y-axis upper film portions.

29. The force detection device according to claim 28, wherein
each upper groove or the upper annular groove is formed on the lower surface of the upper substrate, a projection extending downward from a bottom surface of each upper groove or the upper annular groove to a substrate surface position is provided inside each upper groove or the upper annular groove, and the upper end of each columnar member is joined to the upper film portion via the projection.

30. The force detection device according to claim 27, wherein
an upper annular groove is formed on an upper surface or a lower surface of the upper substrate, and portions of bottom of the upper annular groove form first to fourth X-axis upper film portions and first to fourth Y-axis upper film portions.

31. The force detection device according to claim 27, wherein the upper substrate is formed of a flexible substrate, and portions of the flexible substrate form first to fourth X-axis upper film portions and first to fourth Y-axis upper film portions.

32. The force detection device according to claim 31, wherein a coupling member is firmly fixed to a predetermined position on the upper surface of the upper substrate except for the first to fourth X-axis upper film portions and the first to fourth Y-axis upper film portions, and above the coupling member, a force receiver for receiving a force as a detection target is joined.

33. The force detection device according to claim 26, 31, or 32, wherein
when four regions of a region including the first X-axis upper/lower film portion and the second X-axis upper/lower film portion, a region including the third X-axis upper/lower film portion and the fourth X-axis upper/lower film portion, a region including the first Y-axis upper/lower film portion and the second Y-axis upper/lower film portion, and a region including the third Y-axis upper/lower film portion and the fourth Y-axis upper/lower film portion, are defined on the flexible substrate, along boundaries of these four regions, slits are formed from an outer peripheral toward a central portion of the flexible substrate.

34. The force detection device according to claim 22, wherein
an orthogonal projection image of the first X-axis columnar member onto an XY plane and an orthogonal projection image of the first Y-axis columnar member onto the XY plane are positioned in a first quadrant of an XY coordinate system,
an orthogonal projection image of the third X-axis columnar member onto the XY plane and an orthogonal projection image of the second Y-axis columnar member onto the XY plane are positioned in a second quadrant of the XY coordinate system,
an orthogonal projection image of the fourth X-axis columnar member onto the XY plane and an orthogonal projection image of the fourth Y-axis columnar member onto the XY plane are positioned in a third quadrant of the XY coordinate system, and
an orthogonal projection image of the second X-axis columnar member onto the XY plane and an orthogonal projection image of the third Y-axis columnar member onto the XY plane are positioned in a fourth quadrant of the XY coordinate system.

35. The force detection device according to claim 34, wherein
a main structural body constituted by "first to fourth X-axis columnar members," "first to fourth Y-axis columnar members," "upper substrate or upper structural member," and "lower substrate or lower structural body" is symmetrical about an XZ plane, and is also symmetrical about a YZ plane.

36. The force detection device according to claim 35, wherein
the detector outputs:
a signal value V(Fx)* corresponding to a sum of "a difference between a detection value of the first Y-axis sensor and a detection value of the second Y-axis sensor" and "a difference between a detection value of the third Y-axis sensor and a detection value of the fourth Y-axis sensor" as a detection value of an applied force Fx in an X-axis direction; and
a signal value V(Fy)* corresponding to a sum of "a difference between a detection value of the first X-axis sensor and a detection value of the second X-axis sensor" and "a difference between a detection value of the third X-axis sensor and a detection value of the fourth X-axis sensor" as a detection value of an applied force Fy in a Y-axis direction.

37. The force detection device according to claim 36, wherein
the detector further outputs:
a signal value V(Mx) corresponding to a difference between "a sum of a detection value of the third Y-axis sensor and a detection value of the fourth Y-axis sensor" and "a sum of a detection value of the first Y-axis sensor and a detection value of the second Y-axis sensor" as a detection value of an applied moment Mx around the X-axis; and
a signal value V(My) corresponding to a difference between "a sum of a detection value of the first X-axis sensor and a detection value of the second X-axis sensor" and "a sum of a detection value of the third X-axis sensor and a detection value of the fourth X-axis sensor" as a detection value of an applied moment My around the Y-axis.

38. The force detection device according to claim 35, wherein
the detector outputs:
a signal value V(Mx) corresponding to a difference between "a sum of a detection value of the third Y-axis sensor and a detection value of the fourth Y-axis sensor" and "a sum of a detection value of the first Y-axis sensor and a detection value of the second Y-axis sensor" as a detection value of an applied moment Mx around an X-axis; and
a signal value V(My) corresponding to a difference between "a sum of a detection value of the first X-axis sensor and a detection value of the second X-axis sensor" and "a sum of a detection value of the third X-axis sensor and a detection value of the fourth X-axis sensor" as a detection value of an applied moment My around a Y-axis.

39. The force detection device according to claim 38, wherein
the detector further calculates:
a signal value V(Fx)* corresponding to a sum of "a difference between a detection value of the first Y-axis sensor and a detection value of the second Y-axis sensor" and "a difference between a detection value of the third Y-axis sensor and a detection value of the fourth Y-axis sensor" and
a signal value V(Fy)* corresponding to a sum of "a difference between a detection value of the first X-axis sensor and a detection value of the second X-axis sensor" and "a difference between a detection value of the third X-axis sensor and a detection value of the fourth X-axis sensor," and
outputs:
a signal value V(Fx) corresponding to a value obtained according to an expression of "V(Fx)*−k2/k1·V (My)" as a detection value of an applied force Fx in the X-axis direction; and
a signal value V(Fy) corresponding to a value obtained according to an expression of "V(Fy)*−k4/k3·V (Mx)" as a detection value of an applied force Fy in the Y-axis direction,
by using predetermined coefficients k1 to k4.

40. The force detection device according to claim 37 or 39, wherein
the detector further outputs:

a signal value V(Fz) corresponding to "a sum of detection values of the first to fourth X-axis sensors," "a sum of detection values of first to fourth Y-axis sensors," or "a total of a sum of detection values of the first to fourth X-axis sensors and a sum of detection values of the first to fourth Y-axis sensors" as a detection value of an applied force Fz in a Z-axis direction.

41. The force detection device according to claim 37 or 39, wherein
the detector further outputs:
a signal value V(Mz) corresponding to a sum of "a difference between a detection value of the first X-axis sensor and a detection value of the second X-axis sensor," "a difference between a detection value of the fourth X-axis sensor and a detection value of the third X-axis sensor," "a difference between a detection value of the second Y-axis sensor and a detection value of the first Y-axis sensor," and "a difference between a detection value of the third Y-axis sensor and a detection value of the fourth Y-axis sensor" as a detection value of an applied moment Mz around a Z-axis.

42. The force detection device according to claim 22, wherein
each sensor consists of a capacitance element including: a displacement electrode formed on the lower film portion or the lower structural body; and a fixed electrode fixed to a position opposed to the displacement electrode.

43. The force detection device according to claim 22, wherein
the first X-axis sensor consists of a first X-axis capacitance element including: a first X-axis displacement electrode formed on the first X-axis lower film portion; and a first X-axis fixed electrode fixed to a position opposed to the first X-axis displacement electrode,
the second X-axis sensor consists of a second X-axis capacitance element including: a second X-axis displacement electrode formed on the second X-axis lower film portion; and a second X-axis fixed electrode fixed to a position opposed to the second X-axis displacement electrode,
the third X-axis sensor consists of a third X-axis capacitance element including: a third X-axis displacement electrode formed on the third X-axis lower film portion; and a third X-axis fixed electrode fixed to a position opposed to the third X-axis displacement electrode,
the fourth X-axis sensor consists of a fourth X-axis capacitance element including: a fourth X-axis displacement electrode formed on the fourth X-axis lower film portion; and a fourth X-axis fixed electrode fixed to a position opposed to the fourth X-axis displacement electrode,
the first Y-axis sensor consists of a first Y-axis capacitance element including: a first Y-axis displacement electrode formed on the first Y-axis lower film portion; and a first Y-axis fixed electrode fixed to a position opposed to the first Y-axis displacement electrode,
the second Y-axis sensor consists of a second Y-axis capacitance element including: a second Y-axis displacement electrode formed on the second Y-axis lower film portion; and a second Y-axis fixed electrode fixed to a position opposed to the second Y-axis displacement electrode,
the third Y-axis sensor consists of a third Y-axis capacitance element including: a third Y-axis displacement electrode formed on the third Y-axis lower film portion; and a third Y-axis fixed electrode fixed to a position opposed to the third Y-axis displacement electrode,
the fourth Y-axis sensor consists of a fourth Y-axis capacitance element including: a fourth Y-axis displacement electrode formed on the fourth Y-axis lower film portion; and a fourth Y-axis fixed electrode fixed to a position opposed to the fourth Y-axis displacement electrode, and
the detector outputs electric signals obtained based on a static capacitance fluctuation value Cx1 of the first X-axis capacitance element, a static capacitance fluctuation value Cx2 of the second X-axis capacitance element, a static capacitance fluctuation value Cx3 of the third X-axis capacitance element, a static capacitance fluctuation value Cx4 of the fourth X-axis capacitance element, a static capacitance fluctuation value Cy1 of the first Y-axis capacitance element, a static capacitance fluctuation value Cy2 of the second Y-axis capacitance element, a static capacitance fluctuation value Cy3 of the third Y-axis capacitance element, a static capacitance fluctuation value Cy4 of the fourth Y-axis capacitance element, as detection values.

44. The force detection device according to claim 43, wherein
the lower substrate is made of a conductive material, and the first to fourth X-axis lower film portions themselves, respectively, function as first to fourth X-axis displacement electrodes, and the first to fourth Y-axis lower film portions themselves, respectively, function as first to fourth Y-axis displacement electrodes.

45. The force detection device according to claim 43, further comprising:
an auxiliary substrate firmly fixed to a lower surface of the lower substrate, wherein
first to fourth X-axis auxiliary grooves are formed at positions below the first to fourth X-axis lower film portions on an upper surface of the auxiliary substrate, and first to fourth Y-axis auxiliary grooves are formed at positions below the first to fourth Y-axis lower film portions on the upper surface of the auxiliary substrate, and
first to fourth X-axis fixed electrodes are formed on bottom surfaces of the first to fourth X-axis auxiliary grooves, and first to fourth Y-axis fixed electrodes are formed on bottom surfaces of the first to fourth Y-axis auxiliary grooves.

46. The force detection device according to claim 43, further comprising:
an auxiliary substrate firmly fixed to a lower surface of the lower substrate, wherein
an annular auxiliary groove which couples positions below the first to fourth X-axis lower film portions and positions below the first to fourth Y-axis lower film portions on an upper surface of the auxiliary substrate is formed, and first to fourth X-axis fixed electrodes and first to fourth Y-axis fixed electrodes are formed on a bottom surface of the annular auxiliary groove.

47. The force detection device according to claim 43, wherein
a spacer member is firmly fixed to a predetermined position on a lower surface of the lower substrate except for the first to fourth X-axis lower film portions and the first to fourth Y-axis lower film portions, an auxiliary substrate is firmly fixed below the spacer member, and first to fourth X-axis fixed electrodes and first to fourth Y-axis fixed electrodes are formed on an upper surface of the auxiliary substrate.

48. The force detection device according to claim 43, wherein
an orthogonal projection image of the first X-axis columnar member onto the XY plane and an orthogonal projection image of the first Y-axis columnar member onto the XY plane are positioned in a first quadrant of an XY coordinate system, an orthogonal projection image of the third X-axis columnar member onto the XY plane and an orthogonal projection image of the second Y-axis columnar member onto the XY plane are positioned in a second quadrant of the XY coordinate system, an orthogonal projection image of the fourth X-axis columnar member onto the XY plane and an orthogonal projection image of the fourth Y-axis columnar member onto the XY plane are positioned in a third quadrant of the XY coordinate system, and an orthogonal projection image of the second X-axis columnar member onto the XY plane and an orthogonal projection image of the third Y-axis columnar member onto the XY plane are positioned in a fourth quadrant of the XY coordinate system, the first to fourth X-axis columnar members are inclined so that the upper ends become closer to the XZ plane than the lower ends, the first to fourth Y-axis columnar members are inclined so that the upper ends become closer to the YZ plane than the lower ends, and a main structural body constituted by "the first to fourth X-axis columnar members," "the first to fourth Y-axis columnar members," "the upper substrate or the upper structural body," and "the lower substrate or the lower structural body" is symmetrical about the XZ plane, and is also symmetrical about the YZ plane.

49. The force detection device according to claim 48, wherein the detector outputs:

a signal value V(Fx)* corresponding to a value obtained according to an expression of "(Cy1−Cy2)+(Cy3−Cy4)" as a detection value of an applied force Fx in an X-axis direction; and a signal value V(Fy)* corresponding to a value obtained according to an expression of "(Cx1−Cx2)+(Cx3−Cx4)" as a detection value of an applied force Fy in a Y-axis direction.

50. The force detection device according to claim 49, wherein the detector further outputs:

a signal value V(Mx) corresponding to a value obtained according to an expression of "(Cy3+Cy4)−(Cy1+Cy2)" as a detection value of an applied moment Mx around the X-axis; and a signal value V(My) corresponding to a value obtained according to an expression of "(Cx1+Cx2)−(Cx3+Cx4)" as a detection value of an applied moment My around the Y-axis.

51. The detection device according to claim 48, wherein the detector outputs:

a signal value V(Mx) corresponding to a value obtained according to an expression of "(Cy3+Cy4)−(Cy1+Cy2)" as a detection value of an applied moment Mx around an X-axis; and a signal value V(My) corresponding to a value obtained according to an expression of "(Cx1+Cx2)−(Cx3+Cx4)" as a detection value of an applied moment My around a Y-axis.

52. The force detection device according to claim 51, wherein the detector further outputs:

a signal value V(Fx) corresponding to a value obtained according to an expression of "(Cy1−Cy2)+(Cy3−Cy4)−k2/k1·V(My)" as a detection value of an applied force Fx in the X-axis direction; and a signal value V(Fy) corresponding to a value obtained according to an expression of "(Cx1−Cx2)+(Cx3−Cx4)−k4/k3·V(Mx)" as a detection value of an applied force Fy in the Y-axis direction, by using predetermined coefficients k1 to k4.

53. The force detection device according to claim 49 or 51, wherein the detector further outputs a signal value V(Fz) corresponding to a value obtained according to an expression of:

"−(Cx1+Cx2+Cx3+Cx4+Cy1+Cy2+Cy3+Cy4)" or

"−(Cx1+Cx2+Cx3+Cx4)" or

"−(Cy1+Cy2+Cy3+Cy4)"

as a detection value of an applied force Fz in the Z-axis direction.

54. The force detection device according to claim 49 or 51, wherein the detector further outputs:

a signal value V(Mz) corresponding to a value obtained according to an expression of:

"(Cx1−Cx2)+(Cx4−Cx3)+(Cy2−Cy1)+(Cy3−Cy4)"

as a detection value of an applied moment Mz around the Z-axis direction.

55. A force detection device which detects forces applied in predetermined directions in an XYZ three-dimensional coordinate system, comprising:

an upper structural body expanding on a plane parallel to an XY plane;

a lower structural body expanding on a plane parallel to the XY plane and disposed below the upper structural body;

first to fourth X-axis columnar members having upper ends directly or indirectly joined to a lower surface of the upper structural body, and lower ends directly or indirectly joined to an upper surface of the lower structural body;

first to fourth Y-axis columnar members having upper ends directly or indirectly joined to a lower surface of the upper structural body, and lower ends directly or indirectly joined to an upper surface of the lower structural body; and a detector which outputs electric signals showing applied forces based on displacements of the first to fourth X-axis columnar members and the first to fourth Y-axis columnar members, wherein a central axis of the first X-axis columnar member and a central axis of the second X-axis columnar member are included in an X-axis positive side orthogonal plane orthogonal to an X-axis in a positive region of the X-axis, and are inclined mutually opposite with respect to an XZ plane;

a central axis of the third X-axis columnar member and a central axis of the fourth X-axis columnar member are included in an X-axis negative side orthogonal plane orthogonal to the X-axis in a negative region of the X-axis, and are inclined mutually opposite with respect to the XZ plane;

a central axis of the first Y-axis columnar member and a central axis of the second Y-axis columnar member are included in a Y-axis positive side orthogonal plane orthogonal to a Y-axis in a positive region of the Y-axis, and are inclined mutually opposite with respect to a YZ plane;

a central axis of the third Y-axis columnar member and a central axis of the fourth Y-axis columnar member are included in a Y-axis negative side orthogonal plane orthogonal to the Y-axis in a negative region of the Y-axis, and are inclined mutually opposite with respect to the YZ plane; and the detector includes: a first X-axis sensor which detects a displacement in a Z-axis direction of the lower end of the first X-axis columnar member; a second X-axis sensor which detects a displacement in the Z-axis direction of the lower end of the second X-axis columnar member; a third X-axis sensor which detects a displacement in the Z-axis direction of the lower end of the third X-axis columnar member; a fourth X-axis sensor which detects a displacement in the Z-axis direction of the lower end of the fourth X-axis columnar member; a first Y-axis sensor which detects a displacement in the Z-axis direction of the lower end of the first Y-axis columnar member; a second Y-axis sensor which detects a displacement in the Z-axis direction of the lower end of the second Y-axis columnar member; a third Y-axis sensor which detects a displacement in the Z-axis direction of the lower end of the third Y-axis columnar member; and a fourth Y-axis sensor which detects a displacement in the Z-axis direction of the lower end of the fourth Y-axis columnar member, and outputs electric signals obtained based on detection values of the sensors as detection values of forces applied to the upper structural body in a state where the lower structural body is fixed to a predetermined position.

56. The force detection device according to claim 55, wherein
the lower structural body includes a central portion positioned on the Z-axis, and eight branch portions having flexibility extending from a central portion to connection positions to the lower ends of the first to fourth X-axis columnar members and connection positions to the lower ends of the first to fourth Y-axis columnar members, respectively.

57. The force detection device according to claim 56, further comprising:
an auxiliary substrate fixed below the lower structural body via a predetermined space, wherein
the first X-axis sensor consists of a first X-axis capacitance element including: a first X-axis displacement electrode formed on a branch portion extending to a connection position to the lower end of the first X-axis columnar member; and a first X-axis fixed electrode fixed to a position opposed to the first X-axis displacement electrode on an upper surface of the auxiliary substrate,
the second X-axis sensor consists of a second X-axis capacitance element including: a second X-axis displacement electrode formed on a branch portion extending to a connection position to the lower end of the second X-axis columnar member; and a second X-axis fixed electrode fixed to a position opposed to the second X-axis displacement electrode on the upper surface of the auxiliary substrate,
the third X-axis sensor consists of a third X-axis capacitance element including: a third X-axis displacement electrode formed on a branch portion extending to a connection position to the lower end of the third X-axis columnar member; and a third X-axis fixed electrode fixed to a position opposed to the third X-axis displacement electrode on the upper surface of the auxiliary substrate,
the fourth X-axis sensor consists of a fourth X-axis capacitance element including: a fourth X-axis displacement electrode formed on a branch portion extending to a connection position to the lower end of the fourth X-axis columnar member; and a fourth X-axis fixed electrode fixed to a position opposed to the fourth X-axis displacement electrode on the upper surface of the auxiliary substrate,
the first Y-axis sensor consists of a first Y-axis capacitance element including: a first Y-axis displacement electrode formed on a branch portion extending to a connection position to the lower end of the first Y-axis columnar member; and a first Y-axis fixed electrode fixed to a position opposed to the first Y-axis displacement electrode on the upper surface of the auxiliary substrate,
the second Y-axis sensor consists of a second Y-axis capacitance element including: a second Y-axis displacement electrode formed on a branch portion extending to a connection position to the lower end of the second Y-axis columnar member; and a second Y-axis fixed electrode fixed to a position opposed to the second Y-axis displacement electrode on the upper surface of the auxiliary substrate,
the third Y-axis sensor consists of a third Y-axis capacitance element including: a third Y-axis displacement electrode formed on a branch portion extending to a connection position to the lower end of the third Y-axis columnar member; and a third Y-axis fixed electrode fixed to a position opposed to the third Y-axis displacement electrode on the upper surface of the auxiliary substrate,
the fourth Y-axis sensor consists of a fourth Y-axis capacitance element including: a fourth Y-axis displacement electrode formed on a branch portion extending to a connection position to the lower end of the fourth Y-axis columnar member; and a fourth Y-axis fixed electrode fixed to a position opposed to the fourth Y-axis displacement electrode on the upper surface of the auxiliary substrate, and
the detector outputs electric signals obtained based on a static capacitance fluctuation value $Cx1$ of the first X-axis capacitance element, a static capacitance fluctuation value $Cx2$ of the second X-axis capacitance element, a static capacitance fluctuation value $Cx3$ of the third X-axis capacitance element, a static capacitance fluctuation value $Cx4$ of the fourth X-axis capacitance element, a static capacitance fluctuation value $Cy1$ of the first Y-axis capacitance element, a static capacitance fluctuation value $Cy2$ of the second Y-axis capacitance element, a static capacitance fluctuation value $Cy3$ of the third Y-axis capacitance element, a static capacitance fluctuation value $Cy4$ of the fourth Y-axis capacitance element, as detection values.

58. The force detection device according to claim 57, wherein
the lower structural body is made of a conductive material, and the branch portions themselves, respectively, function as first to fourth X-axis displacement electrodes and first to fourth Y-axis displacement electrodes.

59. The force detection device according to claim 58, wherein
contact determining electrodes electrically insulated from the fixed electrodes are provided at positions opposed to tip end portions of the branch portions on the upper surface of the auxiliary surface so as to determine whether the tip end portions of the branch portions and the contact determining electrodes have come into physical contact with each other based on electric continuity states between these.

60. The force detection device according to claim 59, wherein a pair of contact determining electrodes insulated from each other is provided at a position opposed to the tip end portion of a branch portion so as to determine whether the tip end portion of the branch portion and the pair of contact determining electrodes have come into physical contact with each other based on an electric continuity state between the pair of contact determining electrodes.

61. The force detection device according to claim 58, wherein in an annular region which couples positions opposed to tip end portions of the branch portions on the upper surface of the auxiliary substrate, a contact determining annular electrode electrically insulated from the fixed electrodes is provided so as to determine whether the tip end portions of the branch portions and the contact determining annular electrode have come into physical contact with each other based on electric continuity states between these.

62. The force detection device according to claim 61, wherein in the annular region, a pair of contact determining annular electrodes which are insulated from each other and are concentric with each other are provided so as to determine whether the tip end portions of the branch portions and the pair of contact determining annular electrodes have come into physical contact with each other based on an electric continuity state between the pair of contact determining annular electrodes.

63. The force detection device according to any of claims 59 to 62, wherein a conduction path formed by physical contact between the contact determining electrode or the contact determining annular electrode and the branch portion constitutes a wiring path which electrically connects each displacement electrode and the detector.

\* \* \* \* \*